(12) United States Patent
Borras et al.

(10) Patent No.: US 12,240,772 B2
(45) Date of Patent: Mar. 4, 2025

(54) TREATMENT OF AQUEOUS COMPOSITION WITH METAL COMPONENT

(71) Applicant: NuQuatic, LLC, St. Paul, MN (US)

(72) Inventors: Carlos Borras, Ruskin, FL (US); Donald A. Luke, Valrico, FL (US)

(73) Assignee: NuQuatic, LLC, St. Paul, MN (US)

( * ) Notice: Subject to any disclaimer, the term of this patent is extended or adjusted under 35 U.S.C. 154(b) by 0 days.

(21) Appl. No.: 18/628,119

(22) Filed: Apr. 5, 2024

(65) Prior Publication Data
US 2024/0336501 A1 Oct. 10, 2024

Related U.S. Application Data

(60) Provisional application No. 63/604,373, filed on Nov. 30, 2023, provisional application No. 63/457,215, (Continued)

(51) Int. Cl.
*C02F 1/46* (2023.01)
*C02F 1/461* (2023.01)
(Continued)

(52) U.S. Cl.
CPC .......... *C02F 1/463* (2013.01); *C02F 1/46176* (2013.01); *C02F 2101/105* (2013.01); *C02F 2101/36* (2013.01); *C02F 2303/18* (2013.01)

(58) Field of Classification Search
CPC ........ C02F 1/46176; C02F 1/463; C02F 1/66; C02F 2001/46133; C02F 2101/20; C02F 1/001; C02F 1/4674; C02F 1/4676; C02F 1/5254; C02F 1/586; C02F 2001/46119; C02F 2001/46157; C02F 2101/105; C02F 2101/16; C02F 2209/06; C02F 1/004; C02F 1/46109; C02F 2101/10; C02F 2101/103; C02F 2101/14; C02F 2101/308; C02F 2101/325; C02F 2103/023; C02F 2103/10; C02F 2103/16; C02F 2103/28; C02F 2103/30; C02F 2103/365; C02F 2303/22; C25B 1/00; C25B 1/20; C25B 1/50; C25B 9/65; H01L 2224/02125; H01L 2224/04042; H01L 23/562; H01L 24/02; H01L 24/05; H01L 2924/01013; H01L 2924/01014; H01L 2924/01019;
(Continued)

(56) References Cited

U.S. PATENT DOCUMENTS 1,018,355 A 2/1912 Galbreath
2,449,706 A 9/1948 Jones
(Continued)

FOREIGN PATENT DOCUMENTS

AU 2020291450 B2 2/2023
CA 2953591 A1 7/2018
(Continued)

OTHER PUBLICATIONS

"U.S. Appl. No. 17/249,343, Corrected Notice of Allowability mailed Dec. 22, 2021", 3 pgs.
(Continued)

*Primary Examiner* — Dirk R Bass
(74) *Attorney, Agent, or Firm* — Schwegman Lundberg & Woessner, P.A.

(57) ABSTRACT

A method of treating feed water includes adding a metal component to the feed water to form a clarified aqueous composition.

15 Claims, 10 Drawing Sheets

Related U.S. Application Data filed on Apr. 5, 2023, provisional application No. 63/470,046, filed on May 31, 2023, provisional application No. 63/544,328, filed on Oct. 16, 2023.

(51) Int. Cl.
  *C02F 1/463* (2023.01)
  *C02F 101/10* (2006.01)
  *C02F 101/36* (2006.01)

(58) Field of Classification Search
  CPC . H01L 2924/01029; H01L 2924/01033; H01L 2924/014; H01L 2924/14; H01L 2924/3025
  See application file for complete search history.

(56) References Cited

U.S. PATENT DOCUMENTS

| | | |
|---|---|---|
| 3,385,785 A | 5/1968 | Forrest et al. |
| 3,425,925 A | 2/1969 | Fleischman |
| 3,660,162 A | 5/1972 | Eisenberg |
| 3,766,045 A | 10/1973 | Itakura et al. |
| 3,846,300 A | 11/1974 | Inoue |
| 3,901,804 A | 8/1975 | Ohuchi et al. |
| 4,011,151 A | 3/1977 | Ito et al. |
| 4,179,347 A | 12/1979 | Krause et al. |
| 4,388,195 A | 6/1983 | Von Hagel et al. |
| 4,655,895 A | 4/1987 | Feofanov et al. |
| 5,167,777 A | 12/1992 | Kaczur et al. |
| 5,348,629 A | 9/1994 | Khudenko |
| 5,439,566 A | 8/1995 | Zucker |
| 5,454,917 A | 10/1995 | Mattison et al. |
| 5,876,575 A | 3/1999 | Kump |
| 5,976,383 A | 11/1999 | Guess et al. |
| 6,149,797 A | 11/2000 | Carey et al. |
| 6,180,014 B1 | 1/2001 | Salama |
| 6,210,587 B1 | 4/2001 | Vion |
| 6,893,567 B1 | 5/2005 | Vanotti et al. |
| 7,118,665 B2 | 10/2006 | Kin et al. |
| 7,582,198 B2 | 9/2009 | Wilkins et al. |
| 7,704,353 B2 | 4/2010 | Stadelmann et al. |
| 7,815,779 B2 | 10/2010 | Flettner |
| 7,858,598 B2 | 12/2010 | Yang et al. |
| 8,147,695 B2 | 4/2012 | Banerjee et al. |
| 8,673,129 B2 | 3/2014 | Gordon et al. |
| 8,715,469 B2 | 5/2014 | Pancurák et al. |
| 8,926,804 B2 | 1/2015 | Pancurák et al. |
| 9,067,801 B2 | 6/2015 | Nagghappan |
| 9,067,807 B2 | 6/2015 | Soane et al. |
| 9,346,692 B2 | 5/2016 | Combs et al. |
| 9,446,974 B2 | 9/2016 | Milner et al. |
| 9,580,338 B2 | 2/2017 | Fujikane et al. |
| 9,593,030 B2 | 3/2017 | Fujikane et al. |
| 9,617,175 B2 | 4/2017 | Monzyk et al. |
| 9,637,403 B2 | 5/2017 | Mckay et al. |
| 9,865,860 B2 | 1/2018 | Fauland |
| 10,003,095 B2 | 6/2018 | Kovacs et al. |
| 10,071,921 B2 | 9/2018 | Johnson et al. |
| 10,173,914 B2 | 1/2019 | Chidambaran et al. |
| 10,230,119 B2 | 3/2019 | Kovacs et al. |
| 10,266,428 B1 | 4/2019 | Brian |
| 10,343,937 B2 | 7/2019 | Casbeer et al. |
| 10,427,195 B2 | 10/2019 | Ball |
| 10,513,786 B2 | 12/2019 | Beddoes et al. |
| 10,519,052 B2 | 12/2019 | Ball et al. |
| 10,538,436 B2 | 1/2020 | Hu et al. |
| 10,611,651 B2 | 4/2020 | Martikainen et al. |
| 10,665,846 B2 | 5/2020 | Fauland |
| 10,676,378 B2 | 6/2020 | Tandukar et al. |
| 10,700,392 B2 | 6/2020 | Pantel et al. |
| 10,752,521 B2 | 8/2020 | Nelson |
| 10,800,678 B2 | 10/2020 | Gifford et al. |
| 10,808,327 B2 | 10/2020 | Griffis et al. |
| 10,865,128 B2 | 12/2020 | Ball |
| 10,882,766 B2 | 1/2021 | Taylor |
| 10,954,144 B2 | 3/2021 | Ball et al. |
| 11,136,248 B2 | 10/2021 | Pettersson et al. |
| 11,148,964 B2 | 10/2021 | Ball |
| 11,220,443 B2 | 1/2022 | Borras et al. |
| 11,225,420 B2 | 1/2022 | Borras et al. |
| 11,312,646 B2 | 4/2022 | Gunasekaran et al. |
| 11,345,620 B2 | 5/2022 | Zhu et al. |
| 11,384,441 B2 | 7/2022 | Beddoes et al. |
| 11,401,180 B2 | 8/2022 | Dejarme et al. |
| 11,401,181 B1 | 8/2022 | Borras et al. |
| 11,407,666 B2 | 8/2022 | Rosansky et al. |
| 11,433,152 B2 | 9/2022 | Saue |
| 11,512,011 B2 | 11/2022 | Huang et al. |
| 11,512,012 B2 | 11/2022 | Chiang et al. |
| 11,541,438 B2 | 1/2023 | Morrell |
| 11,548,800 B2 | 1/2023 | Franceschi-Hofmann et al. |
| 11,584,665 B2 | 2/2023 | Green et al. |
| 11,623,884 B1 | 4/2023 | Menon et al. |
| 11,643,339 B2 | 5/2023 | Nelson |
| 11,679,999 B2 | 6/2023 | Newell et al. |
| 11,713,261 B2 | 8/2023 | Griffis et al. |
| 11,780,746 B2 | 10/2023 | Duckworth et al. |
| 11,780,753 B2 | 10/2023 | Dejarme et al. |
| 11,896,948 B2 | 2/2024 | Chang et al. |
| 12,122,691 B1 | 10/2024 | Borras et al. |
| 12,168,621 B2 | 12/2024 | Borras et al. |
| 2001/0000485 A1 | 4/2001 | Ying et al. |
| 2003/0168411 A1 | 9/2003 | Hiro et al. |
| 2003/0226803 A1 | 12/2003 | Kamiya et al. |
| 2004/0151957 A1 | 8/2004 | Brooks et al. |
| 2004/0251212 A1 | 12/2004 | Ikematsu et al. |
| 2005/0011765 A1 | 1/2005 | Omasa |
| 2005/0173262 A1 | 8/2005 | Nakanishi et al. |
| 2006/0000784 A1 | 1/2006 | Khudenko |
| 2006/0096853 A1 | 5/2006 | King |
| 2006/0254929 A1 | 11/2006 | Mikio |
| 2009/0120863 A1 | 5/2009 | Salama et al. |
| 2009/0282627 A1 | 11/2009 | Porat |
| 2010/0000924 A1 | 1/2010 | Hayashi et al. |
| 2010/0051477 A1 | 3/2010 | Jeon et al. |
| 2010/0126879 A1 | 5/2010 | Wilman et al. |
| 2011/0223523 A1 | 9/2011 | Lopez et al. |
| 2012/0037498 A1 | 2/2012 | Pancurak et al. |
| 2013/0162097 A1 | 6/2013 | Shinmoto et al. |
| 2013/0180857 A1 | 7/2013 | Heffernan et al. |
| 2013/0220919 A1 | 8/2013 | Bilbao et al. |
| 2013/0277231 A1 | 10/2013 | Greenberg |
| 2013/0284678 A1 | 10/2013 | Daly et al. |
| 2014/0327239 A1 | 11/2014 | Stanley |
| 2015/0001094 A1 | 1/2015 | Ibeid et al. |
| 2015/0151985 A1 | 6/2015 | Johnson et al. |
| 2018/0141836 A1 | 5/2018 | Hu et al. |
| 2019/0002321 A1 | 1/2019 | Grönfors et al. |
| 2019/0092653 A1 | 3/2019 | Arbeus et al. |
| 2019/0185351 A1 | 6/2019 | Huang et al. |
| 2020/0010341 A1 | 1/2020 | Harvey et al. |
| 2020/0029714 A1 | 1/2020 | Nguyen et al. |
| 2020/0165149 A1 | 5/2020 | Zhu et al. |
| 2020/0270149 A1 | 8/2020 | Bejan et al. |
| 2020/0325041 A1 | 10/2020 | Cosentino et al. |
| 2020/0369547 A1 | 11/2020 | Davy et al. |
| 2021/0147265 A1 | 5/2021 | Andrews et al. |
| 2021/0179456 A1 | 6/2021 | Borras et al. |
| 2021/0188666 A1 | 6/2021 | Borras et al. |
| 2021/0188669 A1 | 6/2021 | Luke et al. |
| 2021/0221717 A1 | 7/2021 | Buschmann |
| 2022/0073380 A1 | 3/2022 | Schneider et al. |
| 2022/0073383 A1 | 3/2022 | Borras et al. |
| 2022/0081330 A1 | 3/2022 | Borras et al. |
| 2022/0106208 A1 | 4/2022 | Borras et al. |
| 2022/0305458 A1 | 9/2022 | Leibfarth et al. |
| 2022/0315457 A1 | 10/2022 | Borras et al. |
| 2023/0264170 A1 | 8/2023 | Blackburn et al. |

(56) References Cited

U.S. PATENT DOCUMENTS

| | | | |
|---|---|---|---|
| 2024/0010528 | A1 | 1/2024 | Borras et al. |
| 2024/0336500 | A1 | 10/2024 | Borras et al. |

FOREIGN PATENT DOCUMENTS

| | | | |
|---|---|---|---|
| CA | 3140014 A1 | 12/2020 | |
| CA | 3140149 A1 | 12/2020 | |
| CN | 2099752 U | 3/1992 | |
| CN | 104291415 A | 1/2015 | |
| CN | 205692940 U | 11/2016 | |
| CN | 107010699 | 8/2017 | |
| CN | 107235537 A | 10/2017 | |
| CN | 207330680 U | 5/2018 | |
| CN | 109607691 | 4/2019 | |
| CN | 209636053 U | 11/2019 | |
| CN | 114502512 A | 5/2022 | |
| CN | 114555214 A | 5/2022 | |
| CN | 117203166 A | 12/2023 | |
| JP | S4988166 U | 7/1974 | |
| JP | S505669 B1 | 3/1975 | |
| JP | S5140380 A | 4/1976 | |
| JP | H10473 A | 1/1998 | |
| JP | H11277066 A | 10/1999 | |
| JP | 3072838 U | 11/2000 | |
| JP | 2001276849 A | 10/2001 | |
| JP | 2003225672 A | 8/2003 | |
| JP | 2004016868 A | 1/2004 | |
| JP | 2004066223 A | 3/2004 | |
| JP | 2005325437 A | 11/2005 | |
| JP | 2012011375 A | 1/2012 | |
| JP | 2022537699 A | 8/2022 | |
| JP | 2022538780 A | 9/2022 | |
| JP | 7237209 B2 | 3/2023 | |
| JP | 2024509544 | 3/2024 | |
| JP | 7463409 | 4/2024 | |
| PL | 224187 B1 | 11/2016 | |
| RU | 2029735 C1 | 2/1995 | |
| RU | 2142918 C1 | 12/1999 | |
| WO | WO-2000000670 A1 | 1/2000 | |
| WO | WO-2004046042 A2 | 6/2004 | |
| WO | WO-2008064460 A1 | 6/2008 | |
| WO | WO-2011107984 A2 | 9/2011 | |
| WO | WO-2012048425 A1 | 4/2012 | |
| WO | WO-2013016821 A1 | 2/2013 | |
| WO | WO-2013017901 A1 | 2/2013 | |
| WO | WO-2013075240 A1 | 5/2013 | |
| WO | WO-2014165998 A1 | 10/2014 | |
| WO | WO-2016024408 A1 | 2/2016 | |
| WO | WO-2016054749 A1 | 4/2016 | |
| WO | 2020247029 | 12/2020 | |
| WO | WO-2020252241 A1 | 12/2020 | |
| WO | WO-2020252242 A1 | 12/2020 | |
| WO | WO-2021025991 A1 | 2/2021 | |
| WO | WO-2022186877 A2 | 9/2022 | |
| WO | WO-2022186877 A3 | 10/2022 | |
| WO | WO-2023114025 A1 | 6/2023 | |
| WO | 2023154555 | 8/2023 | |
| WO | WO-2023205352 A1 | 10/2023 | |
| WO | 2023215271 | 11/2023 | |
| WO | WO-2023244720 A1 | 12/2023 | |
| WO | 2024211729 | 10/2024 | |
| WO | 2024211748 | 10/2024 | |

OTHER PUBLICATIONS

"U.S. Appl. No. 17/249,343, Final Office Action mailed Oct. 1, 2021", 16 pgs.

"U.S. Appl. No. 17/249,343, Non Final Office Action mailed Jun. 15, 2021", 17 pgs.

"U.S. Appl. No. 17/249,343, Notice of Allowance mailed Nov. 23, 2021", 10 pgs.

"U.S. Appl. No. 17/249,343, Response filed Jun. 7, 2021 to Restriction Requirement mailed Apr. 30, 2021", 10 pgs.

"U.S. Appl. No. 17/249,343, Response filed Sep. 7, 2021 to Non Final Office Action mailed Jun. 15, 2021", 21 pgs.

"U.S. Appl. No. 17/249,343, Response filed Nov. 4, 2021 to Final Office Action mailed Oct. 1, 2021", 15 pgs.

"U.S. Appl. No. 17/249,343, Restriction Requirement mailed Apr. 30, 2021", 7 pgs.

"U.S. Appl. No. 17/249,345, Corrected Notice of Allowability mailed Dec. 10, 2021", 4 pgs.

"U.S. Appl. No. 17/249,345, Non Final Office Action mailed Jun. 24, 2021", 26 pgs.

"U.S. Appl. No. 17/249,345, Notice of Allowance mailed Sep. 27, 2021", 12 pgs.

"U.S. Appl. No. 17/249,345, Response filed Jun. 7, 2021 to Restriction Requirement mailed May 3, 2021", 11 pgs.

"U.S. Appl. No. 17/249,345, Response filed Sep. 7, 2021 to Non Final Office Action mailed Jun. 24, 2021", 19 pgs.

"U.S. Appl. No. 17/249,345, Restriction Requirement mailed May 3, 2021", 8 pgs.

"U.S. Appl. No. 17/340,254, Advisory Action mailed Jan. 24, 2022", 3 pgs.

"U.S. Appl. No. 17/340,254, Final Office Action mailed Nov. 19, 2021", 10 pgs.

"U.S. Appl. No. 17/340,254, Non Final Office Action mailed Sep. 23, 2021", 10 pgs.

"U.S. Appl. No. 17/340,254, Notice of Allowability mailed Apr. 25, 2022", 3 pgs.

"U.S. Appl. No. 17/340,254, Notice of Allowance mailed Mar. 31, 2022", 7 pgs.

"U.S. Appl. No. 17/340,254, Response filed Jan. 5, 2022 to Final Office Action mailed Nov. 19, 2021", 14 pgs.

"U.S. Appl. No. 17/340,254, Response filed Feb. 21, 2022 to Advisory Action mailed Jan. 24, 2022", 18 pgs.

"U.S. Appl. No. 17/340,254, Response filed Nov. 4, 2021 to Non Final Office Action mailed Sep. 23, 2021", 15 pgs.

"U.S. Appl. No. 17/530,907, Non Final Office Action mailed Jan. 10, 2024", 32 pgs.

"U.S. Appl. No. 17/530,907, Response filed Mar. 22, 2024 to Non Final Office Action mailed Jan. 10, 2024", 18 pgs.

"U.S. Appl. No. 17/533,522, Advisory Action mailed Mar. 8, 2024", 4 pgs.

"U.S. Appl. No. 17/533,522, Final Office Action mailed Dec. 26, 2023", 30 pgs.

"U.S. Appl. No. 17/533,522, Non Final Office Action mailed Jan. 26, 2023", 16 pgs.

"U.S. Appl. No. 17/533,522, Non Final Office Action mailed Jun. 28, 2023", 28 pgs.

"U.S. Appl. No. 17/533,522, Response filed Feb. 23, 2024 to Final Office Action mailed Dec. 26, 2023", 18 pgs.

"U.S. Appl. No. 17/533,522, Response filed Mar. 23, 2023 to Non Final Office Action mailed Jan. 26, 2023", 13 pgs.

"U.S. Appl. No. 17/533,522, Response filed Sep. 22, 2023 to Non Final Office Action mailed Jun. 28, 2023", 16 pgs.

"U.S. Appl. No. 17/838,361, Final Office Action mailed Oct. 31, 2023", 11 pgs.

"U.S. Appl. No. 17/838,361, Non Final Office Action mailed Aug. 7, 2023", 8 pgs.

"U.S. Appl. No. 17/838,361, Response filed Jan. 24, 2024 to Final Office Action mailed Oct. 31, 2023", 16 pgs.

"U.S. Appl. No. 17/838,361, Response filed Sep. 22, 2023 to Non Final Office Action mailed Aug. 7, 2023", 13 pgs.

"Australian Application Serial No. 2020291450, First Examination Report mailed Oct. 28, 2022", 3 pgs.

"Australian Application Serial No. 2020291450, Response filed Dec. 19, 2022 to First Examination Report mailed Oct. 28, 2022", 18 pgs.

"Australian Application Serial No. 2020291534, First Examination Report mailed Nov. 9, 2022", 4 pgs.

"Australian Application Serial No. 2020291534, Response filed Mar. 23, 2023 to First Examination Report mailed Nov. 9, 2022", 10 pgs.

"Australian Application Serial No. 2021430769, First Examination Report mailed Mar. 22, 2024", 3 pgs.

(56) References Cited

OTHER PUBLICATIONS

"Canadian Application Serial No. 3,140,014, Examiners Rule 86(2) Report mailed Feb. 9, 2024", 4 pgs.
"Canadian Application Serial No. 3,140,014, Examiners Rule 86(2) Report mailed Jul. 17, 2023", 3 pgs.
"Canadian Application Serial No. 3,140,014, Examiners Rule 86-2 Report mailed Sep. 20, 2022", 5 pgs.
"Canadian Application Serial No. 3,140,014, Response filed Jan. 9, 2023 to Examiners Rule 86-2 Report mailed Sep. 20, 2022", 13 pgs.
"Canadian Application Serial No. 3,140,014, Response filed Oct. 25, 2023 to Examiners Rule 86(2) Report mailed Jul. 17, 2023", 25 pgs.
"Canadian Application Serial No. 3,140,149, Examiners Rule 86(2) Report mailed Mar. 13, 2024", 7 pgs.
"Canadian Application Serial No. 3,140,149, Examiners Rule 86(2) Requisition mailed Feb. 27, 2023", 3 pgs.
"Canadian Application Serial No. 3,140,149, Office Action mailed Aug. 29, 2022", 3 pgs.
"Canadian Application Serial No. 3,140,149, Response filed Jun. 8, 2023 to Examiners Rule 86(2) Requisition mailed Feb. 27, 2023", 33 pgs.
"Canadian Application Serial No. 3,140,149, Response filed Dec. 15, 2022 to Office Action mailed Aug. 29, 2022", 34 pgs.
"Canadian Application Serial No. 3208736, Voluntary Amendment filed Mar. 18, 2024", 7 pgs.
"Chinese Application Serial No. 202080053739.2, Office Action mailed Nov. 29, 2023", w/ English Translation, 27 pgs.
"Chinese Application Serial No. 202080053751.3, Office Action mailed Feb. 27, 2024", w/ English translation, 29 pgs.
"Chinese Application Serial No. 202080053751.3, Office Action mailed Mar. 9, 2023", W/English Translation, 31 pgs.
"Chinese Application Serial No. 202080053751.3, Office Action mailed Sep. 14, 2023", w/ English Translation, 26 pgs.
"Chinese Application Serial No. 202080053751.3, Response filed Aug. 3, 2023 to Office Action mailed Mar. 9, 2023", w/ English claims, 11 pgs.
"Chinese Application Serial No. 202080053751.3, Response filed Dec. 26, 2023 to Office Action mailed Sep. 14, 2023", w/ English claims, 13 pgs.
"Enpurion EC-Electrocoagulation", enpurion https://enpurion.com/empurion-ec/, (Accessed on Feb. 9, 2021), 4 pgs.
"European Application Serial No. 20821949.3, Extended European Search Report mailed May 24, 2023", 11 pgs.
"European Application Serial No. 20821949.3, Response filed Dec. 5, 2023 to Extended European Search Report mailed May 24, 2023", 18 pgs.
"European Application Serial No. 20822476.6, Extended European Search Report mailed May 24, 2023", 10 pgs.
"European Application Serial No. 20822476.6, Response filed Dec. 5, 2023 to Extended European Search Report mailed May 24, 2023", 18 pgs.
"European Application Serial No. 20822476.6, Response to Communication pursuant to Rules 161(2) and 162 EPC filed Sep. 1, 2022", 24 pgs.
"European Application Serial No. 20821949.3, Response filed Mar. 31, 2022 to Communication Pursuant to Rules 161(1) & 162 EPC mailed", 11 pgs.
"International Application Serial No. PCT/US2020/037405, International Preliminary Report on Patentability mailed Dec. 23, 2021", 11 pgs.
"International Application Serial No. PCT/US2020/037405, International Search Report mailed Sep. 14, 2020", 2 pgs.
"International Application Serial No. PCT/US2020/037405, Written Opinion mailed Sep. 14, 2020", 9 pgs.
"International Application Serial No. PCT/US2020/037407, International Preliminary Report on Patentability mailed Dec. 23, 2021", 10 pgs.
"International Application Serial No. PCT/US2020/037407, International Search Report mailed Sep. 16, 2020", 2 pgs.

"International Application Serial No. PCT/US2020/037407, Written Opinion mailed Sep. 16, 2020", 8 pgs.
"International Application Serial No. PCT/US2021/064124, International Preliminary Report on Patentability mailed Sep. 14, 2023", 9 pgs.
"International Application Serial No. PCT/US2021/064124, International Search Report mailed Aug. 17, 2022", 2 pgs.
"International Application Serial No. PCT/US2021/064124, Written Opinion mailed Aug. 17, 2022", 7 pgs.
"International Application Serial No. PCT/US2022/051651, International Search Report mailed Mar. 28, 2023", 2 pgs.
"International Application Serial No. PCT/US2022/051651, Written Opinion mailed Mar. 28, 2023", 5 pgs.
"International Application Serial No. PCT/US2023/019295, International Search Report mailed Jul. 21, 2023", 2 pgs.
"International Application Serial No. PCT/US2023/019295, Written Opinion mailed Jul. 21, 2023", 9 pgs.
"International Application Serial No. PCT/US2023/025390, International Search Report mailed Sep. 20, 2023", 2 pgs.
"International Application Serial No. PCT/US2023/025390, Written Opinion mailed Sep. 20, 2023", 6 pgs.
"Japanese Application Serial No. 2021-573824, Final Notification of Reasons for Refusal mailed Apr. 4, 2023", w/ English Translation, 10 pgs.
"Japanese Application Serial No. 2021-573824, Final Notification of Reasons for Refusal mailed Sep. 5, 2023", w/ English Translation, 14 pgs.
"Japanese Application Serial No. 2021-573824, Notification of Reasons for Refusal mailed Dec. 20, 2022", w/ English Translation, 11 pgs.
"Japanese Application Serial No. 2021-573824, Response filed Mar. 15, 2023 to Notification of Reasons for Refusal mailed Dec. 20, 2022", w/ English claims, 9 pgs.
"Japanese Application Serial No. 2021-573824, Response filed Jul. 3, 2023 to Final Notification of Reasons for Refusal mailed Apr. 4, 2023", w/ English claims, 10 pgs.
"Japanese Application Serial No. 2021-573824, Response filed Dec. 1, 2023 to Final Notification of Reasons for Refusal mailed Sep. 5, 2023", W/English Claims, 9 pgs.
"Japanese Application Serial No. 2021573769, Notification of Reasons for Refusal filed Oct. 4, 2022", w/ English Translation, 6 pgs.
"Japanese Application Serial No. 2021573769, Response filed Dec. 22, 2022 to Notification of Reasons for Refusal filed Oct. 4, 2022", w/ English claims, 14 pgs.
"Ship Corrosion Protection Technology", Ha'erbin: Harbin Engineering University Press Abstract with English Translation, (Feb. 28, 2011), 10 pgs.
"Treatment Technologies for Per- and Polyfluoroalkyl Substances (PFAS)", Fact Sheet, (Sep. 2023), 4 pgs.
Al-Qodah, Zakaria, et al., "Combined electrocoagulation processes as a novel approach for enhanced pollutants removal: A state-of-the-art review", Science of the Total Environment 744, (2020), 14 pgs.
Bensadok, K, et al., "Electrocoagulation of cutting oil emulsions using aluminium plate electrodes", Journal of Hazardous Materials 152, (2008), 423-430.
Deng, Shubo, et al., "Removal of perfluorooctanoate from surface water by polyaluminium choloride coagulation", Water Research vol. 45 Issue 4 1774-1780, (Feb. 2011), 5 pgs.
Dina, T Moussa, et al., "A comprehensive review of electrocoagulation for water treatment: Potentials and challenges", Journal of Environmental Management 186, (2017), 24-41.
Garg, Shafali, et al., "Remediation of water from per-/poly-fluoroalkyl substances (PFAS)-Challenges and perspectives", Journal of Environmental Chemical Engineering 9, (2021), 25 pgs.
Gobbi, Lorena C.A., et al., "Electrocoagulation with polarity switch for fast oil removal from oil in water emulsions", Journal of Environmental Management 213, (2018), 119-125.
Govindan, Kadarkarai, et al., "Electrocoagulants Characteristics and Application of Electrocoagulation for Micropollutant Removal and Transformation Mechanism", ACS Appl Mater. Interfaces 12, (2020), 1775-1788.

(56) References Cited

OTHER PUBLICATIONS

Hubert, Michel, et al., "Per- and polyfluoroalkyl substance (PFAS) removal from soil washing water by coagulation and flocculation", Water Research 249, (2023), 10 pgs.

Jizhou, L, et al., "Pretreatment of dyestuff wastewater by internal microelectrolysis", International Conference on Electric Technology and Civil Engineering, (2011), 4 pgs.

Kabdasli, I, et al., "Electrocoagulation applications for industrial wastewaters: a critical review", Environmental Technology Reviews, (Nov. 6, 2012), 45 pgs.

Kekedy-Nagy, Laszlo, et al., "Electroless Production of Fertilizer (Struvite) and Hydrogen from Synthetic Agricultural Wastewaters", Journal of the American Chemical Society J. Am. Chem. Soc 142, (2020), 15 pgs.

Kuokkanen, Ville, et al., "Recent Applictions of Electrocoagulation in Treatment of Water and Wastewater—A Review", Green and Sustainable Chemistry, (Jan. 2013), 34 pgs.

Lu, Xinyu, et al., "Adsorption behavior and mechanism of perfluorooctane sulfonate on nanosized inorganic oxides", Journal of Colloid and Interface Science vol. 474 pp. 199-205, (Jul. 15, 2016), 6 pgs.

Luba, Mateusz, et al., "Electrochemical Degradation of Industrial Dyes in Wastewater through the Dissolution of Aluminum Sacrificial Anode of Cu/Al Macro-Corrosion Galvanic Cell", Molecules (18) 4108, (Sep. 25, 2020), 17 pgs.

Malik, Qasim H, "Performance of alum and assorted coagulants in turbidity removal of muddy water", Applied Water Science, (2018), 4 pgs.

Merino, Nancy, et al., "Degradation and Removal Methods for Perfluoroalky and Polyfluoroalkyl Substances in Water", Environmental Engineering Science vol. 33, No. 9, (Sep. 1, 2016), 60 pgs.

Peng, Shuai, et al., "Iron-carbon galvanic cells strengthened anaerobic/anoxic/oxicprocess(Fe/C-A2O) for high-nitrogen/phosphorus and low-carbon sewage treatment", Science of the Total Environment 722, (2020), 13 pgs.

Pierozynski, Boguslaw, "Electrochemical Degradation of Phenol and Resorcinol Molecules through the Dissolution of Sacrificial Anodes of Macro-Corrosion Galvanic Cells", Water 10:770, (2018), 10 pgs.

Wei, V, et al., "Nutrient removal in an electrically enhanced membrane Bioreactor", Water Science & Technology, vol. 60, No. 12, (Dec. 1, 2009), 3159-3163.

Xiao, Feng, et al., "Mechanisms for removal of perfluorooctane sulfonate (PFOS) and perfluorooctanoate (PFOA) from drinking water by conventional enhances coagulation", Water Research vol. 47, Issue 1 pp. 49-56, (Jan. 1, 2013), 6 pgs.

Zhang, D Q, et al., "Adsorption of perfluoroalkyl and polyfluoroalkyl substances (PFASs) from aqueous solution—A review", Science of the Total Environment 694, (2019), 19 pgs.

Zhang, Mingkun, et al., "Aluminum-based electrocoagulation for residual fluoride removal during per-and polyfluoroalkyl substances (PFASs) wastewater treatment", Separation and Purification Technology vol. 308, (Mar. 2023), 7 pgs.

Zhang, Zhiming, et al., "Adsorption of perfluorooctanoic acid (PFOA) and perfluorooctanesulfonic acid (PFOS) by aluminum-based drinking water treatment residuals", Journal of Hazardous Materials Letters, (2021), 6 pgs.

"European Application Serial No. 21929411.3, Response to Communication pursuant to Rules 161(2) and 162 EPC filed Apr. 5, 2024", 19 pgs.

"U.S. Appl. No. 17/533,522, Response filed Apr. 23, 2024 to Advisory Action mailed Mar. 8, 2024", 21 pgs.

"U.S. Appl. No. 17/838,361, Non Final Office Action mailed Apr. 24, 2024", 7 pgs.

"Chinese Application Serial No. 202180097592.1, Office Action mailed Apr. 2, 2024", W English Translation, 22 pgs.

"Canadian Application Serial No. 3,208,736, Examiners Rule 86(2) Requisition mailed May 6, 2024", 5 pgs.

"Canadian Application Serial No. 3,140,014, Response filed May 27, 2024 to Examiners Rule 86(2) Report mailed Feb. 9, 2024", 25 pgs.

"U.S. Appl. No. 17/838,361, Response filed Jun. 5, 2024 to Final Office Action mailed Apr. 24, 2024", 7 pgs.

"Canadian Application Serial No. 3,140,149, Response filed Jun. 7, 2024 to Examiners Rule 86(2) Report mailed Mar. 13, 2024", 38 pgs.

"International Application Serial No. PCT US2024 023323, Invitation to Pay Additional Fees mailed Jun. 14, 2024", 3 pgs.

"U.S. Appl. No. 18 628,020, Notice of Allowance mailed Jun. 20, 2024", 9 pgs.

"U.S. Appl. No. 17/530,907, Corrected Notice of Allowability mailed Oct. 1, 2024", 7 pgs.

"U.S. Appl. No. 17/530,907, Final Office Action mailed Jul. 15, 2024", 9 pgs.

"U.S. Appl. No. 17/530,907, Notice of Allowance mailed Sep. 24, 2024", 11 pgs.

"U.S. Appl. No. 17/530,907, Response filed Sep. 16, 2024 to Final Office Action mailed Jul. 15, 2024", 8 pgs.

"U.S. Appl. No. 17/533,522, Non Final Office Action mailed Jul. 10, 2024", 28 pgs.

"U.S. Appl. No. 17/554,229, Non Final Office Action mailed Sep. 18, 2024", 15 pgs.

"U.S. Appl. No. 17/838,361, Notice of Allowability mailed Aug. 30, 2024", 3 pgs.

"U.S. Appl. No. 17/838,361, Notice of Allowance mailed Aug. 16, 2024", 8 pgs.

"U.S. Appl. No. 18/371,603, Non Final Office Action mailed Aug. 27, 2024", 14 pgs.

"U.S. Appl. No. 18/628,020, Supplemental Notice of Allowability mailed Jul. 5, 2024", 2 pgs.

"Canadian Application Serial No. 3,208,736, Response filed Aug. 12, 2024 to Examiners Rule 86(2) Requisition mailed May 6, 2024", 17 pgs.

"Chinese Application Serial No. 202080053739.2, Office Action mailed Jun. 13, 24", W/English Translation, 11 pgs.

"Chinese Application Serial No. 202080053739.2, Response filed Aug. 13, 2024 to Office Action mailed Jun. 13, 2024", w/English claims, 11 pgs.

"Chinese Application Serial No. 202080053751.3, Office Action mailed May 29, 2024", W/English Translation, 23 pgs.

"Chinese Application Serial No. 202080053751.3, Response filed Apr. 29, 2024 to Office Action mailed Feb. 27, 2024", w/ English claims, 21 pgs.

"Chinese Application Serial No. 202180097592.1, Office Action mailed Sep. 10, 2024", w/ English Translation, 13 pgs.

"Chinese Application Serial No. 202180097592.1, Response filed Aug. 1, 2024 to Office Action mailed Apr. 2, 2024", w/ current English claims, 8 pgs.

"European Application Serial No. 21929411.3, Communication pursuant to Rule 164(1) EPC mailed Sep. 11, 2024", 18 pgs.

"International Application Serial No. PCT/US2022/051651, International Preliminary Report on Patentability mailed Jun. 27, 2024", 7 pgs.

"International Application Serial No. PCT/US2024/023295, International Search Report mailed Jul. 17, 2024", 2 pgs.

"International Application Serial No. PCT/US2024/023295, Written Opinion mailed Jul. 17, 2024", 6 pgs.

"International Application Serial No. PCT/US2024/023323, International Search Report mailed Aug. 27, 2024", 5 pgs.

"International Application Serial No. PCT/US2024/023323, Written Opinion mailed Aug. 27, 2024", 7 pgs.

"Japanese Application Serial No. 2023-553408, Notification of Reasons for Rejection mailed Jul. 23, 2024", W/English Translation, 10 pgs.

Wang, Fei, "Adsorption behavior of perfluorooctanesulfonate (PFOS) and perfluorooctanoate (PFOA) on boehmit", Chemosphere 89 1009-1014, (2012), 6 pgs.

"Canadian Application Serial No. 3,140,014, Office Action mailed Oct. 1, 2024", 3 pgs.

"U.S. Appl. No. 17/533,522, Response filed Oct. 4, 2024 to Non Final Office Action mailed Jul. 10, 2024", 21 pgs.

(56) References Cited

OTHER PUBLICATIONS

"U.S. Appl. No. 17/530,907, Supplemental Notice of Allowability mailed Oct. 9, 2024", 3 pgs.

"Japanese Application Serial No. 2023-553408, Response filed Oct. 23, 2024 to Notification of Reasons for Rejection mailed Jul. 23, 2024", W English Claims, 11 pgs.

"European Application Serial No. 20821949.3, Communication Pursuant to Article 94(3) EPC mailed Oct. 25, 2024", 8 pgs.

"Australian Application Serial No. 2021430769, Response filed Oct. 28, 2024 to First Examination Report mailed Mar. 22, 2024", 136 pgs.

"International Application Serial No. PCT US2023 019295, International Preliminary Report on Patentability mailed Oct. 31, 2024", 11 pgs.

"Chinese Application Serial No. 202180097592.1, Response filed Oct. 31, 2024 to Office Action mailed Sep. 10, 2024", w current English claims, 14 pgs.

"U.S. Appl. No. 18/371,603, Response filed Nov. 7, 2024 to Non Final Office Action mailed Aug. 27, 2024", 14 pgs.

"Australian Application Serial No. 2021430769, Subsequent Examination Report mailed Nov. 4, 2024", 3 pgs.

"Chinese Application Serial No. 202080053751.3, Decision of Rejection mailed Oct. 25, 2024", w English translation, 29 pgs.

"Chinese Application Serial No. 202080053751.3, Response filed Sep. 29, 2024 to Office Action mailed May 29, 2024", w English claims, 13 pgs.

"U.S. Appl. No. 17/554,229, Response filed Dec. 16, 2024 to Non Final Office Action mailed Sep. 18, 2024", 13 pgs.

"Canadian Application Serial No. 3,140,149, Office Action mailed Dec. 2, 2024", 4 pgs.

"European Application Serial No. 21929411.3, Extended European Search Report mailed Dec. 3, 2024", 19 pgs.

"Chinese Application Serial No. 202180097592.1, Decision of Rejection mailed Nov. 26, 2024", w English Translation, 14 pgs.

TREATMENT OF AQUEOUS COMPOSITION WITH METAL COMPONENT

CROSS-REFERENCE TO RELATED APPLICATIONS

This application claims the benefit of priority to U.S. Provisional Patent Application Ser. No. 63/457,215 filed Apr. 5, 2023, U.S. Provisional Patent Application Ser. No. 63/470,046 filed May 31, 2023, U.S. Provisional Patent Application Ser. No. 63/544,328 filed Oct. 16, 2023, and U.S. Provisional Patent Application Ser. No. 63/604,373 filed Nov. 30, 2023, the disclosures of which are incorporated herein in its entirety by reference.

BACKGROUND

Removal of contaminants and/or emulsions from water is a common need under a wide variety of circumstances, such as for treatment of contaminated natural water or industrially-produced water. However, conventional techniques for treatment of water, such as to remove phosphorus, perfluoroalkyl or polyfluoroalkyl substances (PFASs), emulsions, and the like, suffer from problems of inefficiency, ineffectiveness, lack of versatility, high expense, and complex implementation.

SUMMARY OF THE INVENTION

In various aspects, the present invention provides a method of treating feed water. The method includes adding a metal component including a metal to the feed water to form a clarified aqueous composition. The metal component includes an ion of the metal, a solid or dissolved compound of the metal, an elemental form of the metal, or a combination thereof.

In various aspects, the present invention provides a method of treating feed water. The method includes adding a metal component to the feed water including a fluoroalkyl compound to form a solid that includes the fluoroalkyl compound from the feed water. The method also includes removing the solid from the feed water to form a clarified aqueous composition, wherein the clarified aqueous composition has a lower concentration of the fluoroalkyl compound than the feed water.

In various aspects, the present invention provides a method of treating feed water. The method includes adding a metal component to the feed water including phosphorus to form a solid that includes a salt that includes the phosphorus from the feed water. The method also includes removing the solid from the feed water to form a clarified aqueous composition, wherein the clarified aqueous composition has a lower concentration of phosphorus than the feed water.

In various aspects, the present invention provides a method of treating feed water. The method includes adding a metal component to the feed water including phosphorus to form a solid including phosphorus from the feed water. The method includes removing the solid from the feed water to form a clarified aqueous composition including phosphorus, wherein the clarified aqueous composition has a lower concentration of phosphorus than the feed water. The method includes treating the clarified aqueous composition with a galvanic cell to form a galvanically precipitated and/or flocculated solid including phosphorus from the clarified aqueous composition. The method also includes removing the galvanically precipitated and/or flocculated solid from the clarified aqueous composition, to form a product water having a lower concentration of phosphorus than the clarified aqueous composition.

In various aspects, the present invention provides a method of treating feed water. The method includes adding a metal component to feed water to form a clarified aqueous composition. The method also includes treating the clarified aqueous composition with a galvanic cell to form a product water.

In various aspects, the present invention provides a method of treating feed water. The method includes adding a metal component to feed water to form a clarified aqueous composition. The method also includes treating the clarified aqueous composition with a galvanic cell to form a product water, wherein the product water has a reduced emulsion, decreased turbidity, or a combination thereof, as compared to the feed water.

In various aspects, the present invention provides a method of treating feed water. The method includes adding a metal component to feed water to form a solid. The method includes removing the solid from the feed water to form a clarified aqueous composition. The method includes treating the clarified aqueous composition with a galvanic cell to form a galvanically precipitated and/or flocculated solid. The method also includes removing the galvanically precipitated and/or flocculated solid from the clarified aqueous composition, to form a product water.

In various aspects, the present invention provides a method of treating feed water. The method includes adding a metal component to feed water to form a solid. The method includes removing the solid from the feed water to form a clarified aqueous composition. The method includes treating the clarified aqueous composition with a galvanic cell to form a galvanically precipitated and/or flocculated solid. The method includes removing the galvanically precipitated and/or flocculated solid from the clarified aqueous composition, to form a product water, wherein as compared to the feed water, the product water has a decreased concentration of one or more organic compounds, a decreased concentration of one or more inorganic compounds, a decreased concentration of one or more dyes and/or inks, a decreased concentration of one or more metals, a decreased concentration of one or more heavy metals, a decreased concentration of one or more toxic compounds and/or materials, a decreased concentration of phosphorus, a decreased concentration of a fluoroalkyl compound, a decreased concentration of sulfide, a decreased concentration of arsenic, a decreased concentration of silica, a reduced chemical oxygen demand (COD), or a combination thereof.

Various aspects of the present invention provide a method of treating feed water. The method includes performing a treatment including adding a metal component including aluminum to feed water including a fluoroalkyl compound to form a solid including a metal component-treated fluoroalkyl compound. The metal component includes an ion of the aluminum, a solid or dissolved compound of the aluminum, an elemental form of the aluminum, or a combination thereof. The method includes removing the solid from the feed water to form a clarified aqueous composition having a lower concentration of the fluoroalkyl compound than the feed water and to form an aqueous concentrate having a higher concentration of the solid than the clarified aqueous composition. The method includes acidifying the aqueous concentrate. The method includes performing a secondary separation to separate a residual solution from the aqueous concentrate after the acidification and to concentrate the metal component-treated fluoroalkyl compound in the aqueous concentrate. The method also includes adding the metal component from the residual solution to the feed water prior to or during the treatment.

Various aspects of the present invention provide a method of treating feed water. The method includes performing a treatment including adding a metal component including aluminum to feed water including a fluoroalkyl compound to form a solid including a metal component-treated fluoroalkyl compound. The method includes removing the solid from the feed water to form a clarified aqueous composition having a lower concentration of the fluoroalkyl compound than the feed water and to form an aqueous concentrate having a higher concentration of the solid than the clarified aqueous composition. The method includes acidifying the aqueous concentrate. The method includes performing a secondary separation to separate a residual solution from the aqueous concentrate after the acidification and to concentrate the metal component-treated fluoroalkyl compound in the aqueous concentrate. The method includes purging one or more acidification contaminants from the liquid including the metal component. The method also includes adding the metal component from the liquid including the metal component to the feed water prior to or during the treatment.

Various aspects of the present invention provide a method of treating feed water. The method includes performing a treatment including adding an aluminum ion and/or aluminum hydroxide to feed water including a fluoroalkyl compound to form a solid including a metal component-treated fluoroalkyl compound. The method includes removing the solid from the feed water to form a clarified aqueous composition having a lower concentration of the fluoroalkyl compound than the feed water and to form an aqueous concentrate having a higher concentration of the solid than the clarified aqueous composition. The method includes acidifying the aqueous concentrate. The method includes destroying the metal component-treated fluoroalkyl compound in the aqueous concentrate to form a liquid including the aluminum ion and/or aluminum hydroxide. The method includes purging one or more acidification contaminants from the liquid including the aluminum ion and/or aluminum hydroxide. The method also includes recycling the aluminum ion and/or aluminum hydroxide including combining the feed water and the liquid including the aluminum ion and/or aluminum hydroxide prior to or during the treatment.

Various aspects of the method of the present invention provide certain advantages over other methods of treating water. For example, in various aspects, the method of the present invention can remove emulsions, turbidity, various contaminants, or a combination thereof, from water more efficiently and/or effectively than other methods. In various aspects, the method of the present invention can remove multiple contaminants in fewer steps and with greater efficiency than other methods.

Various aspects of the method of the present invention include recovering the metal component added to the feed water, recovering a metal component generated by the anode of the galvanic cell, or a combination thereof, and reusing the recovered metal component as the metal component added to the feed water. Addition and/or recycling of the metal component can enhance the efficiency of the method, can decrease a rate of degradation of electrodes in the galvanic cell, can decrease overall costs, can increase the overall efficiency of the process, or a combination thereof.

Various aspects of the present method include performing a secondary separation after acidification of the aqueous concentrate to separate a residual solution from the aqueous concentrate and thereby concentrate the galvanic cell-treated fluoroalkyl compound in the aqueous concentrate. By concentrating the galvanic cell-treated fluoroalkyl compound, the volume of water produced containing the galvanic cell-treated fluoroalkyl compound is decreased, enabling later processes for destruction of the galvanic cell-treated fluoroalkyl compound to process a smaller overall quantity of water to destroy the same amount of galvanic cell-treated fluoroalkyl compound and thereby be more efficient.

Various aspects of the present method can include purging acidification contaminants prior to recycling the metal component back to the contaminated water. By removing acidification contaminants, the build-up of the acidification contaminants in the recycle loop of the system can be decreased or entirely avoided.

BRIEF DESCRIPTION OF THE FIGURES

The drawings illustrate generally, by way of example, but not by way of limitation, various aspects of the present invention.

DETAILED DESCRIPTION OF THE INVENTION

Figure 1:
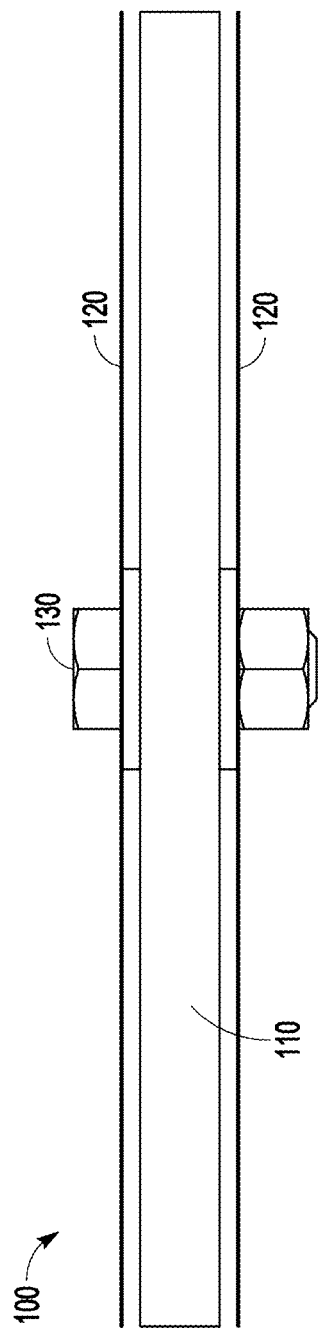
FIG. 1 illustrates a side-view of a galvanic cell including an anode that is a plate or strip, two cathodes that are screens, and a conductive connector maintaining a gap therebetween, in accordance with various aspects.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in a specific order as recited herein. Alternatively, in any aspect(s) disclosed herein, specific acts may be carried out in any order without departing from the principles of the invention, except when a temporal or operational sequence is explicitly recited. Furthermore, specified acts can be carried out concurrently unless explicit claim language recites that they be carried out separately or the plain meaning of the claims would require it. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

All concentrations of phosphorus, magnesium, and aluminum referred to are dissolved concentrations of these materials in elemental or non-elemental (e.g., as a compound or ion including the material) forms, unless otherwise indicated. All concentrations given herein are by weight unless otherwise indicated.

As used herein, "total phosphorus concentration" refers to the concentration of all forms of phosphorus, as measured by US-EPA 365.1: Determination of Phosphorus by Semi-Automated Colorimetry or equivalent, unless otherwise indicated.

As used herein, "dissolved phosphorus concentration" refers to the concentration of all forms of phosphorus passable though a 0.45 micron filter and as measured by US-EPA 365.1: Determination of Phosphorus by Semi-Automated Colorimetry or equivalent, unless otherwise indicated.

As used herein, "reactive phosphorus concentration" refers to the soluble reactive phosphorus in solution (e.g., orthophosphate) as measured by US-EPA 365.1: Determination of Phosphorus by Semi-Automated Colorimetry or equivalent unless otherwise indicated.

Method of Treating Feed Water.

In various aspects, the present invention provides a method of treating feed water. The method can include adding a metal component including a metal to the feed water to form a clarified composition. The metal component can include an ion of the metal, a solid or dissolved compound of the metal, an elemental form of the metal, or a combination thereof.

The method can be a method of removing or decreasing an emulsion in the feed water, a method of decreasing turbidity of the feed water, or a combination thereof. For example, the feed water can include an emulsion, and the clarified aqueous composition can include no emulsion or can include a reduced emulsion compared to the feed water. In some examples, the clarified aqueous composition can have a lower turbidity than the feed water. The removal or decreasing of the emulsion or decreasing of turbidity in the feed water via addition of the metal component can be free of occurring within an electrochemical cell, such as an electrolytic cell or galvanic cell.

In various aspects, the addition of the metal component to the feed water can form a solid (e.g., a precipitated solid, a flocculated solid, a solid resulting from addition of a solid metal component such as aluminum hydroxide or another aluminum salt to the water such as via sorption of one or more contaminants therein/thereon, or a combination thereof). The addition of the metal component and the production of the solid can be free of occurring within an electrochemical cell, such as an electrolytic cell or galvanic cell. The method can further include removing the solid from the metal component-treated composition, to form the clarified aqueous composition. The removal of the solid from the metal component-treated composition can be performed in any suitable way, such as including filtration, gravity settling, decantation, centrifugation, desanding hydroclone, or a combination thereof. The method can be a method of coagulating and/or precipitating suspended solids from the feed water, removing or decreasing the concentration of one or more organic compounds in the feed water, removing or decreasing the concentration of one or more inorganic compounds in the feed water, removing or decreasing the concentration of one or more dyes and/or inks in the feed water, removing or decreasing the concentration of one or more metals in the feed water, removing or decreasing the concentration of one or more heavy metals in the feed water, removing or decreasing the concentration of one or more toxic compounds and/or materials in the feed water, removing or decreasing the concentration of phosphorus in the feed water, removing or decreasing the concentration of a fluoroalkyl compound in the feed water, removing or decreasing the concentration of fluoride in the feed water, removing or decreasing the concentration of sulfide in the feed water, removing or decreasing the concentration of arsenic in the feed water, reducing the chemical oxygen demand (COD) of the feed water, removing or decreasing the concentration of silica in the feed water (e.g., $SiO_3^{2-}$), or a combination thereof.

In various aspects, the feed water can include suspended solids, and the addition of the metal component to the feed water flocculates the suspended solids to form the flocculated solid. In various aspects, the addition of the metal component to the feed water forms the precipitated solid. In various aspects, the method can include flocculation of a precipitated solid formed from the addition of the metal component.

In various aspects, the feed water can include one or more organic compounds, and the clarified aqueous composition can have a lower concentration of the one or more organic compounds as compared to the feed water. In various aspects, the feed water can include one or more inorganic compounds, and the clarified aqueous composition can have a lower concentration of the one or more inorganic compounds as compared to the feed water.

In various aspects, the feed water can include one or more dyes and/or inks, and the clarified aqueous composition can have a lower concentration of the one or more dyes and/or inks as compared to the feed water. In various aspects, the feed water can include one or more metals, and the clarified aqueous composition can have a lower concentration of the one or more metals as compared to the feed water. In various aspects, the feed water can include one or more heavy metals, and the clarified aqueous composition can have a lower concentration of the one or more heavy metals as compared to the feed water. In various aspects, the feed water can include one or more toxic compounds and/or materials, and the clarified aqueous composition can have a lower concentration of the one or more toxic compounds and/or materials in the feed water. In various aspects, the feed water includes fluoride, and the aqueous composition has a lower concentration of fluoride as compared to the feed water. In various aspects, the feed water includes sulfide, and the aqueous composition has a lower concentration of sulfide as compared to the feed water. In various aspects, the feed water includes arsenic, and the aqueous composition has a lower concentration of arsenic as compared to the feed water. In various aspects, the feed water includes silica (e.g., $SiO_3^{2-}$), and the clarified aqueous composition has a lower concentration of silica as compared to the feed water. In various aspects, the clarified aqueous composition can have a lower chemical oxygen demand (COD) as compared to the feed water.

In various aspects, the feed water includes phosphorus, and the clarified aqueous composition has a lower concentration of phosphorus as compared to the feed water. For example, the solid (e.g., a precipitated solid, a flocculated solid, a solid resulting from addition of a solid including the metal component to the water such as via sorption of one or more contaminants therein/thereon, or a combination thereof) can include a salt that includes the phosphorus from the feed water, such that removal of the solid from the feed water results in removal of phosphorus from the feed water. In various aspects, the solid including phosphorus from the feed water is $AlPO_4$ or a hydrate thereof. The phosphorus in the feed water can be in any suitable form. For example, the phosphorus in the feed water can be in the form of elemental phosphorus, inorganic phosphorus, organic phosphorus, a dissolved form of phosphorus, a solid form of phosphorus, oxidized phosphorus, or a combination thereof. The feed water can have a total phosphorus concentration, a dissolved phosphorus concentration, a reactive phosphorus concentration, or a combination thereof, of about 0.001 ppm to about 10,000 ppm, about 0.01 ppm to about 20 ppm, or about 0.001 ppm or less, or less than, equal to, or greater than about 0.005 ppm, 0.01, 0.02, 0.04, 0.06, 0.08, 0.1, 0.15, 0.2, 0.4, 0.6, 0.8, 1, 2, 4, 6, 8, 10, 15, 20, 40, 60, 80, 100, 150, 200, 400, 600, 800, 1,000, 1,500, 2,000, 4,000, 6,000, 8,000, or 9,000 ppm. The clarified aqueous composition can have a total phosphorus concentration, a dissolved phosphorus concentration, a reactive phosphorus concentration, or a combination thereof, of about 0 ppm to about 10 ppm, or about 0 ppm to about 1 ppm, about 0.0001 ppm to about 0.1 ppm, or about 0 ppm, or less than or equal to about 10 ppm and greater than or equal to about 0 ppm and greater than, equal to, or greater than about 0.0001 ppm, 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, 1, 1.5, 2, 2.5, 3, 3.5, 4, 4.5, 5, 6, 7, 8, or about 9 ppm. The clarified aqueous composition can have a total phosphorus concentration, a dissolved phosphorus concentration, or a reactive phosphorus concentration that is about 0% to about 70% of a respective total, dissolved, or reactive phosphorus concentration of the feed water, or about 0% to about 20%, or less than or equal to about 70% and greater than or equal to about 0% and less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, or 65%.

In various aspects, the feed water can include a fluoroalkyl compound, and the clarified aqueous composition can have a lower concentration of the fluoroalkyl compound as compared to the feed water. The fluoroalkyl compound can be any suitable fluoroalkyl compound, such as a perfluoroalkyl or polyfluoroalkyl substance (PFAS), perfluoroalkyl substance, a polyfluoroalkyl substance, a perfluoroalkyl acid (PFAA), or a combination thereof. The fluoroalkyl compound can be perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof. The clarified aqueous composition can have a concentration of the fluoroalkyl compound that is 0% to 20% of the concentration of the fluoroalkyl compound in the feed water, or 0.001% to 5%, or less than or equal to about 20% and greater than or equal to about 0% and less than, equal to, or greater than about 0.001%, 0.005, 0.01, 0.05, 0.1, 0.5, 1, 2, 4, 6, 8, 10, or 15%. The feed water can have any suitable concentration of the one or more fluoroalkyl compounds, such as a concentration of 14 parts per trillion (ppt) or higher, or 4 ppt or higher, or 1 part per trillion (ppt) to 100 parts per million (ppm), 20 ppt to 1 ppm, or less than or equal to 100 ppm and greater than or equal to 1 ppt and less than, equal to, or greater than 2 ppt, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, 90, 100, 150, 200, 250, 300, 400, 500, 750, 1 ppm, 2, 4, 6, 8, 10, 15, 20, 25, 30, 35, 40, 45, 50, 60, 70, 80, or 90 ppm. The clarified aqueous composition can have a concentration of the fluoroalkyl compound that is 0.001 ppt to 100 ppt, 0.001 ppt to 15 ppt, or less than or equal to 100 ppt and greater than or equal to 0 ppt and less than, equal to, or greater than 1 ppt, 2, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, or 90 ppt.

The feed water to which the metal component is added can have any suitable pH, such as a pH of about 2 to about 14, about 5 to about 11, about 5 to about 7, about 10 to about 11, or less than or equal to about 14 and greater than or equal to about 2 and less than, equal to, or greater than about 2.5, 3, 3.5, 4, 4.5, 5, 5.5, 6, 6.5, 7, 7.5, 8, 8.5, 9, 9.5, 10, 10.5, 11, 11.5, 12, 12.5, 13, or 13.5. In various aspects, the method includes adding acid, base, or a combination thereof to the feed water before or during the addition of the metal component to the feed water in order to adjust the pH of the feed water. In other aspects, the method is free of pH adjustment of the feed water before and/or during addition of the metal component to the feed water.

In various aspects, the method can include adding one or more additives to the feed water in addition to the metal component. For example, the method can include adding a cationic polymer to the feed water to form a solid complex including a contaminant from the feed water (e.g., a fluoroalkyl compound) and the cationic polymer, wherein the cationic polymer is added before, during, or after the addition of the metal component to the feed water. The cationic polymer can be any suitable cationic polymer, such as a natural polymer, a synthetic polymer, a cationic polysaccharide, a gum, alginic acid, cellulose, a cellulose derivative, dextran, glycogen, a polyelectrolyte, a polymer including a quaternary ammonium group, poly(diallyl dimethyl ammonium chloride) (polyDADMAC), or a combination thereof.

In various aspects, the method can include adding an oxidizer to the feed water, such as prior to, during, or after addition of the metal component to the feed water. The oxidizer can be any suitable oxidizer, such as ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof. Adding the oxidizer to the feed water can include adding an aqueous solution of the oxidizer to the feed water, wherein the aqueous solution of the oxidizer has a concentration of the oxidizer of about 0.001 ppm to about 999,999 ppm, or about 50,000 ppm to about 140,000 ppm, or less than or equal to about 999,999 ppm and greater than or equal to about 0.001 ppm and less than, equal to, or greater than 0.001 ppm, 0.005, 0.01, 0.05, 0.1, 0.5, 1, 1.5, 2, 5, 10, 15, 20, 50, 100, 150, 200, 500, 1,000, 1,100, 1,200, 1,500, 2,000, 2,500, 5,000, 10,000, 15,000, 20,000, 50,000, 100,000, 150,000, 200,000, 500,000, 750,000, or 900,000 ppm.

The metal of the metal component added to the feed water can be any suitable one or more metals. For example, the metal can include Mg, Al, Fe, Zn, Cu, Cd, Cr, Hg, Ni, V, Ce, or a combination thereof. The metal can include Al (e.g., $Al^{3+}$). The metal can include Mg (e.g., $Mg^{2+}$). The metal component can be $Al^{3+}$ or a compound of aluminum such as aluminum chloride or aluminum hydroxide. The addition of the metal component to the feed water can include adding to the feed water a salt of the metal of the metal component. The salt of the metal can be any suitable salt, such as $AlCl_3$, $Al(OH)_3$, $AlPO_4$, $Al_2(SO_4)_3$, or a combination thereof. The addition of the metal component to the feed water can include adding an aqueous solution of a salt of the metal of the metal component to the feed water. The aqueous solution of the salt of the metal of the metal component can have any suitable concentration of the metal, such as a concentration of the metal of about 0.001 ppm to about 999,999 ppm, or about 50,000 ppm to about 140,000 ppm, or less than or equal to about 999,999 ppm and greater than or equal to about 0.001 ppm and less than, equal to, or greater than 0.001 ppm, 0.005, 0.01, 0.05, 0.1, 0.5, 1, 1.5, 2, 5, 10, 15, 20, 50, 100, 150, 200, 500, 1,000, 1,100, 1,200, 1,500, 2,000, 2,500, 5,000, 10,000, 15,000, 20,000, 50,000, 100,000, 150,000, 200,000, 500,000, 750,000, or 900,000 ppm. A volumetric ratio of the aqueous solution of the salt of the metal of the metal component added to the feed water can be any suitable ratio, such as a ratio of 5:1 to 1:1000, 1:1 to 1:100, or less than or equal to 5:1 and greater than or equal to 1:1000 or less than, equal to, or greater than 1:500, 1:200, 1:100, 1:50, 1:25, 1:10, 1:8, 1:6, 1:4, 1:2, 1:1, 2:1, 3:1, or 4:1. In various aspects, the metal of the metal component is produced by a galvanic or electrolytic cell (e.g., a galvanic or electrolytic cell that treats the clarified aqueous composition downstream of the addition of the metal ion, and/or a galvanic or electrolytic cell that is not part of a downstream treatment process), or the metal is produced by other than a galvanic or electrolytic cell (e.g., produced via direct addition of an aluminum salt to water, or via other means).

Various aspects of the present invention include reusing/recycling at least some metal of the metal component in the clarified aqueous composition, in a solid removed from the feed water, or a combination thereof, as the metal component that is added to the feed water. For example, the metal component in the clarified aqueous composition (if present), the metal component in the solid removed from the feed water, or a combination thereof, can be used as 1 wt % to 100 wt % of the metal component that is added to the feed water, or as less than or equal to 100 wt % and greater than or equal to 1 wt % and less than, equal to, or greater than 2 wt %, 4, 6, 8, 10, 15, 20, 25, 30, 35, 40, 45, 50, 55, 60, 65, 70, 75, 80, 82, 84, 86, 88, 90, 91, 92, 93, 94, 95, 96, 97, 98, or 99 wt %. The method can include reusing any suitable proportion of the metal component in the clarified aqueous composition (if present), in the solid removed from the feed water, or a combination thereof, as the metal component that is added to the feed water, such as 0.01 wt % to 100 wt % of metal component, 50 wt % to 100 wt %, or less than or equal to 100 wt % and greater than or equal to 0.01 wt % and less than, equal to, or greater than 0.05 wt %, 0.1, 0.5, 1, 2, 3, 4, 5, 6, 8, 10, 15, 20, 25, 30, 35, 40, 45, 50, 55, 60, 65, 70, 75, 80, 82, 84, 86, 88, 90, 91, 92, 93, 94, 95, 96, 97, 98, or 99 wt %.

The removing of the solid from the feed water can form the clarified aqueous composition having a lower concentration of the solid and form an aqueous concentrate having a higher concentration of the solid. The aqueous concentrate can include an extract, a foam, a filtration residue, a separated sediment, a slurry, a sludge, a wet precipitate, or a combination thereof. In various aspects, the aqueous concentrate includes the metal component added to the feed water, and the method includes reusing at least some of the metal of the metal component from the aqueous concentrate as at least some of the metal component that is added to the feed water. The method can include acidifying the aqueous concentrate to bring a pH thereof to 0.5 to 5, or less than or equal to 5 and greater than or equal to 0.5 and less than, equal to, or greater than 1, 1.5, 2, 2.5, 3, 3.5, 4, or 4.5. The acidifying can be sufficient to at least partially dissolve one or more salts in the feed water that include the metal of the metal component that was added to the feed water. The method can include removing solids from the acidified aqueous concentrate and reusing at least a portion of the dissolved metal component in the acidified aqueous concentrate having solids removed therefrom as the metal component that is added to the feed water. In various aspects, the method can further include adding a base to the acidified aqueous concentrate having solids removed therefrom to adjust the pH thereof prior to reusing the metal component by adding the composition to the feed water, such as to bring the pH of the composition to 3 to 10, or 3 to 6, or less than or equal to 10 and greater than or equal to 3 and less than, equal to, or greater than 3.5, 4, 4.5, 5, 5.5, 6, 6.5, 7, 7.5, 8, 8.5, 9, or 9.5.

In various aspects, the feed water and the aqueous concentrate include a fluoroalkyl compound, and the method further includes destroying the fluoroalkyl compound. Destroying the fluoroalkyl compound can be performed in any suitable way, such as including thermal treatment, treatment with an electrolytic cell, plasma reactor, supercritical water, combustion, chemical treatment (e.g., treatment with dimethylsulfoxide, acid, base, or a combination thereof, such as sulfuric acid, hydrochloric acid, or acid piranha solution, or such as potassium t-butoxide, sodium hydroxide, base piranha solution, or a combination thereof), or a combination thereof. Acid piranha solution can include a mixture of sulfuric acid and hydrogen peroxide, such as about 70% of 98% $H_2SO_4$ and about 30% of 30% $H_2O_2$. Basic piranha solution can include an approximately 3:1 mixture of ammonia solution (e.g., $NH_4OH$ and/or $NH_3$) and hydrogen peroxide. Destroying the fluoroalkyl compound in the aqueous concentrate can include destroying 60 wt % to 100 wt % of the fluoroalkyl compound in the aqueous concentrate, or 95 wt % to 100 wt %, or less than or equal to 100 wt % and greater than or equal to 60 wt % and less than, equal to, or greater than 65 wt %, 70, 75, 80, 82, 84, 86, 88, 90, 91, 92, 93, 94, 95, 96, 97, 98, or 99 wt %.

Destroying the fluoroalkyl compound in the aqueous concentrate can include thermal treatment. The thermal treatment can include heating to a treatment temperature of 1000° C. to 5000° C., or 1400° C. to 2000° C., or 1500° C. or higher, or less than or equal to 5000° C. and greater than or equal to 1000° C. and less than, equal to, or greater than 1100° C., 1200, 1300, 1400, 1450, 1500, 1550, 1600, 1650, 1700, 1750, 1800, 1850, 1900, 1950, 2000, 2250, 2500, 2750, 3000, 3500, 4000, or 4500° C. The thermal treatment can include maintaining the fluoroalkyl compound at the treatment temperature for a duration of 0.1 sec to 24 h, or less than or equal to 24 h and greater than or equal to 0.1 sec and less than, equal to, or greater than 0.5 sec, 1, 2, 4, 6, 10, 20, 30, 40, 50 sec, 1 min, 1.5, 2, 2.5, 3, 4, 5, 10, 15, 20, 30, 40, 50 min, 1 h, 1.5, 2, 3, 4, 5, 6, 8, 10, 12, 14, 16, 18, 20, or 22 h.

Destroying the fluoroalkyl compound can include treatment with an electrolytic cell including an electrolytic anode and an electrolytic cathode. Treatment with the electrolytic cell can include adding water to the aqueous concentrate. Treatment with the electrolytic cell and include, prior to or during electrolytic treatment, acidifying the aqueous concentrate that the pH is 0.5 to 5, or or less than or equal to 5 and greater than or equal to 0.5 and less than, equal to, or greater than 1, 1.5, 2, 2.5, 3, 3.5, 4, or 4.5. The acidification can be sufficient to dissolve a metal component (e.g., an aluminum ion and/or aluminum hydroxide) in the aqueous concentrate. Treatment with the electrolytic cell can form an electrolytically-treated composition including a solid and a liquid. The liquid can include the metal component added to the feed water, and the method can further include separating the liquid and the solid and reusing at least a portion of the metal component as at least a portion of the metal component that is added to the feed water in the method. The metal component can be an aluminum ion and/or aluminum hydroxide, the liquid can include an aluminum ion and/or aluminum hydroxide, and the method can include separating the liquid and the solid and recycling the aluminum ion including combining the feed water and the liquid including the aluminum ion and/or aluminum hydroxide. In various aspects, the method can include adjusting the pH of the liquid including the aluminum ion and/or aluminum hydroxide prior to combining with the feed water, such as by adding a base so that the pH is adjusted to 3 to 6, or 5.5 to 8, or less than or equal to 10 and greater than or equal to 3 and less than, equal to, or greater than 3.5, 4, 4.5, 5, 5.5, 6, 6.5, 7, 7.5, 8, 8.5, 9, or 9.5 . . . . The method can include filtering the filtering the liquid including the aluminum having base added thereto prior to adding the liquid to the feed water.

The electrolytic treatment can include any suitable electrolytic treatment that destroys the fluoroalkyl compound. The method can include treating the aqueous concentrate with the electrolytic cell for a duration of 1 sec to 24 h, or 50 min to 200 min, or less than or equal to 24 h and greater than or equal to 1 sec and less than, equal to, or greater than 0.5 sec, 1, 2, 4, 6, 10, 20, 30, 40, 50 sec, 1 min, 1.5, 2, 2.5, 3, 4, 5, 10, 15, 20, 30, 40, 50, 60, 70, 80, 90, 100, 110, 120, 130, 140, 150, 160, 170, 180, 190, 200 min, 4 h, 5, 6, 8, 10, 12, 14, 16, 18, 20, or 22 h. The electrolytic anode can include an anode material including a metal oxide, a transition metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof. For example, the electrolytic anode can include $RuO_2$ and $IrO_2$, or can include $PbO_2$ and $Bi_2O_3$, or can include $IrO_2$, $RuO_2$, $PtO_2$, and $Rh_2O_3$. The electrolytic anode can be formed entirely of the anode material (e.g., and is free of catalyst coatings) or the electrolytic anode can include a coating or deposition of the anode material (e.g., as a catalyst coating) on a suitable substrate such as titanium, stainless steel, carbon steel, carbon (e.g., BDD, graphite, graphene, or a combination thereof), or a combination thereof. The catalyst coating can be on one major face of the electrolytic anode or on both major faces. The electrolytic cathode can include stainless steel, titanium, carbon (e.g., BDD, graphite, graphene, or a combination thereof), carbon steel, a precious metal, platinum, nickel, iron, copper, silver, or a combination thereof. The electrolytic cathode can be formed entirely of the cathode material (e.g., and is free of catalyst coatings) or the electrolytic cathode can include a coating of the cathode material (e.g., as a catalyst coating) on a suitable substrate, such as on a substrate that is titanium, stainless steel, carbon steel, Pt, Ni, Fe, Cu, Ag, carbon, or a combination thereof. The catalyst coating can be on one major face of the electrolytic cathode or on both major faces. The treatment with the electrolytic cell can include applying a voltage across the electrolytic anode and the electrolytic cathode sufficient to generate a current density in the electrolytic cell of 5-500 $mA/cm^2$, or 10-40 $mA/cm^2$, or less than or equal to 500 $mA/cm^2$ and greater than or equal to 5 $mA/cm^2$ and less than, equal to, or greater than 10, 15, 20, 25, 30, 35, 40, 50, 60, 80, 100, 120, 140, 160, 180, 200, 220, 240, 260, 280, 300, 350, 400, or 450 $mA/cm^2$. The treatment with the electrolytic cell can further including adding an additive to the aqueous concentrate before or during treatment with the electrolytic cell. The additive can include $H_2SO_4$, HCl, $K_2SO_4$, $Na_2SO_4$, $Na_2S_2O_8$, $KHSO_5$, $H_2O_2$, NaCl, KCl, or a combination thereof.

The destroying the fluoroalkyl compound can include treatment with a plurality of the electrolytic cells. The plurality of the electrolytic cells can include 2 to 1,000 of the electrolytic cells, such as 2 of the electrolytic cells, or 3, 4, 5, 6, 7, 8, 9, 10, 11, 12, 13, 14, 15, 16, 17, 18, 19, or 20 or more of the electrolytic cells.

The electrolytic anode, electrolytic cathode, and bipolar electrodes can be a first electrolytic anode, a first electrolytic cathode, and first bipolar electrodes, wherein the destroying the fluoroalkyl compound can further include treatment with a second electrolytic cell including the first electrolytic cathode, one or more second bipolar electrodes, and a second electrolytic anode, wherein the second bipolar electrodes are between the first electrolytic cathode and the second electrolytic anode. The destroying the fluoroalkyl compound can further include treatment with a third electrolytic cell including the second electrolytic anode, one or more third bipolar electrodes, and a second electrolytic cathode.

The electrolytic anode, electrolytic cathode, and bipolar electrodes can be a first electrolytic anode, a first electrolytic cathode, and first bipolar electrodes, wherein the destroying the fluoroalkyl compound can further include treatment with a second electrolytic cell including the first electrolytic anode, one or more second bipolar electrodes, and a second electrolytic cathode, wherein the second bipolar electrodes are between the first electrolytic anode and the second electrolytic cathode. The destroying the fluoroalkyl compound can further include treatment with a third electrolytic cell including the second electrolytic cathode, one or more third bipolar electrodes, and a second electrolytic anode.

Figure 4:
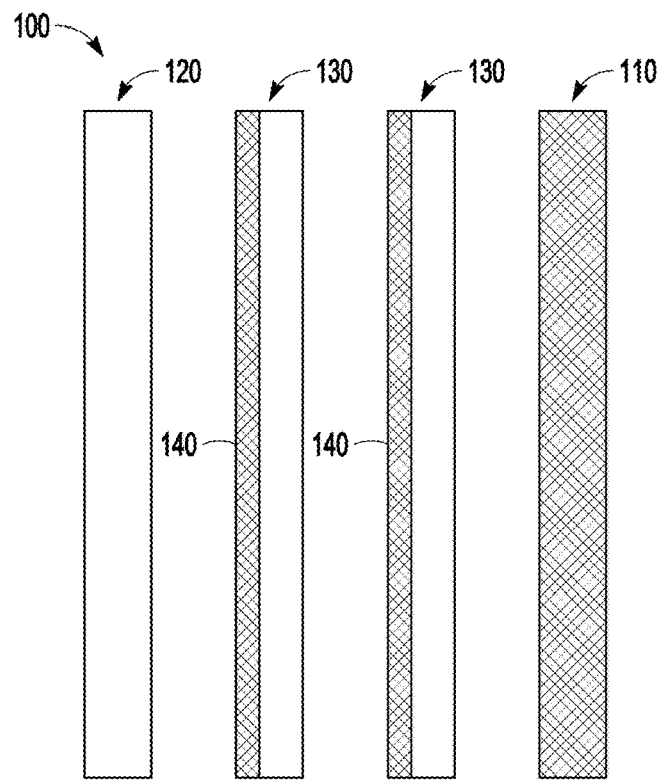
FIG. 4 illustrates an electrolytic cell, in accordance with various aspects of the present invention.

FIG. 4 illustrates an electrolytic cell 100 for destroying the fluoroalkyl compound. The electrolytic cell includes an electrolytic anode plate 110. The electrolytic cell includes an electrolytic cathode plate 120. The electrolytic anode plate includes a catalyst coating. The electrolytic cell includes two bipolar plates 130 that are positioned between the electrolytic anode plate 110 and the electrolytic cathode plate 120. The two bipolar plates 130 each include a catalyst coating on one major face thereof 140 that is facing the electrolytic cathode plate 120.

Figure 5:
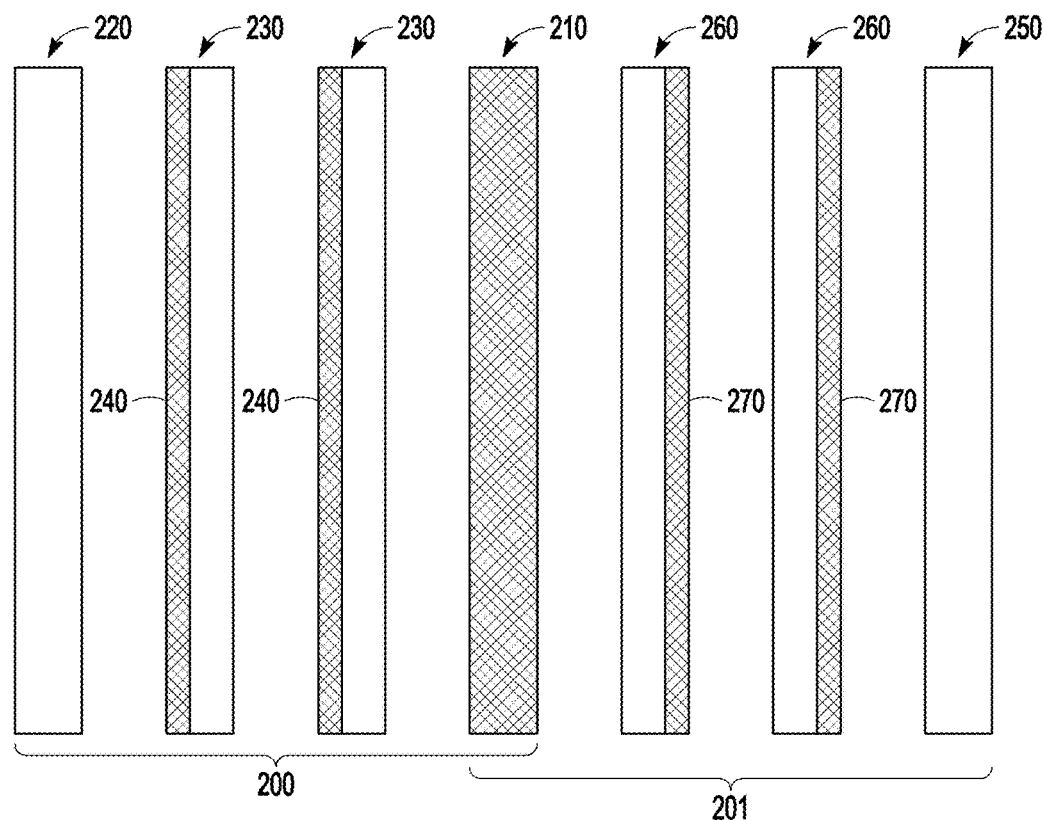
FIG. 5 illustrates two electrolytic cells, in accordance with various aspects of the present invention.

FIG. 5 illustrates two electrolytic cells include a first electrolytic cell 200 and a second electrolytic cell 201 for destroying the fluoroalkyl compound. The first electrolytic cell 200 includes a first electrolytic cathode plate 220, a first electrolytic anode plate 210, and two first bipolar plates 230 positioned between the first electrolytic cathode plate 220 and the first electrolytic anode plate 210. The first electrolytic anode plate 210 includes a catalyst coating. The two first bipolar plates 230 includes a catalyst coating on one major face thereof 240 that is facing the first electrolytic cathode plate 220. The second electrolytic cell 201 includes the first electrolytic anode plate 210, a second electrolytic cathode plate 250, and two second bipolar plates 260. The two second bipolar plates 260 each include a catalyst coating on one major face thereof 270 that is facing the second electrolytic cathode plate 250.

Figure 6:
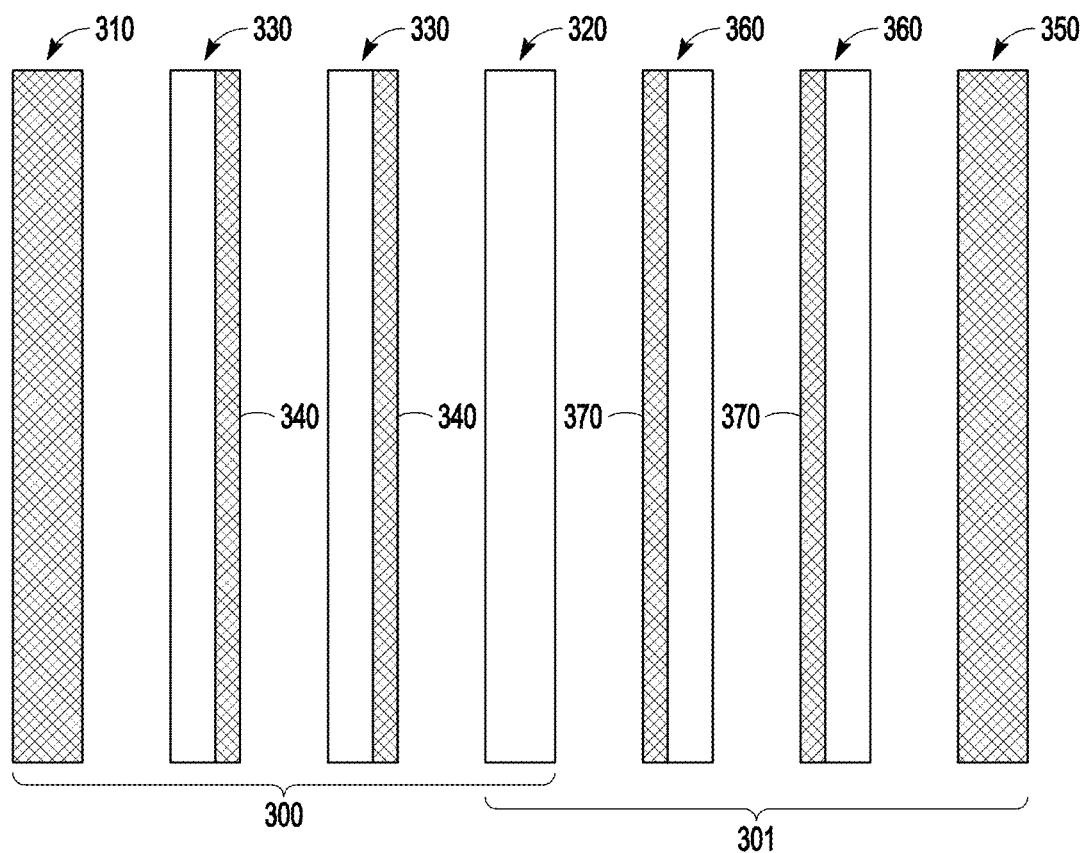
FIG. 6 illustrates two electrolytic cells, in accordance with various aspects of the present invention.

FIG. 6 illustrates two electrolytic cells including a first electrolytic cell 300 and a second electrolytic cell 301 for destroying the fluoroalkyl compound. The first electrolytic cell 300 includes a first electrolytic anode plate 310, a first electrolytic cathode plate 320, and two first bipolar plates 330 positioned between the first anode plate 310 and the first electrolytic cathode plate 320. The first electrolytic anode plate 310 includes a catalyst coating. The two first bipolar plates 330 include a catalyst coating on one major face thereof 340 that is facing the first electrolytic cathode plate 320. The second electrolytic cell 301 includes the first electrolytic cathode plate 320, a second electrolytic anode plate 350, and two second bipolar plates 360. The second bipolar plates 360 are between the first electrolytic cathode plate 320 and the second electrolytic anode plate 350. The second electrolytic anode plate 350 includes a catalyst coating. The second bipolar plates 330 each include a catalyst coating on one major face thereof 370 that is facing the first electrolytic cathode plate 320.

Figure 7:
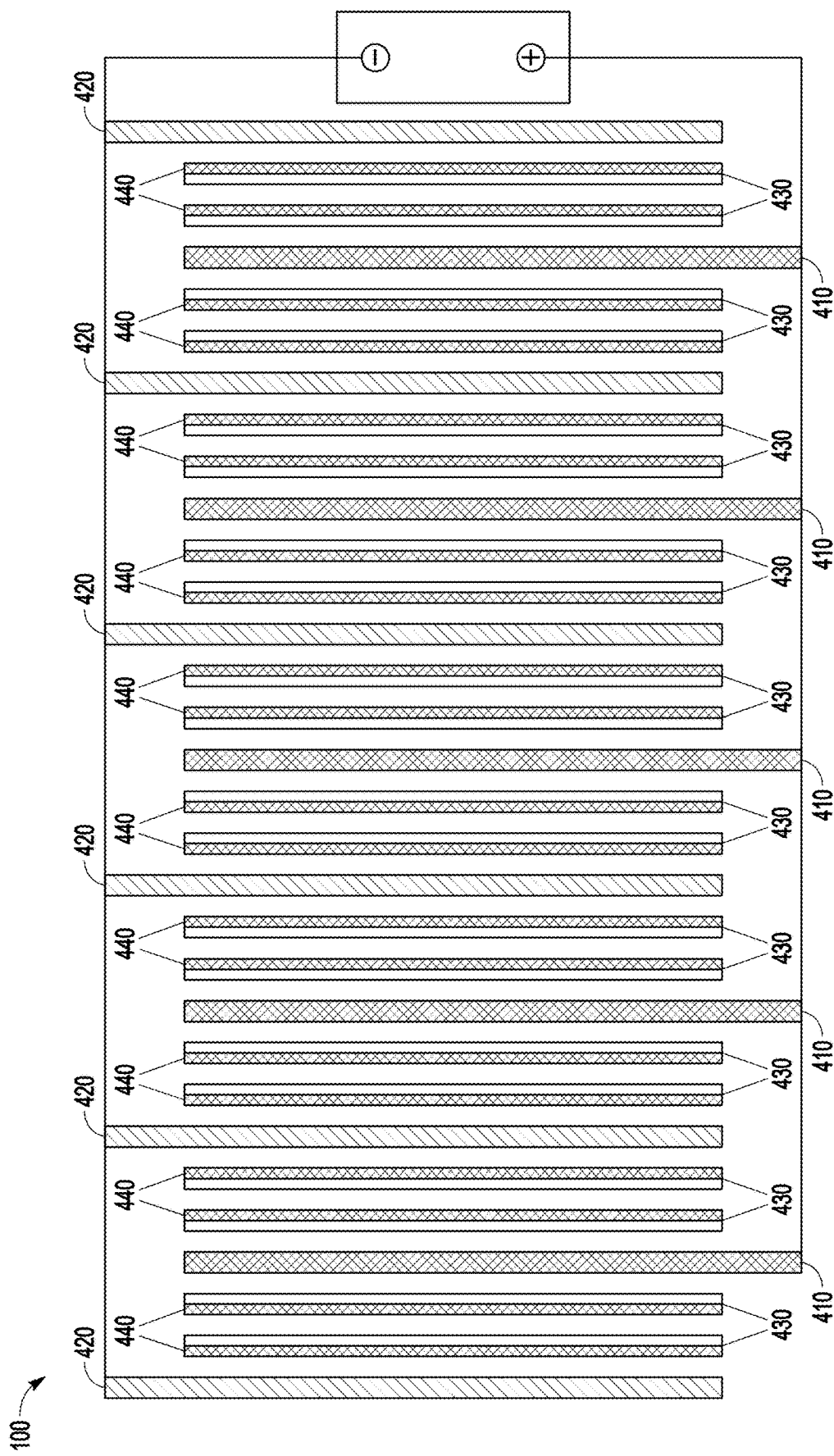
FIG. 7 illustrates a plurality of electrolytic cells, in accordance with various aspects of the present invention.

FIG. 7 illustrates a plurality of electrolytic cells 400 for destroying the fluoroalkyl compound. Each electrolytic cell includes an electrolytic anode 410, an electrolytic cathode 420, and two bipolar plates 430. The electrolytic anode 410 includes a catalyst coating. The bipolar plates each include a catalyst coating on a major face thereof 440 that faces the nearest electrolytic cathode 420. FIG. 7 illustrates 10 electrolytic cells.

In various aspects, the method includes, after forming the aqueous concentrate and the clarified aqueous composition, removing water from the aqueous concentrate. The removal of water from the aqueous concentrate can form a dried contaminant composition including the fluoroalkyl compound. The method can further include destroying the fluoroalkyl compound in the aqueous concentrate including destroying the fluoroalkyl compound in the dried contaminant composition.

In various aspects, the feed water includes a fluoroalkyl compound, and the feed water having the metal component added thereto includes a foam that includes a fluoroalkyl compound. The foam can have a higher concentration of the fluoroalkyl water than the remainder of the feed water (e.g., than the feed water on which the foam floats). The foam can include bubbles added to the solution with a bubbler. The bubbles can include any suitable one or more gases, such as air, an inert gas, nitrogen, hydrogen, a noble gas, helium, argon, xenon, or a combination thereof. The method can further include removing the foam from the feed water to form the clarified aqueous composition, wherein the aqueous concentrate includes the foam. Removing the foam can be performed in any suitable way, such as including scraping the foam from the top of the feed water, scooping the foam from the top of the feed water, sucking the foam from the top of the feed water, filtering the foam from the feed water, decanting the foam from the feed water, or a combination thereof. The method can further include breaking the foam, filtering the foam, or a combination thereof, to form a broken foam. Breaking the foam can include applying vacuum, applying heat, allowing the foam to sit for a duration, or a combination thereof. The method can further include filtering the broken foam to form a residue including the fluoroalkyl compound, wherein the residue has a higher concentration of the fluoroalkyl compound than a filtrate formed during the filtering.

In various aspects, the method is free of treatment of water using a galvanic cell or electrolytic cell. In other aspects, the method includes treating the clarified aqueous composition formed from addition of the metal component to the feed water with a galvanic cell. Treatment of the clarified aqueous composition can form product water. The treatment of the clarified aqueous composition with the galvanic cell can further treat the water to further remove an emulsion, decrease turbidity, or remove one or more contaminants from the water. The galvanic cell treatment can perform a similar action as the metal component treatment (e.g., both the galvanic cell and metal component addition can remove an emulsion, phosphorus, a fluoroalkyl compound, or a combination thereof), and/or the galvanic cell treatment can perform a different action as the metal component treatment.

In various aspects, the treatment of the clarified aqueous composition with the galvanic cell removes or decreases an emulsion in the clarified aqueous composition, decreases turbidity of the clarified aqueous composition, or a combination thereof. In various aspects, the clarified aqueous composition includes an emulsion, and the product water includes no emulsion or includes a reduced emulsion compared to the clarified aqueous composition. In various aspects, the product water has a lower turbidity than the clarified aqueous composition.

The treatment of the clarified aqueous composition with the galvanic cell can form a galvanically precipitated and/or flocculated solid. The method can further include removing the galvanically precipitated and/or flocculated solid from the galvanic cell-treated clarified aqueous composition, to form the product water. The removal can be performed in any suitable way. For example, removing the galvanically precipitated and/or flocculated solid can include filtration, gravity settling, decantation, centrifugation, desanding hydroclone, or a combination thereof.

In various aspects, the treatment of the clarified aqueous composition with the galvanic cell coagulates and/or precipitates suspended solids from the clarified aqueous composition, removes or decreases the concentration of one or more organic compounds in the clarified aqueous composition, removes or decreases the concentration of one or more inorganic compounds in the clarified aqueous composition, removes or decreases the concentration of one or more dyes and/or inks in the clarified aqueous composition, removes or decreases the concentration of one or more metals in the clarified aqueous composition, removes or decreases the concentration of one or more heavy metals in the clarified aqueous composition, removes or decreases the concentration of one or more toxic compounds and/or materials in the clarified aqueous composition, removes or decreases the concentration of phosphorus in the clarified aqueous composition, removes or decreases the concentration of a fluoroalkyl compound in the clarified aqueous composition, removes or decreases the concentration of fluoride in the clarified aqueous composition, removes or decreases the concentration of sulfide in the clarified aqueous composition, removes or decreases the concentration of arsenic in the clarified aqueous composition, reduces the chemical oxygen demand (COD) of the clarified aqueous composition, removes or decreases the concentration of silica in the clarified aqueous composition (e.g., $SiO_3^{2-}$), or a combination thereof.

In various aspects, the clarified aqueous composition includes suspended solids, and the treatment of the clarified aqueous composition with the galvanic cell flocculates the suspended solids to form the flocculated solid. In various aspects, the treatment of the clarified aqueous composition with the galvanic cell forms the precipitated solid. In various aspects, the method can include flocculation of a precipitated solid formed from the addition of the metal component.

In various aspects, the clarified aqueous composition can include one or more organic compounds, and the product water has a lower concentration of the one or more organic compounds as compared to the clarified aqueous composition. In various aspects, the clarified aqueous composition includes one or more inorganic compounds, and the product water has a lower concentration of the one or more inorganic compounds as compared to the clarified aqueous composition. In various aspects, the clarified aqueous composition includes one or more dyes and/or inks, and the product water has a lower concentration of the one or more dyes and/or inks as compared to the clarified aqueous composition. In various aspects, the clarified aqueous composition includes one or more metals, and the product water has a lower concentration of the one or more metals as compared to the clarified aqueous composition. In various aspects, the clarified aqueous composition includes one or more heavy metals, and the product water has a lower concentration of the one or more heavy metals as compared to the clarified aqueous composition. In various aspects, the clarified aqueous composition includes one or more toxic compounds and/or materials, and the product water has a lower concentration of the one or more toxic compounds and/or materials in the clarified aqueous composition. In various aspects, the clarified aqueous composition can include fluoride, and the aqueous composition has a lower concentration of fluoride as compared to the clarified aqueous composition. In various aspects, the clarified aqueous composition includes sulfide, and the aqueous composition has a lower concentration of sulfide as compared to the clarified aqueous composition. In various aspects, the clarified aqueous composition includes arsenic, and the aqueous composition has a lower concentration of arsenic as compared to the clarified aqueous composition. In various aspects, the clarified aqueous composition includes silica (e.g., $SiO_3^{2-}$), and the product water has a lower concentration of silica as compared to the clarified aqueous composition. In various aspects, the product water has a lower chemical oxygen demand (COD) as compared to the clarified aqueous composition.

The clarified aqueous composition can include phosphorus, and the product water can have a lower concentration of phosphorus as compared to the clarified aqueous composition. The solid can include a salt that includes the phosphorus from the clarified aqueous composition. For example, the solid can include $AlPO_4$. The phosphorus in the clarified aqueous composition can be in any suitable form, such as in the form of elemental phosphorus, inorganic phosphorus, organic phosphorus, a dissolved form of phosphorus, a solid form of phosphorus, oxidized phosphorus, or a combination thereof. The clarified aqueous composition can have a total phosphorus concentration, a dissolved phosphorus concentration, a reactive phosphorus concentration, or a combination thereof, of about 0.001 ppm to about 10,000 ppm, or about 0.01 ppm to about 20 ppm, or about 0.001 ppm or less, or less than, equal to, or greater than about 0.005 ppm, 0.01, 0.02, 0.04, 0.06, 0.08, 0.1, 0.15, 0.2, 0.4, 0.6, 0.8, 1, 2, 4, 6, 8, 10, 15, 20, 40, 60, 80, 100, 150, 200, 400, 600, 800, 1,000, 1,500, 2,000, 4,000, 6,000, 8,000, or 9,000 ppm. The product water can have a total phosphorus concentration, a dissolved phosphorus concentration, a reactive phosphorus concentration, or a combination thereof of about 0 ppm to about 1 ppm, or about 0.0001 ppm to about 0.1 ppm, or less than or equal to about 1 ppm and greater than or equal to about 0 ppm and greater than, equal to, or greater than about 0.0001 ppm, 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, or 0.9 ppm. The product water can have a total phosphorus concentration, a dissolved phosphorus concentration, or a reactive phosphorus concentration that is about 0% to about 70% of a respective total, dissolved, or reactive phosphorus concentration of the clarified aqueous composition, or 0% to about 20%, or less than or equal to about 70% and greater than or equal to about 0% and less than, equal to, or greater than about 0.001%, 0.005, 0.01, 0.05, 0.1, 0.5, 1, 2, 4, 6, 8, 10, 15, 20, 25, 30, 35, 40, 45, 50, 55, 60, or 65%. In various aspects, both the addition of the metal component with removal of the solid and the treatment with the galvanic cell function to remove phosphorus from the feed water and clarified aqueous composition.

In various aspects, the clarified aqueous composition can include a fluoroalkyl compound, and the product water can have a lower concentration of the fluoroalkyl compound as compared to the clarified aqueous composition. The fluoroalkyl compound can be any suitable fluoroalkyl compound, such as a perfluoroalkyl or polyfluoroalkyl substance (PFAS), perfluoroalkyl substance, a polyfluoroalkyl substance, a perfluoroalkyl acid (PFAA), or a combination thereof. The fluoroalkyl compound can be perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof. The product water can have a concentration of the fluoroalkyl compound that is 0% to 20% of the concentration of the fluoroalkyl compound in the clarified aqueous composition, or 0.001% to 5% of the concentration of the fluoroalkyl compound in the clarified aqueous composition, or less than or equal to about 20% and greater than or equal to about 0% and less than, equal to, or greater than about 0.001%, 0.005, 0.01, 0.05, 0.1, 0.5, 1, 2, 4, 6, 8, 10, or 15%. The feed water and/or the clarified aqueous composition can have a concentration of the fluoroalkyl compound of 1 part per trillion (ppt) to 100 parts per million (ppm), or 20 parts per trillion (ppt) to 1 part per million (ppm), or less than or equal to 100 ppm and greater than or equal to 1 ppt and less than, equal to, or greater than 2 ppt, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, 90, 100, 150, 200, 250, 300, 400, 500, 750, 1 ppm, 2, 4, 6, 8, 10, 15, 20, 25, 30, 35, 40, 45, 50, 60, 70, 80, or 90 ppm. The product water can have a concentration of the fluoroalkyl compound that is 0.001 ppt to 100 ppt, or 0.001 ppt to 15 ppt, or less than or equal to 100 ppt and greater than or equal to 0 ppt and less than, equal to, or greater than 1 ppt, 2, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, or 90 ppt. In various aspects, both the addition of the metal component with removal of the solid and the treatment with the galvanic cell function to remove the fluoroalkyl compound from the feed water and from the clarified aqueous composition.

The clarified aqueous composition that is treated with the galvanic cell can have any suitable pH, such as a pH of about 2 to about 14, about 5 to about 11, about 5 to about 7, about 10 to about 11, or less than or equal to about 14 and greater than or equal to about 2 and less than, equal to, or greater than about 2.5, 3, 3.5, 4, 4.5, 5, 5.5, 6, 6.5, 7, 7.5, 8, 8.5, 9, 9.5, 10, 10.5, 11, 11.5, 12, 12.5, 13, or 13.5. In various aspects, the method includes adding acid, base, or a combination thereof, to the clarified aqueous composition before or during the galvanic cell treatment in order to adjust the pH of the clarified aqueous composition.

In various aspects, the method can include adding one or more additives to the clarified aqueous composition before or during the treatment with the galvanic cell. For example, the method can include adding an oxidizer to the clarified aqueous composition, such as ferrate, ozone, ferric chloride (FeCl$_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof. Adding the oxidizer to the clarified aqueous composition can include adding an aqueous solution of the oxidizer to the clarified aqueous composition. The aqueous solution of the oxidizer can have any suitable concentration of the oxidizer, such as about 0.001 ppm to about 999,999 ppm, about 50,000 ppm to about 140,000 ppm, or less than or equal to about 999,999 ppm and greater than or equal to about 0.001 ppm and less than, equal to, or greater than 0.001 ppm, 0.005, 0.01, 0.05, 0.1, 0.5, 1, 1.5, 2, 5, 10, 15, 20, 50, 100, 150, 200, 500, 1,000, 1,100, 1,200, 1,500, 2,000, 2,500, 5,000, 10,000, 15,000, 20,000, 50,000, 100,000, 150,000, 200,000, 500,000, 750,000, or 900,000 ppm.

In various aspects, the method can include adding a cationic polymer to the clarified aqueous composition to form a solid complex including a contaminant from the clarified aqueous composition (e.g., a fluoroalkyl compound) and the cationic polymer, wherein the cationic polymer is added before, during, or after the galvanic treatment. The cationic polymer can be any suitable cationic polymer, such as a natural polymer, a synthetic polymer, a cationic polysaccharide, a gum, alginic acid, cellulose, a cellulose derivative, dextran, glycogen, a polyelectrolyte, a polymer including a quaternary ammonium group, poly (diallyl dimethyl ammonium chloride) (polyDADMAC), or a combination thereof.

In various aspects, the clarified aqueous composition includes a fluoroalkyl compound, and the treatment of the clarified aqueous composition with the galvanic cell forms galvanic cell-treated water including a galvanic cell-treated fluoroalkyl compound. The method can further include separating the galvanic cell-treated fluoroalkyl compound from the galvanic cell-treated water to form the product water having a lower concentration of the fluoroalkyl compound than the clarified aqueous composition and to form an aqueous concentrate having a higher concentration of the galvanic cell-treated fluoroalkyl compound than the product water. The galvanic cell-treated fluoroalkyl compound can include an oxidation product of the fluoroalkyl compound, a complex formed between the fluoroalkyl compound and one or more ions formed by the galvanic cell, a reaction product of the fluoroalkyl compound and one or more ions formed by the galvanic cell, or a combination thereof.

The treatment of the clarified aqueous composition with the galvanic cell includes contacting the clarified aqueous composition and the galvanic cell. The treatment with the galvanic cell can be performed in any suitable enclosure, such as a plug-flow reactor or a tank.

The galvanic cell can be any suitable type of galvanic cell. The galvanic cell includes an anode and a cathode. The galvanic is free of any externally-applied potential across the anode and the cathode. The anode can include Mg, Al, Fe, Zn, Cu, Cd, Cr, Hg, Ni, V, Ce, or a combination thereof. The anode can include Al or an Al alloy, and can be, for example, 90 wt % to 100 wt % Al (e.g., less than or equal to 100 wt % and greater than or equal to 90 wt % and less than, equal to, or greater than 91%, 92, 93, 94, 95, 96, 97, 98, or 99 wt %). The cathode has a different composition than the anode and can include Al, Zn, Fe, Cd, Ni, Sn, Pb, Cu, Ag, Co, Mn, Pd, Ag, carbon (e.g., BDD, graphite, graphene, or a combination thereof), or a combination thereof. The cathode can include Cu or a Cu alloy, and can be, for example, 90 wt % to 100 wt % Cu (e.g., less than or equal to 100 wt % and greater than or equal to 90 wt % and less than, equal to, or greater than 91%, 92, 93, 94, 95, 96, 97, 98, or 99 wt %). The cathode can include Mg, such as 90 wt % to 100 wt % Mg (e.g., less than or equal to 100 wt % and greater than or equal to 90 wt % and less than, equal to, or greater than 91%, 92, 93, 94, 95, 96, 97, 98, or 99 wt %). The galvanic cell can include an anode including Al and a cathode including Cu. The galvanic cell can include an anode including Al and a cathode including Mg. In various aspects, the galvanic cell includes more than one of the anodes and not more than one of the cathodes. In other aspects, the galvanic cell includes a plurality of the anodes and a plurality of the cathodes.

The anode and the cathode of the galvanic cell can have any suitable physical form. For example, the anode and the cathode can independently include a rod, a bar, a tube, a sheet, a plate, an inclined plate, a strip, a non-porous material, a porous material, a screen, a wire mesh, or a combination thereof. The anode and cathode can independently be rods, bars, or a combination thereof. The anode can be a strip or plate, and the cathode can be a porous material. The porous material can include a screen, a wire mesh, or a combination thereof. The anode and the cathode can physically contact one another. The anode and the cathode can include a gap therebetween, wherein the gap is 1 mm to 110 mm, or 2 mm to 30 mm, or less than or equal to 110 mm and greater than or equal to 1 mm and less than, equal to, or greater than 2 mm, 3, 4, 5, 6, 7, 8, 9, 10, 12, 14, 16, 18, 20, 22, 24, 26, 28, 30, 35, 40, 45, 50, 60, 70, 80, 90, or 100 mm. In various aspects, the anode and the cathode include a gap therebetween but contact one another in other locations. In various aspects, the anode and the cathode include a gap therebetween and are free of physical contact with one another (e.g., the gap represents the closest physical distance between the anode and the cathode).

FIG. 1 illustrates a side-view of a galvanic cell 100. The galvanic cell includes an anode 110, wherein the anode is a strip or a plate. The galvanic cell includes two cathodes 120 which are screens. The galvanic cell includes conductive connector 130 including a bolt, two washers (wherein each washer is between cathode 120 and anode 110), and a nut. The conductive connector 130 maintains a gap between the cathodes 120 and the anode 110.

Figure 2:
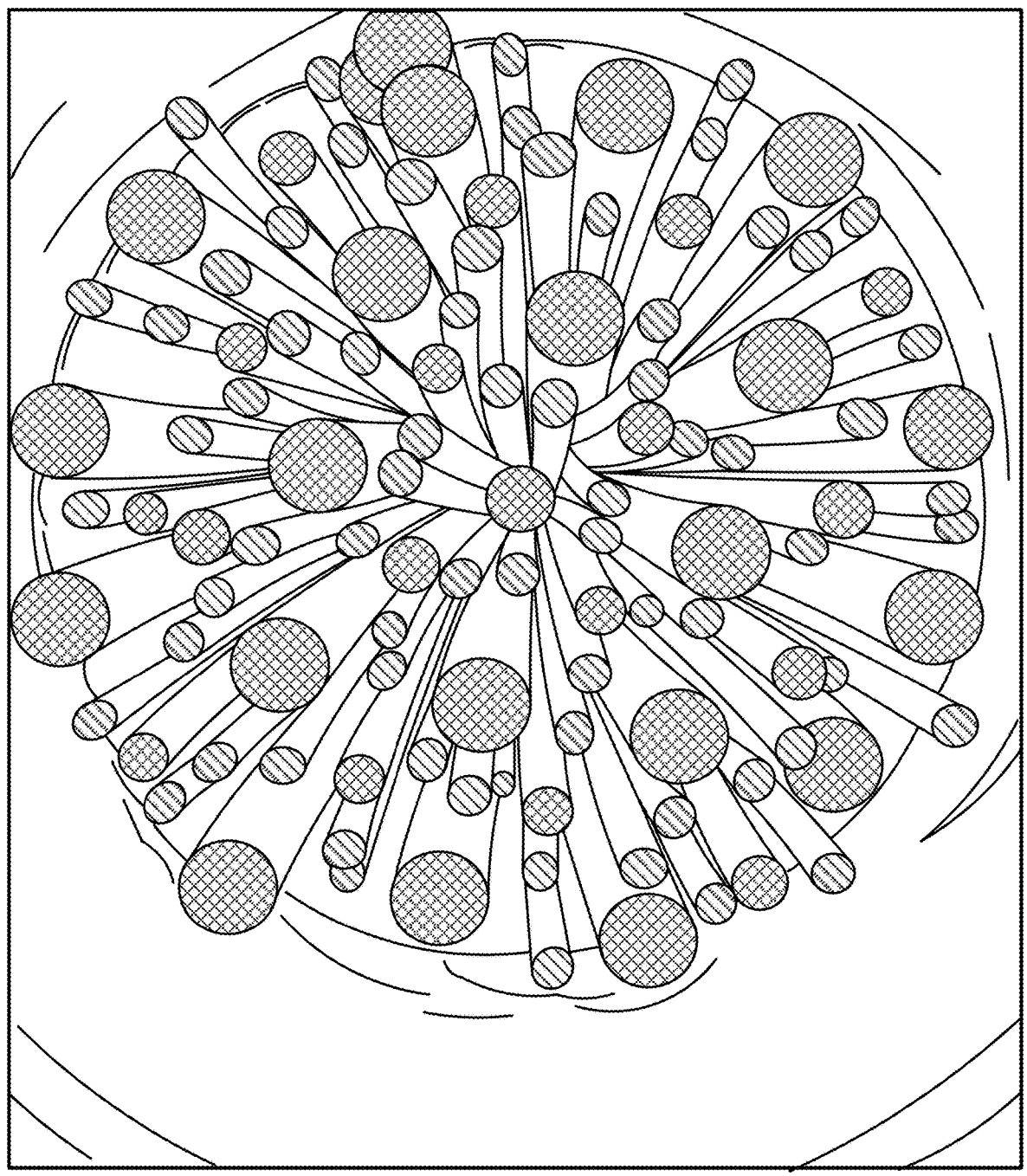
FIG. 2 illustrates a photograph showing an end of a galvanic cell in a tubular plug-flow reactor, illustrating anode and cathode rods, in accordance with various aspects.

FIG. 2 illustrates a photograph showing an end of a galvanic cell in a tubular plug-flow reactor. The photograph illustrates copper and aluminum rods. Some of the rods have a gap therebetween, while other rods are allowed to contact one another in various locations. Below the area of the photograph, the galvanic cell includes a stainless steel conductive connector in the shape of a flat puck or disc having holes therein running from one major face to the other major face that fit the rods maintain a gap between the rods at least at the location of the conductive connector.

Figure 3:
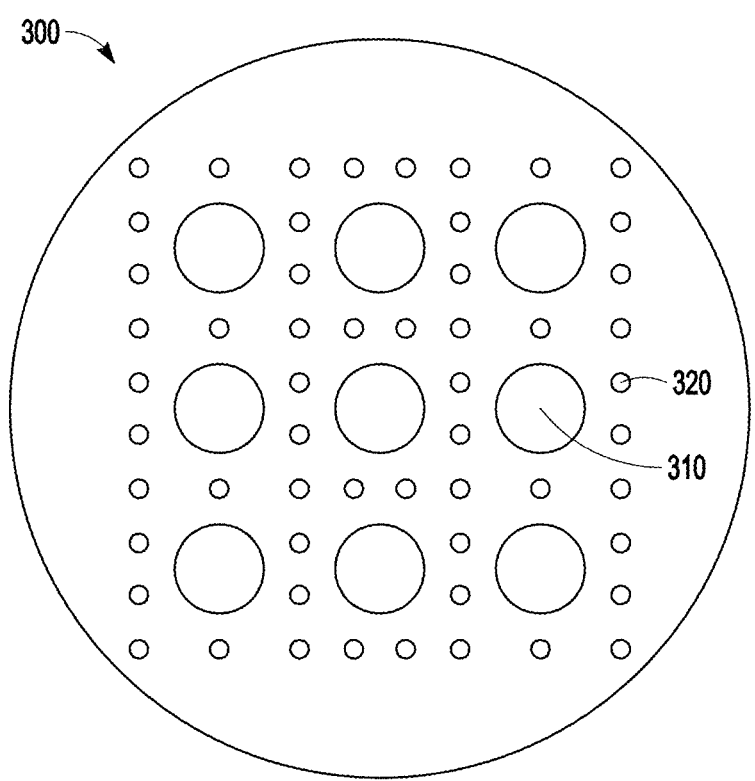
FIG. 3 illustrates schematic showing an end of a galvanic cell in a tubular plug-flow reactor, illustrating anode and cathode rods, in accordance with various aspects.

FIG. 3 illustrates schematic showing an end of a galvanic cell in a tubular plug-flow reactor, illustrating anode and cathode rods. FIG. 3 is a simplified schematic of the photograph shown in FIG. 2. FIG. 3 illustrates tubular reactor 300 having a galvanic cell therein that includes larger cathode rods 310 and smaller anode rods 320. The cathode rods 310 and the anode rods 320 include a gap therebetween.

The galvanic cell can be a tubular reactor including anode and cathode rods therein, such as aluminum rods and copper rods. The rods can be solid aluminum or copper, can be hollow rods of aluminum or copper, or can be solid or hollow rods coated or plated with aluminum or copper. The core of a plated or coated anode or cathode (e.g., the portion of the electrode underneath the plating or coating) can be any suitable electrically conductive material, such as copper, graphite, nickel, silver, titanium, brass, steel, carbon steel, stainless steel, or a combination thereof. The rods can be welded together at one or more locations along the length of the reactor. For example, the rods can be welded together at or near one or both ends of the reactor. In an example, the ends of the rods are welded together at one or both ends of the tubular reactor. The one or more welds at each location along the length of the reactor can be an electrically conductive connector that physically and electrically connects the anode and cathode rods. At the location of the weld, the anode and cathode rods can be physically contacting one another, can have a gap between one another, or a combination thereof. At locations along the length of the tubular reactor away from the one or more welds, the anode and cathode rods can be physically contacting one another, can have a gap between one another, or a combination thereof. Welds that include physical contact between anode and cathode rods can maintain contact of the rods such along a length of the reactor or proximate to the weld. Welds that include a gap between anode and cathode rods can maintain a gap between the anode and cathode, such as along a length of the reactor or proximate to the weld. Tubular reactors with a weld that includes a gap between anode and cathode rods can include contact between the anode and cathode rods at one or more locations along the length of the reactor, such as at one or more locations away from the weld.

The anode and/or cathode can be free of plated coatings of deposited metals thereon. In other aspects, the anode and/or cathode includes a plating and/or deposition thereon including Mg, Al, Fe, Zn, Cu, Cd, Cr, Hg, Ni, V, Ce, Sn, Pb, Ag, Co, Mn, Pd, Mo, carbon (e.g., BDD, graphite, graphene, or a combination thereof), or a combination thereof. A plating can be a continuous coating of the metal thereon. A deposition (e.g., chemical vapor deposition, physical vapor deposition, electrodeposition, electroless deposition, chemical reduction, or a combination thereof) can form a discontinuous coating of the deposited metal thereon. For example, in electroless deposition, a solution of the desired metal ion can be contacted for a brief period (e.g., 30 sec to 1 min) with the anode or the cathode such that the metal ion is deposited onto the surface of the contacted electrode. In various aspects, the anode can include a plating or deposition of a metal thereon, wherein the plated and/or deposited metal is a cathode or is the cathode; the deposited or plated cathode on the anode can be the only cathode in the galvanic cell (e.g., an electroless configuration), or the galvanic cell can further include another cathode that is not plated or deposited on the anode and that includes Al, Zn, Fe, Cd, Ni, Sn, Pb, Cu, Ag, Co, Mn, Pd, Ag, carbon (e.g., BDD, graphite, graphene, or a combination thereof), or a combination thereof. In various aspects, the anode includes Cu plated and/or deposited onto a surface thereof, wherein the cathode includes Cu and wherein the cathode is not plated or deposited on the anode including Al. The core of a plated or coated anode or cathode (e.g., the portion of the electrode underneath the plating or coating) can be any suitable electrically conductive material, such as copper, graphite, nickel, silver, titanium, brass, steel, carbon steel, stainless steel, or a combination thereof.

In various aspects, the galvanic cell can include a conductive connector. The conductive connector can physically and electrically connect the anode and the cathode. The conductive connector can maintain a gap between the anode and the cathode (e.g., the conductive connector can hold the anode and the cathode apart to maintain the gap therebetween), or the conductive connector can hold the anode and the cathode in contact with one another. The conductive connector can include any suitable electrically conductive material. The conductive connector can include Cu, Zn, Fe, Cd, Ni, Sn, Pb, or a combination thereof. The conductive connector can include brass, stainless steel, or a combination thereof. The conductive connector can include any suitable physical form, such as a weld, a fastener, a fastener assembly, a threaded fastener, a screw, a bolt, a bracket, a nut, a washer, or a combination thereof. The anode and cathode can include one or more suitably-sized through-holes to allow the conductive connector to pass therethrough (e.g., holes for a fastener, screw, or bolt).

The galvanic cell can include a nonconductive connector that physically connects the anode and the cathode but that does not provide an electrical connection between the anode and the cathode. The nonconductive connector can include any suitable non-electrically conductive material, such as plastic, glass, rubber, or a combination thereof, and/or wherein the nonconductive connector includes a conductive connector coated with a non-conductive material. The nonconductive connector includes a weld, a fastener, a fastener assembly, a threaded fastener, a screw, a bolt, a bracket, a nut, a washer, or a combination thereof. In various aspects, the galvanic cell includes no conductive connectors or nonconductive connectors. In various aspects, the galvanic cell includes conductive connectors but is free of nonconductive connectors. In various aspects, the galvanic cell includes nonconductive connectors and is free of conductive connectors. In various aspects, the galvanic cell includes a combination of conductive connectors and nonconductive connectors.

The method can be free of treating the clarified aqueous composition with added UV light. In other aspects, the method can further include treating the clarified aqueous composition with UV light before or during the contacting of the clarified aqueous composition with the galvanic cell. The UV light can be any suitable UV light, such as including a wavelength of less than 254 nm, such as a wavelength of 150 nm to less than 254 nm, or 180 nm to 220 nm, or less than 254 nm and greater than or equal to 150 nm and less than, equal to, or greater than 152, 154, 156, 158, 160, 162, 164, 166, 168, 170, 172, 174, 176, 178, 180, 181, 182, 183, 184, 185, 186, 187, 188, 189, 190, 192, 194, 196, 198, 200, 201, 202, 203, 204, 205, 206, 207, 208, 209, 210, 212, 214, 216, 218, 220, 225, 230, 235, 240, 245, or 250 nm. The UV light can include light having a wavelength of about 185 nm and/or about 204 nm. The UV light can be applied from bulbs that are located within a reactor the includes the galvanic cell, or that are located upstream and/or downstream of the galvanic cell. A galvanic cell that includes a UV light source can include the UV light source in the cell such that the light source is immersed, or the galvanic cell can be in a UV-transparent enclosure and include one or more UV sources exterior to the enclosure that shine UV light into the enclosure wherein clarified aqueous composition is flowed and treated by the galvanic cell and UV light.

The removing of the galvanically precipitated and/or flocculated solid from the clarified aqueous composition forms the product water having a lower concentration of the galvanically precipitated and/or flocculated solid and to form an aqueous concentrate having a higher concentration of the galvanically precipitated and/or flocculated solid. The aqueous concentrate can include an extract, a foam, a filtration residue, a separated sediment, a slurry, a sludge, a wet precipitate, or a combination thereof. In various aspects, the aqueous concentrate includes the metal component added to the feed water, and the method further includes reusing at least a portion of the metal component from the aqueous concentrate as the metal component that is added to the feed water. The method can include acidifying the aqueous concentrate to bring a pH thereof to 0.5 to 5, or less than or equal to 5 and greater than or equal to 0.5 and less than, equal to, or greater than 1, 1.5, 2, 2.5, 3, 3.5, 4, or 4.5. The acidifying can be sufficient to at least partially dissolve one or more salts in the clarified aqueous composition that include the metal component that was added to the feed water. The method can include removing solids from the acidified aqueous concentrate and reusing at least a portion of the dissolved metal component in the acidified aqueous concentrate having solids removed therefrom as the metal component that is added to the feed water in the method. In various aspects, the method can further include adding a base to the acidified aqueous concentrate having solids removed therefrom to adjust the pH thereof prior to reusing the metal component by adding the composition to the feed water, such as to bring the pH of the composition to 3 to 10, or 3 to 6, or less than or equal to 10 and greater than or equal to 3 and less than, equal to, or greater than 3.5, 4, 4.5, 5, 5.5, 6, 6.5, 7, 7.5, 8, 8.5, 9, or 9.5.

In various aspects, the feed water, the clarified aqueous composition, and the aqueous concentrate including the galvanically precipitated and/or flocculated solid include a fluoroalkyl compound. The method can include destroying the fluoroalkyl compound via any suitable method. Destroying the fluoroalkyl compound can include thermal treatment, treatment with an electrolytic cell, plasma reactor, supercritical water, combustion, chemical treatment, or a combination thereof, and can include any of the destructive methods described herein for treatment of a fluoroalkyl compound in the solid formed from addition of the metal component to the feed water. The destroying of the fluoroalkyl compound in the aqueous concentrate including the galvanically precipitated and/or flocculated solid can include destroying 60 wt % to 100% of the fluoroalkyl compound in the aqueous concentrate, or 95 wt % to 100 wt % of the fluoroalkyl compound, or less than or equal to 100 wt % and greater than or equal to 60 wt % and less than, equal to, or greater than 65 wt %, 70, 75, 80, 82, 84, 86, 88, 90, 91, 92, 93, 94, 95, 96, 97, 98, or 99 wt %.

The method can include pretreating the feed water prior to and/or during addition of the metal component to the feed water. The pretreatment can include adjusting pH of the feed water, adding one or more additives to the feed water, filtering the feed water, allowing sediment to settle from the feed water, removing nitrogen from the feed water (e.g., via electrochemical treatment of the water, or treatment with an oxidizer such as sedum hypochlorite, to remove nitrogen as ammonia), removing phosphorus from the feed water, treating the feed water with a pretreatment galvanic cell, or a combination thereof. The pretreatment can include adding one or more additives to the feed water, the one or more additives including a polymer flocculant, a radical precursor, hydrogen peroxide, a persulfate salt, an oxidizer, sodium hypochlorite, NaCl, $CaCl_2$), KCl, or a combination thereof. The one or more additives can include a radical precursor including HOOH, $O_3$, $S_2O_8^-$, $I^-$, $CO_3^{2-}$, $HCO_3^-$, $H_2PO_4^-$, $HPO_4^{2-}$, $PO_4^{3-}$, $HSO_5^-$, or a combination thereof. The oxidizer can include ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof. The pretreatment can include adjusting a pH of the feed water to 2 to 12, or less than or equal to 12 and greater than or equal to 2 and less than, equal to, or greater than 2.5, 3, 3.5, 4, 4.5, 5, 5.5, 6, 6.5, 7, 7.5, 8, 8.5, 9, 9.5, 10, 10.5, 11, or 11.5. The pretreatment can include adding base to the feed water, such as to bring a pH of the feed water to 9.5 to 11.5. The pretreatment can include filtering the feed water, such as filtering feed water having base added thereto. The method can include adding the metal component to the filtrate.

The method can further include adding solids removed during the filtration of the feed water having base added thereto to the aqueous concentrate that includes to the solid formed from metal component addition to the feed water, to an aqueous concentrate that includes a galvanically precipitated and/or flocculated solid, or a combination thereof.

The method can include removing nitrogen from the feed water as ammonia after adding base to the feed water. The removing of nitrogen can include combining the feed water with an oxidizer such as sodium hypochlorite. The method can include filtering the feed water having nitrogen removed therefrom as ammonia, wherein the metal component is added to the filtered feed water. The method can further include adding solids removed during filtration of the feed water having nitrogen removed therefrom as ammonia to the aqueous concentrate that includes to the solid formed from metal component addition to the feed water, to an aqueous concentrate that includes a galvanically precipitated and/or flocculated solid, or a combination thereof. The method can include adding the metal component to the feed water prior to any pretreatment, after any pretreatment, after addition of base, after addition of base and removal of nitrogen as ammonia, or a combination thereof. The metal component can be added to the feed water after the addition of base thereto. The metal component can be added to the feed water after addition of base thereto and after removal of nitrogen therefrom as ammonia.

Figure 8:
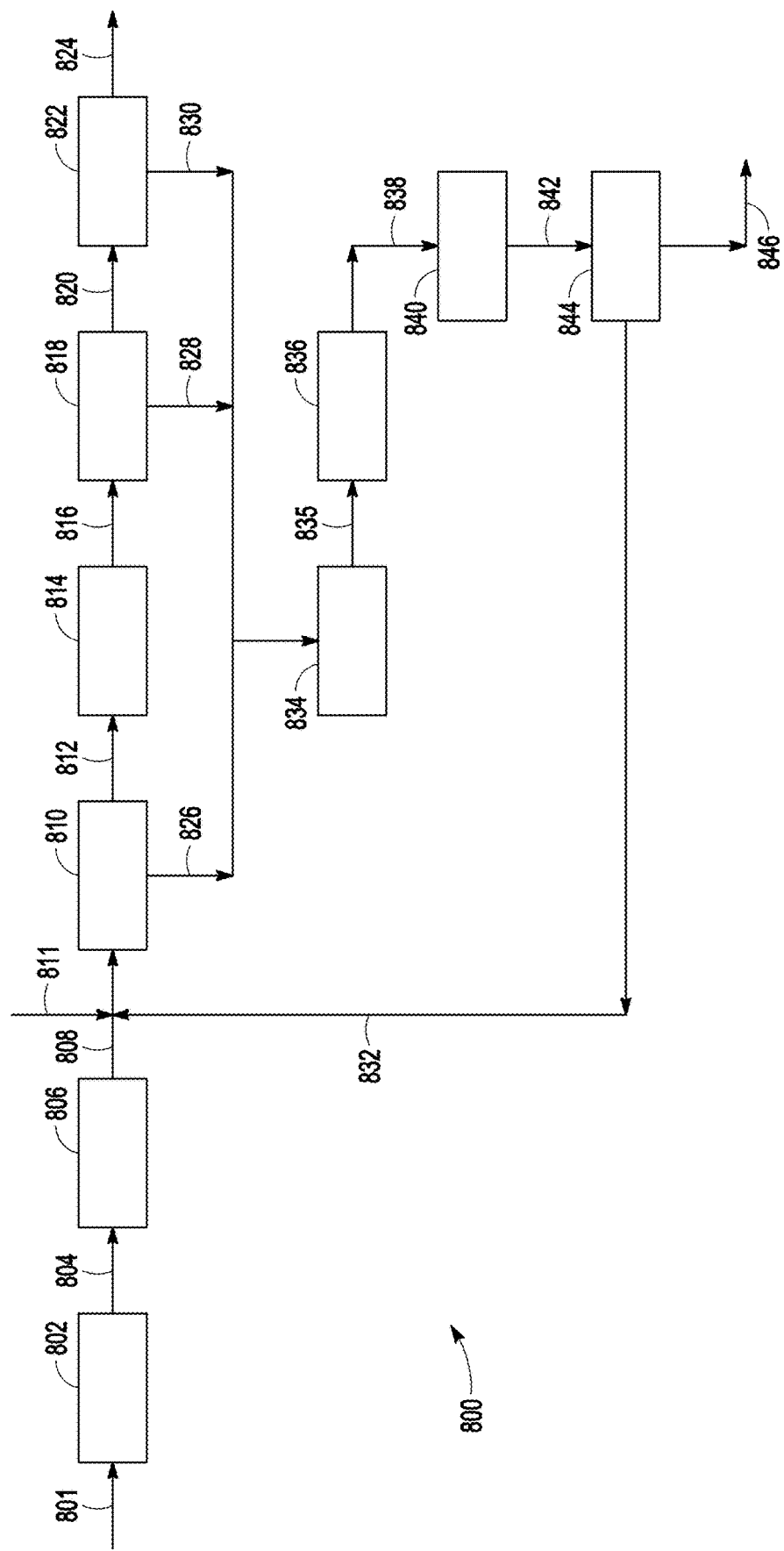
FIG. 8 illustrates a block flow diagram showing a method of treating feed water, in accordance with various aspects of the present invention.

FIG. 8 illustrates a block flow diagram showing a method of treating feed water 800. The method can include subjecting feed water 801 including a fluoroalkyl compound to a pretreatment including basification 802 (e.g., addition of NaOH to bring pH to about 10.5) to produce basified feed water 804. The method can include subjecting basified feed water 804 to nitrogen removal 806 (e.g., addition of sodium hypochlorite to remove nitrogen as ammonia) to produce feed water having nitrogen removed therefrom 808. The feed water having nitrogen removed therefrom 808 can optionally have metal component added thereto (e.g., in the form of dissolved aluminum ions, an aluminum-containing salt that absorbs the fluoroalkyl compound, or a combination thereof) via stream 811. The feed water 808 is combined with the metal component from stream 832 (e.g., in the form of dissolved aluminum ions, an aluminum-containing salt that absorbs the fluoroalkyl compound, or a combination thereof), which forms a solid (e.g., a precipitated solid, a flocculated solid, a solid resulting from addition of a solid including the metal ion to the water, or a combination thereof) that includes the metal component-treated fluoroalkyl compound. The feed water 808 is subjected to a separation process 810 to produce clarified aqueous composition 812 and solid 826. During or prior to separation process 810, a polymer can be added, such as a flocculating polymer. In step 814, the clarified aqueous composition 812 can be contacted with a galvanic cell (e.g., including an anode that includes aluminum and a cathode that includes copper) to produce galvanic cell-treated water 816 that includes a galvanic cell-treated fluoroalkyl compound. Alternatively, a galvanic cell treatment step can be absent from step 814, and step 814 includes a tank or other container for allowing production of the metal component-treated fluoroalkyl compound, such as for allowing the aluminum ion and/or aluminum hydroxide and the fluoroalkyl compound to react, or for allowing the aluminum ion and/or aluminum hydroxide to precipitate a salt that absorbs the fluoroalkyl compound, or for allowing an aluminum salt such as aluminum hydroxide to absorb the fluoroalkyl compound. Prior to or during step 814, the method can include adding to the clarified aqueous composition HCl (e.g., to bring pH to about 5.5) and/or adding $H_2O_2$. The method can include separating 818 the treated fluoroalkyl compound (e.g., galvanically treated, metal component-treated, or a combination thereof) from the water 816 to form product water 820 having a lower concentration of the fluoroalkyl compound than the feed water 801 (or clarified aqueous composition 812) and to form an aqueous concentrate 828 having a higher concentration of the treated fluoroalkyl compound than the product water. The method can include posttreatment of the product water 820 (e.g., filtration, such as ultrafiltration) to form posttreated product water 824 and solids 830. The solid contaminants 826 and solids 830 can be combined with aqueous concentrate 828. The aqueous concentrate can be subjected to conditioning 834 (e.g., addition of $H_2SO_4$ to bring pH to about 2) to form conditioned aqueous concentrate 835. The conditioned aqueous concentrate 835 can be subjected to contacting with an electrolytic cell 836 to destroy the treated fluoroalkyl compound and to form electrolytically treated aqueous composition 838. The electrolytically treated aqueous composition 838 can be subjected to conditioning (e.g., addition of NaOH or $Ca(OH)_2$ to bring to about 6.5-7 pH, and addition of flocculating polymer) to form conditioned electrolytically treated aqueous composition 838, which can be subjected to separation 844 (e.g., filtration) to form a liquid 832 and a solid 846. The solid contains the destroyed fluoroalkyl compound. The liquid, which includes the metal component (e.g., aluminum ions, aluminum hydroxide, or a combination thereof), can be added to the feed water, such as prior to separation 810.

Figure 9:
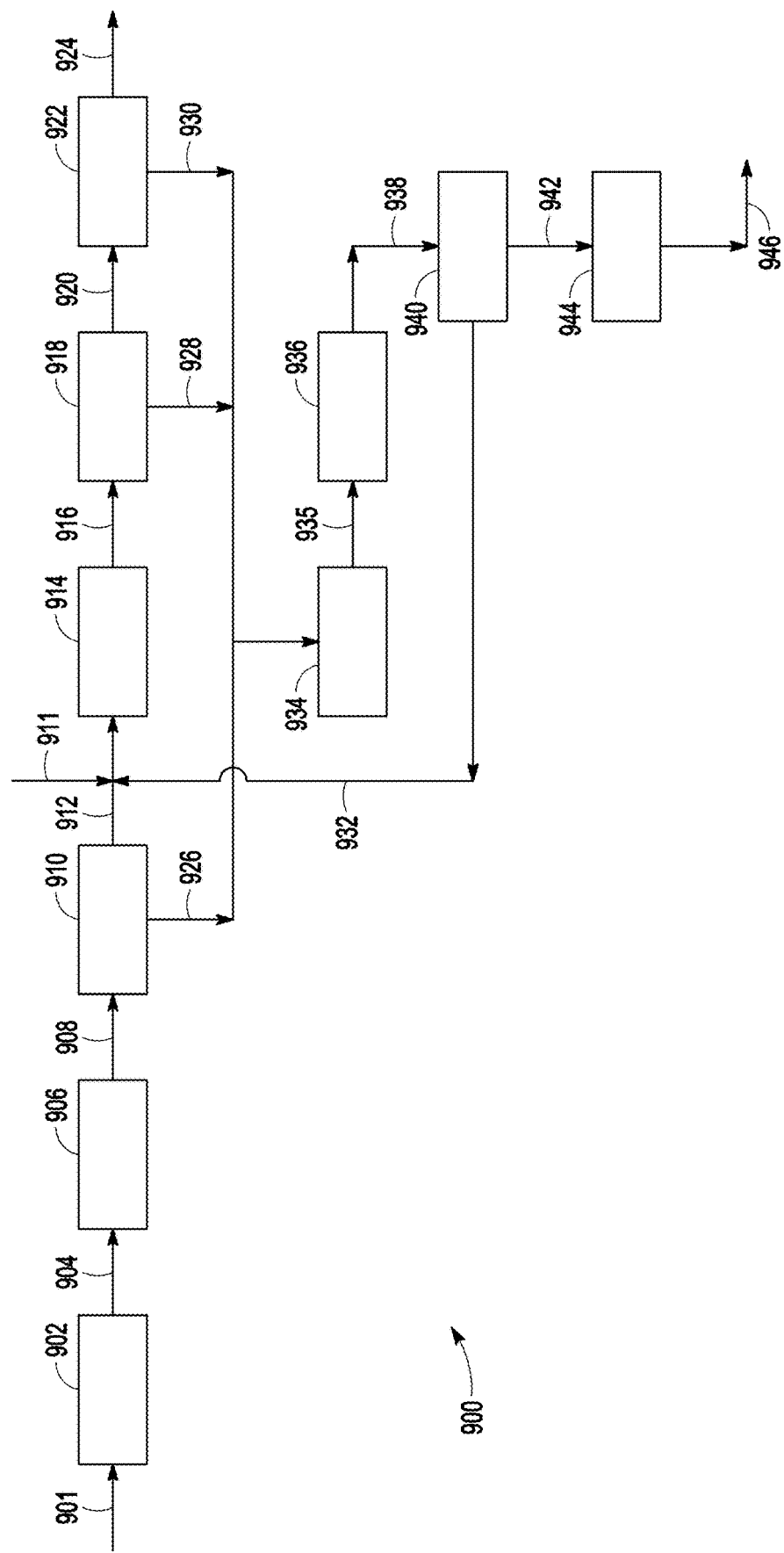
FIG. 9 illustrates a block flow diagram showing a method of treating feed water, in accordance with various aspects of the present invention.

FIG. 9 illustrates a block flow diagram showing a method of treating feed water 900. The method can include subjecting feed water 901 including a fluoroalkyl compound to a pretreatment including basification 902 (e.g., addition of NaOH to bring pH to about 10.5) to produce basified feed water 904. The method can include subjecting basified feed water 904 to nitrogen removal 906 (e.g., addition of sodium hypochlorite to remove nitrogen as ammonia) to produce feed water having nitrogen removed therefrom 908. The feed water having nitrogen removed therefrom 908 can optionally have a metal component added thereto (e.g., in the form of dissolved aluminum ions, an aluminum-containing salt that absorbs the fluoroalkyl compound, or a combination thereof) via stream 911. The feed water 908 is combined with the metal component from stream 932 (e.g., in the form of dissolved aluminum ions, an aluminum-containing salt that absorbs the fluoroalkyl compound, or a combination thereof), which forms a solid (e.g., a precipitated solid, a flocculated solid, a solid resulting from addition of a solid including the metal ion to the water, or a combination thereof) that includes the metal component-treated fluoroalkyl compound. The feed water 908 is subjected to a separation process 910 to produce clarified aqueous composition 912 and solid 926. During or prior to separation process 910, a polymer can be added, such as a flocculating polymer. In step 914, the clarified aqueous composition 912 can be contacted with a galvanic cell (e.g., including an anode that includes aluminum and a cathode that includes copper) to produce galvanic cell-treated water 916 that includes a galvanic cell-treated fluoroalkyl compound. Alternatively, a galvanic cell treatment step can be absent from step 914, and step 914 includes a tank or other container for allowing production of the metal component-treated fluoroalkyl compound, such as for allowing the aluminum ion and/or aluminum hydroxide and the fluoroalkyl compound to react, or for allowing the aluminum ion and/or aluminum hydroxide to precipitate a salt that absorbs the fluoroalkyl compound, or for allowing an aluminum salt such as aluminum hydroxide to absorb the fluoroalkyl compound. Prior to or during step 914, the method can include adding to the clarified aqueous composition HCl (e.g., to bring pH to about 5.5) and/or adding $H_2O_2$. The method can include separating 918 the treated fluoroalkyl compound (e.g., galvanically treated, metal ion-treated, or a combination thereof) from the water 916 to form product water 920 having a lower concentration of the fluoroalkyl compound than the feed water 901 (or clarified aqueous composition 912) and to form an aqueous concentrate 928 having a higher concentration of the treated fluoroalkyl compound than the product water. The method can include posttreatment of the product water 920 (e.g., filtration, such as ultrafiltration) to form posttreated product water 924 and solids 930. The solid contaminants 926 and solids 930 can be combined with aqueous concentrate 928. The aqueous concentrate can be subjected to conditioning 934 (e.g., addition of $H_2SO_4$ to bring pH to about 2) to form conditioned aqueous concentrate 935. The conditioned aqueous concentrate 935 can be subjected to contacting with an electrolytic cell 936 to destroy the treated fluoroalkyl compound and to form electrolytically treated aqueous composition 938. The electrolytically treated aqueous composition 938 can be subjected to separation 940 (e.g., filtration) to form a liquid 932 and a solid 942. The liquid, which includes aluminum ions and/or aluminum hydroxide, can be added to the feed water, such as after separation 910 and prior to step 912. The solid can be subjected to conditioning (e.g., addition of NaOH or $Ca(OH)_2$ to bring to about 6.5-7 pH) to form solid 946, which contains the destroyed fluoroalkyl compound.

In FIG. 8, a large amount of aluminum is lost due to basification and flocculation of the electrolytically treated aqueous composition prior to removal of the liquid therefrom. The lost aluminum represents a substantial cost of operation both in terms of the cost of aluminum as well as additional disposal costs. In FIG. 9, a substantially lower amount of aluminum is lost, due to recycling of the liquid phase of the electrolytically treated aqueous composition prior to basification thereof.

The method can include acidifying the aqueous concentrate. In embodiments including destruction of the metal component-treated fluoroalkyl compound in the aqueous concentrate, the acidifying can be performed prior to the destruction. The method can further include performing a secondary separation to separate a residual solution from the aqueous concentrate after the acidifying and prior to any destruction of the metal component-treated fluoroalkyl compound to concentrate the metal component-treated fluoroalkyl compound in the aqueous concentrate and to form the residual solution separated therefrom. The separation can be any suitable separation technique, such as filtration, precipitation, extraction, aeration, decantation, or a combination thereof. In various aspects, the secondary separation can include aerating the aqueous concentrate to form a foam therein, which can rise to the top of the residual solution. The secondary separation can include separating the residual solution from the foam.

The secondary separation can further concentrate the metal component-treated fluoroalkyl compound. For example, a ratio of a volume of the aqueous concentrate having the residual solution removed therefrom to a volume of the acidified aqueous concentrate prior to removal of the residual solution therefrom can be 1:100,000 to 1:1, 1:10,000 to 1:5, or less than or equal to 1:1 and greater than or equal to 1:100,000 and less than, equal to, or greater than 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:60, 1:70, 1:80, 1:90, 1:100, 1:150, 1:200, 1:250, 1:500, 1:1,000, 1:1,500, 1:2,000, 1:2,500, 1:5,000, 1:10,000, 1:15,000, 1:20,000, 1:25,000, 1:50,000, or 1:75,000. A ratio of a volume of the aqueous concentrate having the residual solution removed therefrom to a volume of the feed water can be 1:1,000,000 to 1:1, or 1:100,000 to 1:10, or less than or equal to 1:1 and greater than or equal to 1:1,000,000 and less than, equal to, or greater than 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:60, 1:70, 1:80, 1:90, 1:100, 1:150, 1:200, 1:250, 1:500, 1:1,000, 1:1,500, 1:2,000, 1:2,500, 1:5,000, 1:10,000, 1:15,000, 1:20,000, 1:25,000, 1:50,000, 1:75,000, 1:100,000, 1:150,000, 1:200,000, 1:250,000, 1:500,000, or 1:750,000.

In various aspects, removal of fluoroalkyl compounds from water can be conducted as a series of stages, including treatment of the feed water with the metal component which can collect the fluoroalkyl compound on the surface of particles such as aluminum hydroxide particles. The particles can then be separated (e.g., via sedimentation) to form an aqueous concentrate that contains a majority of the fluoroalkyl compounds (e.g., 90% or more). The aqueous concentrate can then be dewatered (e.g., in a mechanical press or similar device). Next, the dewatered solids can be dissolved at low pH (e.g., pH of 2-3) by adding an acid such as HCl and/or $H_2SO_4$ and to form an acidified solution having a high concentration of metal ions such as aluminum ions. In the acidified solution, the fluoroalkyl compounds can be dissociated in the aqueous phase with the acid (neutral species) in equilibrium with their conjugate base (ionic species) ($C_nF_mCOOH \leftrightarrow C_nF_mCOO^- + H^+$). The relationship between the concentrations of the two fluoroalkyl compound species (acid vs. conjugate base) is determined by the pH value. The equilibrium can be driven toward the acid species at low pH (e.g., pH of 2-3). The acid species (neutral species) can have significantly enhanced hydrophobicity which can favor increased concentration of the acid species at the water-air interface.

Under these conditions, the acid species of the fluoroalkyl compound can move easily with the addition of air or gas bubbles to the interfacial region so as to create a froth layer containing a majority (e.g., approximately 99.99% or more) of the molecules of the fluoroalkyl compound. Removal of the froth from the residual solution can result in a preferential concentration (e.g., into $\frac{1}{10}^{th}$ its original volume), allowing destruction of the fluoroalkyl compound (e.g., via an electrochemical process, or other process) can become more efficient and economically viable. The residual solution having low pH (e.g., pH of 2-3), can have a high concentration of metal ions (e.g., aluminum ions) that can be recovered, reused and recycled back for reuse in the method by adding the residual solution to the feed water.

In various aspects, all or a portion of the residual solution can be recycled for reuse of the metal of the metal component. For any non-recycled portions, if there are no environmental limitations on the concentration of metal component that can be reintroduced, the water enriched with the metal component can be dosed into the product water. For environmental considerations the pH can be increased with a base (e.g., sodium hydroxide, such as to pH of 3.5-4) to precipitate solid aluminum particles. At increased pH (e.g., 3.5-4), the metal component can exist in the form of polymers (e.g., aluminum-containing polymers) having high adsorption capacity and a composition similar to particles formed by the treatment of the feed water with the metal component.

The residual solution includes the metal component, such as an aluminum ion and/or aluminum hydroxide. The method can further include recycling the metal component including combining the feed water and the residual solution prior to and/or during contacting the feed water and the metal component. In various aspects, the recycling the metal of the metal component can further include purging one or more acidification contaminants from the residual solution prior to combining the feed water and the residual solution. In embodiments that include destruction of the metal component-treated fluoroalkyl compound, the destroying the metal component-treated fluoroalkyl compound in the aqueous concentrate can form a liquid including the metal component, and the method can further include recycling the metal component including combining the feed water and the liquid including the metal component prior to and/or during the contacting of the feed water and the metal component. The recycling can further include purging one or more acidification contaminants from the liquid including the metal component prior to combining the feed water and the liquid including the metal component. In various aspects, the residual solution and the liquid including the metal component can be combined to form a recycle stream that is subjected to the purging of acidification contaminants.

The purging can include removing one or more contaminant ions from the liquid including the metal component, wherein the one or more contaminant ions are from the acidification. The purging can include removing sulfate, chloride, or a combination thereof, from the liquid including the metal component. The purging can reduce or eliminate build-up of contaminants added to the recycle loop via the acidification step, such as sulfate from sulfuric acid or chloride from hydrochloric acid.

The purging can include raising a pH of the liquid including the metal component to 3 or less (e.g., 1 to 3, or 2 to 3, or less than or equal to 3 and greater than or equal to 1 and less than, equal to, or greater than 1.1, 1.2, 1.3, 1.4, 1.5, 1.6, 1.7, 1.8, 1.9, 2, 2.1, 2.2, 2.3, 2.4, 2.5, 2.6, 2.7, 2.8, or 2.9) and filtering out a salt of the one or more contaminant ions from the liquid including the metal component. The purging can include raising a pH of the liquid including the metal component to 3 or less and filtering solid aluminum sulfate from the liquid including the metal component. The purging can include raising a pH of the liquid including the metal component to 4 or less (e.g., 3.5 or less, or 1 to 4, or 1 to 3.5, or less than or equal to 3 and greater than or equal to 1 and less than, equal to, or greater than 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, or 3.9), filtering a solid salt of the metal of the metal component from a residual liquid, and combining the solid salt of the metal of the metal component with the feed water or dissolving the solid salt in water prior to adding to the feed water. The purging can include raising a pH of the liquid including the metal component to 4 or less, or 3.5 or less, filtering aluminum chloride from the liquid including the metal component, and combining the solid salt of the metal of the metal component with the feed water or dissolving the solid salt in water prior to adding to the feed water. The purging can occur continuously or periodically, which can be determined based on a concentration measurement of the contaminant in the recycle stream.

In the case of excess sulfate, the recycle stream (which can include the liquid including the metal or and/or the residual liquid) can be partially neutralized with a base (e.g., calcium hydroxide) to a pH of approximately but not exceeding 3, which can cause the sulfate to precipitate as calcium sulfate which can then be filtered and removed from the system. In the case of excess chloride, the pH of the recycle stream can be elevated using sodium hydroxide to a pH not exceeding 3.5 to 4. In this case, the metal ion itself (e.g., Al) precipitates and can be filtered and returned to the system. The pH 3.5-4 liquid can be blended with the product water at a suitable rate.

Figure 10:
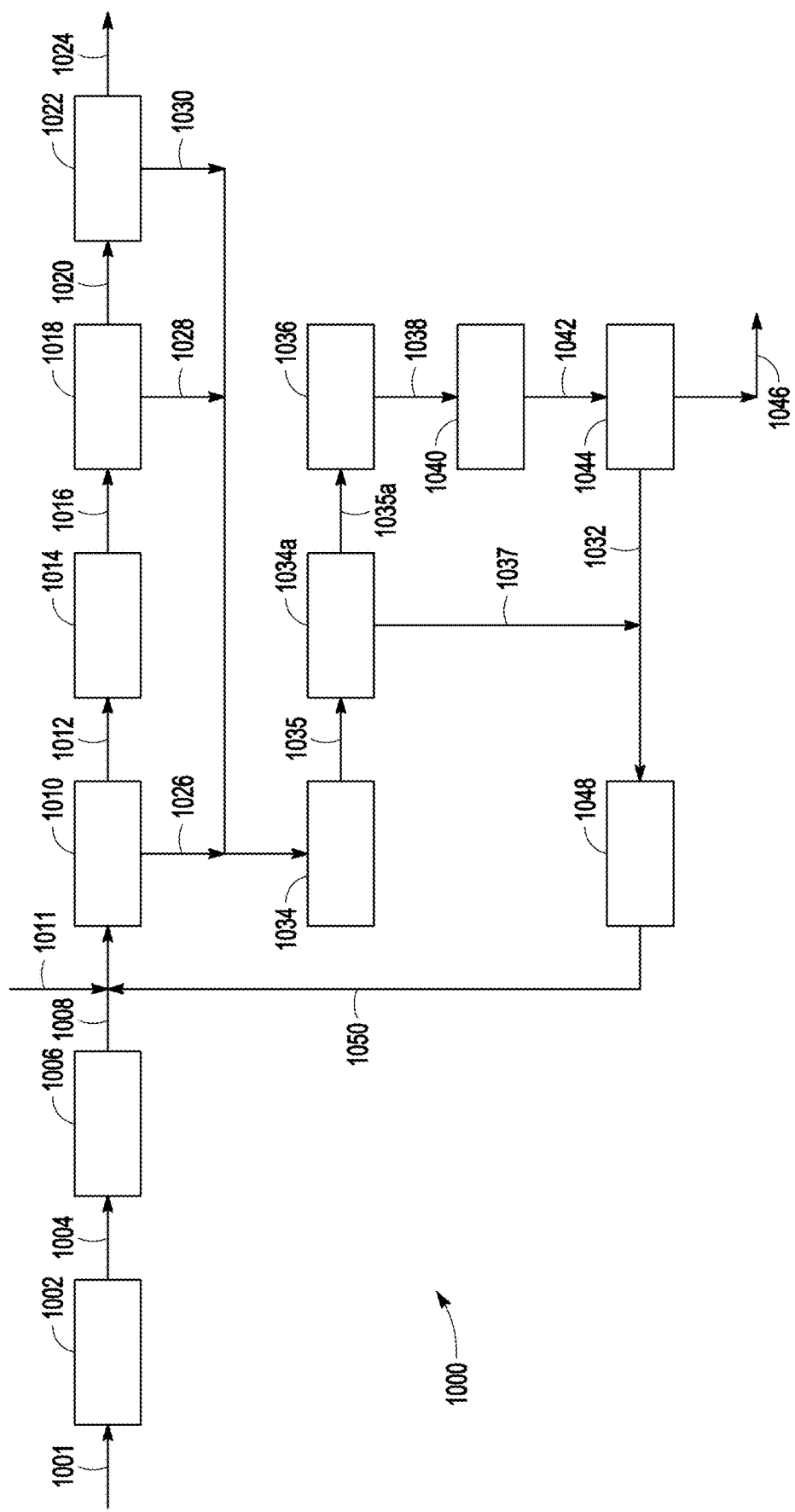
FIG. 10 illustrates a block flow diagram showing a method of treating feed water, in accordance with various aspects of the present invention.

FIG. 10 illustrates a block flow diagram showing a method of treating feed water 1000. The method can include subjecting feed water 1001 including a fluoroalkyl compound to a pretreatment including basification 1002 (e.g., addition of NaOH to bring pH to about 10.5) to produce basified feed water 1004. The method can include subjecting basified feed water 1004 to nitrogen removal 1006 (e.g., addition of sodium hypochlorite to remove nitrogen as ammonia) to produce feed water having nitrogen removed therefrom 1008. The feed water having nitrogen removed therefrom 808 can optionally have a metal component added thereto (e.g., in the form of dissolved aluminum ions, an aluminum-containing salt that absorbs the fluoroalkyl compound such as aluminum hydroxide, or a combination thereof) via stream 1011. The feed water 1008 is combined with aluminum ions from stream 1032 (e.g., in the form of dissolved aluminum ions, an aluminum-containing salt that absorbs the fluoroalkyl compound such as aluminum hydroxide, or a combination thereof), which forms a solid (e.g., a precipitated solid, a flocculated solid, a solid resulting from addition of a solid including the metal component to the water, or a combination thereof) that includes the metal component-treated fluoroalkyl compound. The feed water 1008 is subjected to a separation process 1010 to produce clarified aqueous composition 1012 and solid 1026. During or prior to separation process 1010, a polymer can be added, such as a flocculating polymer. In step 1014, the clarified aqueous composition 1012 can be contacted with a galvanic cell (e.g., including an anode that includes aluminum and a cathode that includes copper) to produce galvanic cell-treated water 1016 that includes a galvanic cell-treated fluoroalkyl compound. Alternatively, a galvanic cell treatment step can be absent from step 1014, and step 1014 includes a tank or other container for allowing production of the metal component-treated fluoroalkyl compound, such as for allowing the aluminum ion and the fluoroalkyl compound to react, or for allowing the aluminum ion to precipitate a salt that absorbs the fluoroalkyl compound, or for allowing an aluminum salt such as aluminum hydroxide to absorb the fluoroalkyl compound. Prior to or during step 1014, the method can include adding to the clarified aqueous composition HCl (e.g., to bring pH to about 5.5) and/or adding $H_2O_2$. The method can include separating 1018 the treated fluoroalkyl compound (e.g., galvanically treated, metal ion-treated, or a combination thereof) from the water 1016 to form product water 1020 having a lower concentration of the fluoroalkyl compound than the feed water 1001 (or clarified aqueous composition 1012) and to form an aqueous concentrate 1028 having a higher concentration of the treated fluoroalkyl compound than the product water. The method can include posttreatment of the product water 1020 (e.g., filtration, such as ultrafiltration) to form post-treated product water 1024 and solids 1030. The solid contaminants 1026 and solids 1030 can be combined with aqueous concentrate 1028. The aqueous concentrate can be subjected to conditioning 1034 (e.g., addition of $H_2SO_4$ to bring pH to about 2) to form conditioned aqueous concentrate 1035. The conditioned aqueous concentrate 1035 can be subjected to a secondary separation 1034a (e.g., aeration/foaming) to remove a residual liquid 1037 therefrom, and to form the aqueous concentrate having residual liquid removed therefrom 1035a. The residual liquid 1037 can include the metal component, such as aluminum ions and/or aluminum hydroxide. The residual liquid can be combined with liquid stream 1032 for recycling of the metal component back to the feed water. The aqueous concentrate having the residual liquid removed therefrom 1035a can be subjected to contacting with an electrolytic cell 1036 to destroy the treated fluoroalkyl compound and to form electrolytically treated aqueous composition 1038. The electrolytically treated aqueous composition 1038 can be subjected to conditioning (e.g., addition of NaOH or $Ca(OH)_2$ to bring to about 6.5-7 pH, and addition of flocculating polymer) to form conditioned electrolytically treated aqueous composition 1038, which can be subjected to separation 1044 (e.g., filtration) to form a liquid 1032 and a solid 1046. The solid contains the destroyed fluoroalkyl compound. The liquid 1032, which can include the metal component such as aluminum ions and/or aluminum hydroxide, can be subjected to purging 1048 to remove one or more acidification contaminants from the water (e.g., sulfate and/or chloride). After purging, the liquid 1050 (which includes the metal component, such as aluminum ions and/or aluminum hydroxide) can be added to the feed water, such as prior to separation 1010.

Figure 11:
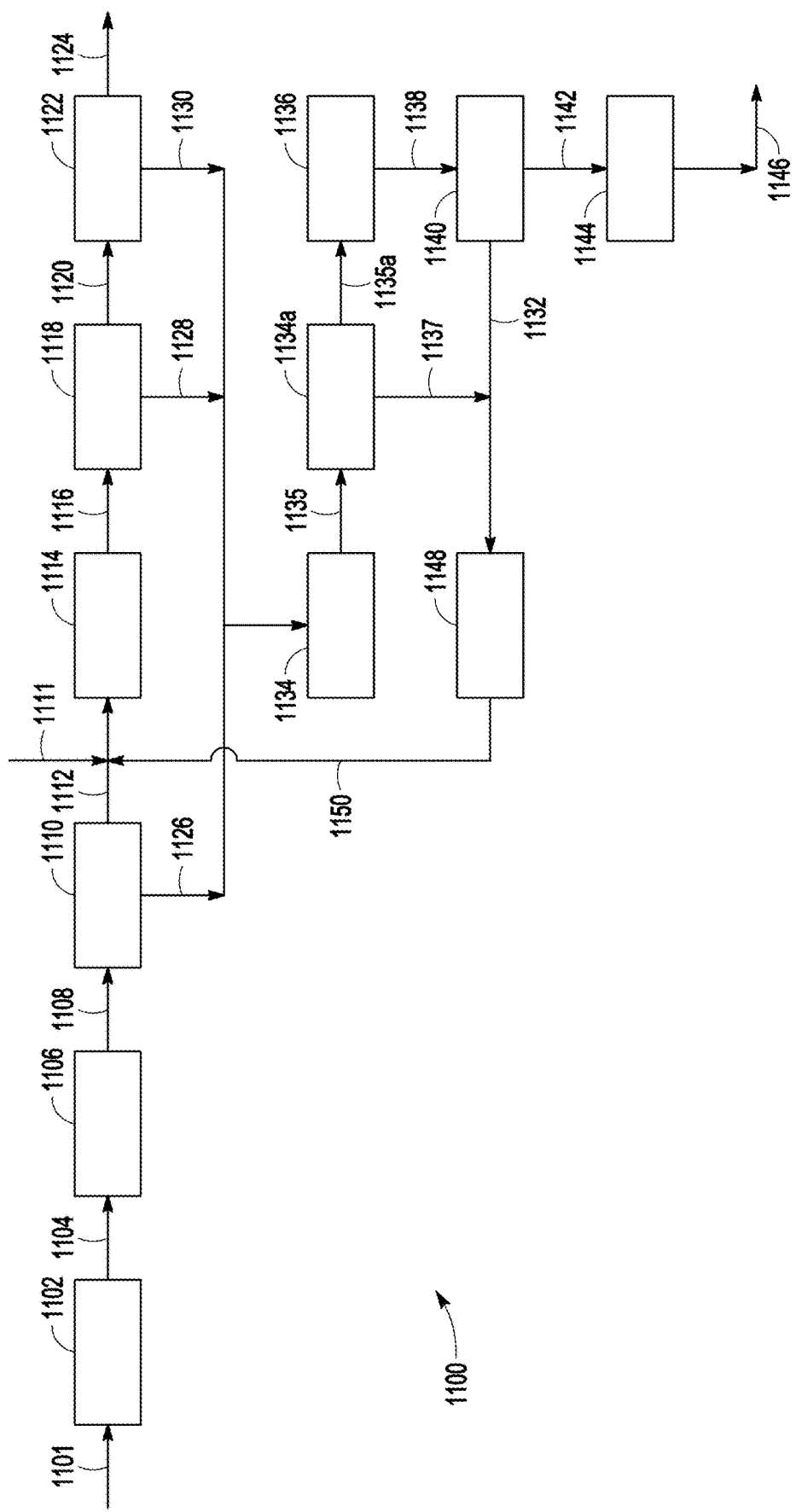
FIG. 11 illustrates a block flow diagram showing a method of treating feed water, in accordance with various aspects of the present invention.

FIG. 11 illustrates a block flow diagram showing a method of treating feed water 1100. The method can include subjecting feed water 1101 including a fluoroalkyl compound to a pretreatment including basification 1102 (e.g., addition of NaOH to bring pH to about 10.5) to produce basified feed water 1104. The method can include subjecting basified feed water 1104 to nitrogen removal 1106 (e.g., addition of sodium hypochlorite to remove nitrogen as ammonia) to produce feed water having nitrogen removed therefrom 1108. The feed water having nitrogen removed therefrom 1108 can optionally have a metal component added thereto (e.g., in the form of dissolved aluminum ions, an aluminum-containing salt that absorbs the fluoroalkyl compound such as aluminum hydroxide, or a combination thereof) via stream 1111. The feed water 1108 is combined with metal component from stream 1132 (e.g., in the form of dissolved aluminum ions, an aluminum-containing salt that absorbs the fluoroalkyl compound such as aluminum hydroxide, or a combination thereof), which forms a solid (e.g., a precipitated solid, a flocculated solid, a solid resulting from addition of a solid including the metal of the metal component to the water, or a combination thereof) that includes the metal component-treated fluoroalkyl compound. The feed water 1108 is subjected to a separation process 1110 to produce clarified aqueous composition 1112 and solid 1126. During or prior to separation process 1110, a polymer can be added, such as a flocculating polymer. In step 1114, the clarified aqueous composition 1112 can be contacted with a galvanic cell (e.g., including an anode that includes aluminum and a cathode that includes copper) to produce galvanic cell-treated water 1116 that includes a galvanic cell-treated fluoroalkyl compound. Alternatively, a galvanic cell treatment step can be absent from step 1114, and step 1114 includes a tank or other container for allowing production of the aluminum-treated fluoroalkyl compound, such as for allowing the metal component and the fluoroalkyl compound to react, or for allowing the aluminum ion and/or aluminum hydroxide to precipitate a salt that absorbs the fluoroalkyl compound, or for allowing an aluminum salt such as aluminum hydroxide to absorb the fluoroalkyl compound. Prior to or during step 1114, the method can include adding to the clarified aqueous composition HCl (e.g., to bring pH to about 5.5) and/or adding $H_2O_2$. The method can include separating 1118 the treated fluoroalkyl compound (e.g., galvanically treated, metal ion-treated, or a combination thereof) from the water 1116 to form product water 1120 having a lower concentration of the fluoroalkyl compound than the feed water 1101 (or clarified aqueous composition 1112) and to form an aqueous concentrate 1128 having a higher concentration of the treated fluoroalkyl compound than the product water. The method can include posttreatment of the product water 1120 (e.g., filtration, such as ultrafiltration) to form posttreated product water 1124 and solids 1130. The solid contaminants 1126 and solids 1130 can be combined with aqueous concentrate 1128. The aqueous concentrate can be subjected to conditioning 1134 (e.g., addition of $H_2SO_4$ to bring pH to about 2) to form conditioned aqueous concentrate 1135. The conditioned aqueous concentrate 1135 can be subjected to a secondary separation 1134a (e.g., aeration/foaming) to remove a residual liquid 1137 therefrom, and to form the aqueous concentrate having residual liquid removed therefrom 1135a. The residual liquid 1137 can include the metal component such as aluminum ions and/or aluminum hydroxide. The residual liquid can be combined with liquid stream 1132 for recycling of the metal component back to the feed water. The aqueous concentrate having the residual liquid removed therefrom 1135a can be subjected to contacting with an electrolytic cell 1136 to destroy the treated fluoroalkyl compound and to form electrolytically treated aqueous composition 1138. The electrolytically treated aqueous composition 1138 can be subjected to separation 1140 (e.g., filtration) to form a liquid 1132 and a solid 1142. The liquid 1132, which can include the metal component such as aluminum ions and/or aluminum hydroxide, can be subjected to purging 1148 to remove one or more acidification contaminants from the water (e.g., sulfate and/or chloride). The purged liquid 1150, which can include the metal component such as aluminum ions and/or aluminum hydroxide, can be added to the feed water, such as after separation 1110 and prior to step 1112. The solid can be subjected to conditioning (e.g., addition of NaOH or $Ca(OH)_2$ to bring to about 6.5-7 pH) to form solid 1146, which contains the destroyed fluoroalkyl compound.

In FIG. 10, some aluminum is lost due to basification and flocculation of the electrolytically treated aqueous composition prior to removal of the liquid therefrom. However, due to the secondary separation, less aluminum is lost than in the method shown in FIG. 8. The lost aluminum represents a significant cost of operation both in terms of the cost of aluminum as well as additional disposal costs. In FIG. 11, a substantially lower amount of aluminum is lost, due to recycling of the liquid phase of the electrolytically treated aqueous composition prior to basification thereof.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Exemplary Aspects

The following exemplary aspects are provided, the numbering of which is not to be construed as designating levels of importance:

Aspect 1 provides a method of treating feed water, the method comprising: adding a metal component comprising a metal to the feed water to form a clarified aqueous composition, wherein the metal component comprises an ion of the metal, a solid or dissolved compound of the metal, an elemental form of the metal, or a combination thereof.

Aspect 2 provides the method of Aspect 1, wherein the method is a method of removing or decreasing an emulsion in the feed water, a method of decreasing turbidity of the feed water, or a combination thereof.

Aspect 3 provides the method of any one of Aspects 1-2, wherein the feed water comprises an emulsion, wherein the clarified aqueous composition comprises no emulsion or comprises a reduced emulsion compared to the feed water.

Aspect 4 provides the method of any one of Aspects 1-3, wherein the clarified aqueous composition comprises lower turbidity than the feed water.

Aspect 5 provides the method of any one of Aspects 1-4, wherein the addition of the metal component to the feed water forms a solid, wherein the method further comprises removing the solid from the metal component-treated composition, to form the clarified aqueous composition.

Aspect 6 provides the method of Aspect 5, wherein removing the solid comprises filtration, gravity settling, decantation, centrifugation, desanding hydroclone, or a combination thereof.

Aspect 7 provides the method of any one of Aspects 5-6, wherein the method is a method of coagulating and/or precipitating suspended solids from the feed water, removing or decreasing the concentration of one or more organic compounds in the feed water, removing or decreasing the concentration of one or more inorganic compounds in the feed water, removing or decreasing the concentration of one or more dyes and/or inks in the feed water, removing or decreasing the concentration of one or more metals in the feed water, removing or decreasing the concentration of one or more heavy metals in the feed water, removing or decreasing the concentration of one or more toxic compounds and/or materials in the feed water, removing or decreasing the concentration of phosphorus in the feed water, removing or decreasing the concentration of a fluoroalkyl compound in the feed water, removing or decreasing the concentration of fluoride in the feed water, removing or decreasing the concentration of sulfide in the feed water, removing or decreasing the concentration of arsenic in the feed water, reducing the chemical oxygen demand (COD) of the feed water, removing or decreasing the concentration of silica in the feed water (e.g., $SiO_3^{2-}$), or a combination thereof.

Aspect 8 provides the method of any one of Aspects 5-7, wherein the feed water comprises suspended solids, wherein the addition of the metal component to the feed water flocculates the suspended solids to form the flocculated solid.

Aspect 9 provides the method of any one of Aspects 5-8, wherein the addition of the metal component to the feed water forms the precipitated solid.

Aspect 10 provides the method of any one of Aspects 5-9, wherein the feed water comprises one or more organic compounds, wherein the clarified aqueous composition has a lower concentration of the one or more organic compounds as compared to the feed water.

Aspect 11 provides the method of any one of Aspects 5-10, wherein the feed water comprises one or more inorganic compounds, wherein the clarified aqueous composition has a lower concentration of the one or more inorganic compounds as compared to the feed water.

Aspect 12 provides the method of any one of Aspects 5-11, wherein the feed water comprises one or more dyes and/or inks, wherein the clarified aqueous composition has a lower concentration of the one or more dyes and/or inks as compared to the feed water.

Aspect 13 provides the method of any one of Aspects 5-12, wherein the feed water comprises one or more metals, wherein the clarified aqueous composition has a lower concentration of the one or more metals as compared to the feed water.

Aspect 14 provides the method of any one of Aspects 5-13, wherein the feed water comprises one or more heavy metals, wherein the clarified aqueous composition has a lower concentration of the one or more heavy metals as compared to the feed water.

Aspect 15 provides the method of any one of Aspects 5-14, wherein the feed water comprises one or more toxic compounds and/or materials, wherein the clarified aqueous composition has a lower concentration of the one or more toxic compounds and/or materials as compared to the feed water.

Aspect 16 provides the method of any one of Aspects 5-15, wherein the feed water comprises fluoride, wherein the aqueous composition has a lower concentration of fluoride as compared to the feed water.

Aspect 17 provides the method of any one of Aspects 5-16, wherein the feed water comprises sulfide, wherein the aqueous composition has a lower concentration of sulfide as compared to the feed water.

Aspect 18 provides the method of any one of Aspects 5-17, wherein the feed water comprises arsenic, wherein the aqueous composition has a lower concentration of arsenic as compared to the feed water.

Aspect 19 provides the method of any one of Aspects 5-18, wherein the clarified aqueous composition has a lower chemical oxygen demand (COD) as compared to the feed water.

Aspect 20 provides the method of any one of Aspects 5-19, wherein the feed water comprises silica, wherein the clarified aqueous composition has a lower concentration of silica as compared to the feed water.

Aspect 21 provides the method of any one of Aspects 5-20, wherein the feed water comprises phosphorus, wherein the clarified aqueous composition has a lower concentration of phosphorus as compared to the feed water.

Aspect 22 provides the method of Aspect 21, wherein the solid comprises a salt comprising the phosphorus from the feed water.

Aspect 23 provides the method of any one of Aspects 21-22, wherein the solid comprises $AlPO_4$.

Aspect 24 provides the method of any one of Aspects 21-23, wherein the phosphorus in the feed water is in the form of elemental phosphorus, inorganic phosphorus, organic phosphorus, a dissolved form of phosphorus, a solid form of phosphorus, oxidized phosphorus, or a combination thereof.

Aspect 25 provides the method of any one of Aspects 21-24, wherein the feed water has a total, dissolved, or reactive phosphorus concentration of about 0.001 ppm to about 10,000 ppm.

Aspect 26 provides the method of any one of Aspects 21-25, wherein the feed water has a total, dissolved, or reactive phosphorus concentration of about 0.01 ppm to about 20 ppm.

Aspect 27 provides the method of any one of Aspects 21-26, wherein the clarified aqueous composition has a total phosphorus concentration, a dissolved phosphorus concentration, or a reactive phosphorus concentration of about 0 ppm to about 1 ppm.

Aspect 28 provides the method of any one of Aspects 21-27, wherein the clarified aqueous composition has a total phosphorus concentration, a dissolved phosphorus concentration, or a reactive phosphorus concentration of about 0.0001 ppm to about 0.1 ppm.

Aspect 29 provides the method of any one of Aspects 21-28, wherein the clarified aqueous composition has a total phosphorus concentration, a dissolved phosphorus concentration, or a reactive phosphorus concentration that is about 0% to about 70% of a respective total, dissolved, or reactive phosphorus concentration of the feed water.

Aspect 30 provides the method of any one of Aspects 21-29, wherein the clarified aqueous composition has a total phosphorus concentration, a dissolved phosphorus concentration, or a reactive phosphorus concentration that is about 0% to about 20% of a respective total, dissolved, or reactive phosphorus concentrate in of the feed water.

Aspect 31 provides the method of any one of Aspects 5-30, wherein the feed water comprises a fluoroalkyl compound, wherein the clarified aqueous composition has a lower concentration of the fluoroalkyl compound as compared to the feed water.

Aspect 32 provides the method of Aspect 31, wherein the fluoroalkyl compound is a perfluoroalkyl or polyfluoroalkyl substance (PFAS), perfluoroalkyl substance, a polyfluoroalkyl substance, a perfluoroalkyl acid (PFAA), or a combination thereof.

Aspect 33 provides the method of any one of Aspects 31-32, wherein the fluoroalkyl compound is perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Aspect 34 provides the method of any one of Aspects 31-33, wherein the clarified aqueous composition has a concentration of the fluoroalkyl compound that is 0% to 20% of the concentration of the fluoroalkyl compound in the feed water.

Aspect 35 provides the method of any one of Aspects 31-34, wherein the clarified aqueous composition has a concentration of the fluoroalkyl compound that is 0.001% to 5% of the concentration of the fluoroalkyl compound in the feed water.

Aspect 36 provides the method of any one of Aspects 31-35, wherein the clarified aqueous composition has a concentration of the fluoroalkyl compound that is 0.001 ppt to 100 ppt.

Aspect 37 provides the method of any one of Aspects 31-36, wherein the clarified aqueous composition has a concentration of the fluoroalkyl compound that is 0.001 ppt to 15 ppt.

Aspect 38 provides the method of any one of Aspects 1-37, wherein feed water has a pH of about 2 to about 14.

Aspect 39 provides the method of any one of Aspects 1-38, wherein the feed water has a pH of about 5 to about 11.

Aspect 40 provides the method of any one of Aspects 1-39, wherein the feed water has a pH of about 5 to about 7.

Aspect 41 provides the method of any one of Aspects 1-40, wherein the feed water has a pH of about 10 to about 11.

Aspect 42 provides the method of any one of Aspects 1-41, further comprising adding acid, base, or a combination thereof to the feed water.

Aspect 43 provides the method of any one of Aspects 1-42, wherein the method is free of pH adjustment of the feed water prior to addition of the metal component thereto.

Aspect 44 provides the method of any one of Aspects 1-43, further comprising adding a cationic polymer to the feed water to form a solid complex comprising the fluoroalkyl compound and the cationic polymer, wherein the cationic polymer is added before, during, or after the addition of the metal component to the feed water.

Aspect 45 provides the method of Aspect 44, wherein the cationic polymer is a natural polymer, a synthetic polymer, a cationic polysaccharide, a gum, alginic acid, cellulose, a cellulose derivative, dextran, glycogen, a polyelectrolyte, a polymer comprising a quaternary ammonium group, poly (diallyl dimethyl ammonium chloride) (polyDADMAC), or a combination thereof.

Aspect 46 provides the method of any one of Aspects 1-45, further comprising adding an oxidizer to the feed water.

Aspect 47 provides the method of Aspect 46, wherein the oxidizer comprises ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof.

Aspect 48 provides the method of any one of Aspects 46-47, wherein adding the oxidizer to the feed water comprises adding an aqueous solution of the oxidizer to the feed water, wherein the aqueous solution of the oxidizer has a concentration of the oxidizer of about 0.001 ppm to about 999,999 ppm.

Aspect 49 provides the method of Aspect 48, wherein the aqueous solution of the oxidizer has a concentration of the oxidizer of about 50,000 ppm to about 140,000 ppm.

Aspect 50 provides the method of any one of Aspects 1-49, wherein the metal of the metal component comprises Mg, Al, Fe, Zn, Cu, Cd, Cr, Hg, Ni, V, Ce, or a combination thereof.

Aspect 51 provides the method of any one of Aspects 1-50, wherein the metal of the metal component comprises Al.

Aspect 52 provides the method of any one of Aspects 1-51, wherein the metal of the metal component comprises Mg.

Aspect 53 provides the method of any one of Aspects 1-52, wherein adding the metal component to the feed water comprises adding to the feed water a salt of the metal of the metal component (e.g., wherein the metal component is a salt of the metal, such as aluminum hydroxide).

Aspect 54 provides the method of Aspect 53, wherein the salt comprises $AlCl_3$, $Al(OH)_3$, $AlPO_4$, $Al_2(SO_4)_3$, or a combination thereof.

Aspect 55 provides the method of any one of Aspects 53-54, wherein the salt comprises $Al_2(SO_4)_3$.

Aspect 56 provides the method of any one of Aspects 1-55, wherein adding the metal component to the feed water comprises adding an aqueous solution of a salt of the metal of the metal component to the feed water.

Aspect 57 provides the method of Aspect 56, wherein the aqueous solution of the salt has a concentration of the metal of 0.001 ppm to about 999,999 ppm.

Aspect 58 provides the method of any one of Aspects 56-57, wherein the aqueous solution of the salt has a concentration of the metal of 50,000 ppm to about 140,000 ppm.

Aspect 59 provides the method of any one of Aspects 56-58, wherein a volumetric ratio of the aqueous solution of the salt added to the feed water to the feed water is 5:1 to 1:1000.

Aspect 60 provides the method of any one of Aspects 56-59, wherein a volumetric ratio of the aqueous solution of the salt added to the feed water to the feed water is 2:1 to 1:10.

Aspect 61 provides the method of any one of Aspects 1-60, wherein the metal of the metal component is produced by a galvanic or electrolytic cell.

Aspect 62 provides the method of any one of Aspects 1-61, further comprising reusing at least some metal component in the clarified aqueous composition, in a solid removed from the feed water, or a combination thereof, as 1 wt % to 100 wt % of the metal component that is added to the feed water.

Aspect 63 provides the method of any one of Aspects 1-62, further comprising reusing at least some metal component in the clarified aqueous composition, in a solid removed from the feed water, or a combination thereof, as the metal component that is added to the feed water.

Aspect 64 provides the method of any one of Aspects 62-63, wherein the method comprises reusing 0.01 wt % to 100 wt % of the metal component in the clarified aqueous composition, in a solid removed from the feed water, or a combination thereof, as the metal component that is added to the feed water.

Aspect 65 provides the method of any one of Aspects 62-64, wherein the method comprises reusing 50 wt % to 100 wt % of the metal component in the clarified aqueous composition, in a solid removed from the feed water, or a combination thereof, as the metal component that is added to the feed water.

Aspect 66 provides the method of any one of Aspects 5-65, wherein the removing of the solid from the feed water forms the clarified aqueous composition having a lower concentration of the solid and also forms an aqueous concentrate having a higher concentration of the solid.

Aspect 67 provides the method of Aspect 66, wherein the aqueous concentrate comprises an extract, a foam, a filtration residue, a separated sediment, a slurry, a sludge, a wet precipitate, or a combination thereof.

Aspect 68 provides the method of any one of Aspects 66-67, wherein the aqueous concentrate comprises the metal component added to the feed water, wherein the method further comprises reusing the metal component from the aqueous concentrate as the metal component that is added to the feed water.

Aspect 69 provides the method of any one of Aspects 66-68, further comprising acidifying the aqueous concentrate to bring a pH of the aqueous concentrate to a pH of 0.5 to 5.

Aspect 70 provides the method of Aspect 69, wherein the acidifying is sufficient to at least partially dissolve one or more salts comprising the metal of the metal component added to the feed water.

Aspect 71 provides the method of any one of Aspects 69-70, further comprising removing solids from the acidified aqueous concentrate and reusing a metal component in the acidified aqueous concentrate as the metal component that is added to the feed water.

Aspect 72 provides the method of any one of Aspects 69-71, wherein the feed water comprises a fluoroalkyl compound, and wherein the solid comprises a metal component-treated fluoroalkyl compound formed by the adding of the metal component to the feed water.

Aspect 73 provides the method of Aspect 72, wherein the method further comprises performing a secondary separation to separate a residual solution from the acidified aqueous concentrate to concentrate the metal component-treated fluoroalkyl compound in the acidified aqueous concentrate and to form the residual solution separated therefrom.

Aspect 74 provides the method of Aspect 73, wherein the secondary separation comprises filtration, precipitation, extraction, aeration, decantation, or a combination thereof.

Aspect 75 provides the method of any one of Aspects 73-74, wherein the secondary separation comprises aerating the aqueous concentrate to form a foam therein.

Aspect 76 provides the method of claim 75, wherein the secondary separation comprises separating the residual solution from the foam.

Aspect 77 provides the method of any one of Aspects 73-76, wherein a ratio of a volume of the acidified aqueous concentrate having the residual solution removed therefrom to a volume of the acidified aqueous concentrate prior to removal of the residual solution therefrom is 1:100,000 to 1:1.

Aspect 78 provides the method of any one of Aspects 73-77, wherein a ratio of a volume of the acidified aqueous concentrate having the residual solution removed therefrom to a volume of the acidified aqueous concentrate prior to removal of the residual solution therefrom is 1:10,000 to 1:5.

Aspect 79 provides the method of any one of Aspects claim 73-78, wherein a ratio of a volume of the acidified aqueous concentrate having the residual solution removed therefrom to a volume of the feed water is 1:1,000,000 to 1:1.

Aspect 80 provides the method of any one of Aspects 73-79, wherein a ratio of a volume of the acidified aqueous concentrate having the residual solution removed therefrom to a volume of the feed water is 1:100,000 to 1:10.

Aspect 81 provides the method of any one of Aspects 73-80, wherein the residual solution comprises the metal component, further comprising recycling the metal component comprising combining the feed water and the residual solution prior to or during the contacting of the feed water and the metal component.

Aspect 82 provides the method of claim 81, wherein recycling the metal component further comprises purging one or more acidification contaminants from the residual solution prior to combining the feed water and the residual solution.

Aspect 83 provides the method of Aspect 82, wherein the purging comprises removing sulfate, chloride, or a combination thereof, from the residual solution.

Aspect 84 provides the method of any one of Aspects 82-83, wherein the purging comprises raising a pH of the liquid comprising the metal component to 3 or less and filtering out a salt of the one or more contaminant ions from the residual solution.

Aspect 85 provides the method of any one of Aspects 82-84, wherein the purging comprises raising a pH of the liquid comprising the metal component to 3 or less and filtering solid aluminum sulfate from the residual solution.

Aspect 86 provides the method of any one of Aspects 82-85, wherein the purging comprises raising a pH of the residual solution the metal component to 4 or less, or 3.5 or less, filtering a solid salt of the metal of the metal component from a residual liquid, and combining the solid salt of the metal of the metal component with the feed water.

Aspect 87 provides the method of any one of Aspects 82-86, wherein the purging comprises raising a pH of the residual solution to 4 or less, or 3.5 or less, filtering aluminum chloride from the residual solution, and combining the solid salt of the metal component with the feed water.

Aspect 88 provides the method of any one of Aspects 71-87, further comprising adding a base to the acidified aqueous concentrate having solids removed therefrom to bring a pH of the aqueous concentrate to 3 to 6.

Aspect 89 provides the method of any one of Aspects 69-88, wherein the feed water and acidified aqueous concentrate comprise a fluoroalkyl compound, wherein the method further comprises destroying the fluoroalkyl compound.

Aspect 90 provides the method of any one of Aspects 5-89, wherein the feed water comprises a fluoroalkyl compound, wherein the solid comprises a metal component-treated fluoroalkyl compound formed by the adding of the metal component to the feed water, and wherein the method further comprises destroying the metal component-treated fluoroalkyl compound.

Aspect 91 provides the method of Aspect 90, wherein destroying the metal component-treated fluoroalkyl compound in the aqueous concentrate forms a liquid comprising the metal component, wherein the method further comprises recycling the metal component comprising combining the feed water and the liquid comprising the metal component prior to contacting the feed water and the metal component, and wherein recycling the metal component further comprises purging one or more acidification contaminants from the liquid comprising the metal component prior to combining the feed water and the liquid comprising the metal component.

Aspect 92 provides the method of Aspect 91, wherein the purging comprises removing one or more contaminant ions from the liquid comprising the metal component, wherein the one or more contaminant ions are from the acidification.

Aspect 93 provides the method of any one of Aspects 91-92, wherein the purging comprises removing sulfate, chloride, or a combination thereof, from the liquid comprising the metal component.

Aspect 94 provides the method of any one of Aspects 91-93, wherein the purging comprises raising a pH of the liquid comprising the metal component to 3 or less and filtering out a salt of the one or more contaminant ions from the liquid comprising the metal component.

Aspect 95 provides the method of any one of Aspects 91-94, wherein the purging comprises raising a pH of the liquid comprising the metal component to 3 or less and filtering solid aluminum sulfate from the liquid comprising the metal component.

Aspect 96 provides the method of any one of Aspects 91-95, wherein the purging comprises raising a pH of the liquid comprising the metal component to 4 or less, or 3.5 or less, filtering a solid salt of the metal component from a residual liquid, and combining the solid salt of the metal of the metal component with the feed water.

Aspect 97 provides the method of any one of Aspects 91-96, wherein the purging comprises raising a pH of the liquid comprising the metal component to 4 or less, or 3.5 or less, filtering aluminum chloride from the liquid comprising the metal component, and combining the solid salt of the metal of the metal component with the feed water.

Aspect 98 provides the method of any one of Aspects 90-97, wherein destroying the fluoroalkyl compound or metal component-treated fluoroalkyl compound comprises thermal treatment, treatment with an electrolytic cell, plasma reactor, supercritical water, combustion, chemical treatment, or a combination thereof.

Aspect 99 provides the method of any one of Aspects 90-98, wherein destroying the fluoroalkyl compound in the aqueous concentrate comprises destroying 60 wt % to 100 wt % of the fluoroalkyl compound in the aqueous concentrate.

Aspect 100 provides the method of any one of Aspects 90-99, wherein destroying the fluoroalkyl compound in the aqueous concentrate comprises destroying 95 wt % to 100 wt % of the fluoroalkyl compound in the aqueous concentrate.

Aspect 101 provides the method of any one of Aspects 90-100, wherein the destroying the fluoroalkyl compound comprises thermal treatment.

Aspect 102 provides the method of Aspect 101, wherein the thermal treatment comprises heating to a treatment temperature of 1000° C. to 5000° C.

Aspect 103 provides the method of any one of Aspects 101-102, wherein the thermal treatment comprises heating to a treatment temperature of 1400° C. to 2000° C.

Aspect 104 provides the method of any one of Aspects 101-103, wherein the thermal treatment comprises heating to a treatment temperature of 1500° C. or higher.

Aspect 105 provides the method of any one of Aspects 101-104, wherein the thermal treatment comprises maintaining the fluoroalkyl compound at the treatment temperature for a duration of 0.1 sec to 24 h.

Aspect 106 provides the method of any one of Aspects 90-105, wherein the destroying the fluoroalkyl compound comprises treatment with an electrolytic cell comprising an electrolytic anode and an electrolytic cathode.

Aspect 107 provides the method of Aspect 106, wherein destroying the fluoroalkyl compound further comprises acidifying an aqueous solution including the solid prior to the treatment with the electrolytic cell to bring a pH of the aqueous solution to a pH of 0.5 to 5.

Aspect 108 provides the method of any one of Aspects 106-107, wherein acidifying the aqueous solution is sufficient to dissolve the metal component in the aqueous concentrate.

Aspect 109 provides the method of Aspect 108, wherein the metal component comprises an aluminum ion and/or aluminum hydroxide.

Aspect 110 provides the method of any one of Aspects 106-109, wherein the treatment with the electrolytic cell forms an electrolytically-treated composition comprising a solid and a liquid.

Aspect 111 provides the method of Aspect 110, wherein the liquid comprises the metal component added to the feed water, wherein the method further comprises separating the liquid and the solid and reusing the metal component as the metal component that is added to the feed water.

Aspect 112 provides the method of Aspect 111, wherein the metal component comprises an aluminum ion and/or aluminum hydroxide, wherein the liquid comprises the aluminum ion and/or aluminum hydroxide, wherein the method further comprises separating the liquid and the solid and recycling the aluminum ion and/or aluminum hydroxide comprising combining the feed water and the liquid comprising the aluminum ion and/or aluminum hydroxide.

Aspect 113 provides the method of any one of Aspects 106-112, wherein the method further comprises adding a base to the liquid separated from the solid to bring a pH of the liquid to 3-6.

Aspect 114 provides the method of Aspect 113, wherein the method comprises adding the base to the liquid separated from the solid to bring a pH of the liquid to 5.5-8.

Aspect 115 provides the method of any one of Aspects 113-114, wherein the method further comprises filtering the electrolytically-treated composition having base added thereto and adding a resulting liquid to the feed water.

Aspect 116 provides the method of any one of Aspects 106-115, wherein the method comprises treating the fluoroalkyl compound with the electrolytic cell for a duration of 1 sec to 24 h.

Aspect 117 provides the method of Aspect 116, wherein the duration is 50 min to 200 min.

Aspect 118 provides the method of any one of Aspects 106-117, wherein the electrolytic anode comprises an anode material comprising a metal oxide, a transition metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof. For example, the electrolytic anode can include $RuO_2$ and $IrO_2$, or can include $PbO_2$ and $Bi_2O_3$, or can include $IrO_2$, $RuO_2$, $PtO_2$, and $Rh_2O_3$. The electrolytic anode can be formed entirely of the anode material (e.g., and is free of catalyst coatings) or the electrolytic anode can include a coating or deposition of the anode material (e.g., as a catalyst coating) on a suitable substrate such as titanium, stainless steel, carbon steel, carbon (e.g., BDD, graphite, graphene, or a combination thereof), or a combination thereof. The catalyst coating can be on one major face of the electrolytic anode or on both major faces.

Aspect 119 provides the method of any one of Aspects 106-118, wherein the electrolytic cathode comprises stainless steel, titanium, carbon (e.g., BDD, graphite, graphene, or a combination thereof), carbon steel, a precious metal, platinum, nickel, iron, copper, silver, or a combination thereof. The electrolytic cathode can be formed entirely of the cathode material (e.g., and is free of catalyst coatings) or the electrolytic cathode can include a coating of the cathode material (e.g., as a catalyst coating) on a suitable substrate, such as on a substrate that is titanium, stainless steel, carbon steel, Pt, Ni, Fe, Cu, Ag, carbon, or a combination thereof. The catalyst coating can be on one major face of the electrolytic cathode or on both major faces.

Aspect 120 provides the method of any one of Aspects 106-119, wherein the treatment with the electrolytic cell comprises applying a voltage across the electrolytic anode and the electrolytic cathode sufficient to generate a current density of 5-500 $mA/cm^2$.

Aspect 121 provides the method of Aspect 120, wherein the voltage is sufficient to generate a current density of 10-40 $mA/cm^2$.

Aspect 122 provides the method of any one of Aspects 106-121, further comprising adding an additive to the aqueous concentrate before or during treatment with the electrolytic cell, the additive comprising $H_2SO_4$, HCl, $K_2SO_4$, $Na_2SO_4$, $Na_2S_2O_8$, $KHSO_5$, $H_2O_2$, NaCl, KCl, or a combination thereof.

Aspect 123 provides the method of any one of Aspects 66-122, further comprising removing water from the aqueous concentrate to form a dried contaminant composition comprising the fluoroalkyl compound, further comprising destroying the fluoroalkyl compound in the aqueous concentrate comprising destroying the fluoroalkyl compound in the dried contaminant composition.

Aspect 124 provides the method of any one of Aspects 1-123, wherein the feed water comprises a fluoroalkyl compound, wherein the feed water having the metal component added thereto comprises a foam that comprises the fluoroalkyl compound.

Aspect 125 provides the method of Aspect 124, wherein the foam comprises bubbles added to the solution with a bubbler.

Aspect 126 provides the method of Aspect 125, wherein the bubbles added to the solution with a bubbler comprise air, an inert gas, nitrogen, hydrogen, a noble gas, helium argon, xenon, or a combination thereof.

Aspect 127 provides the method of any one of Aspects 124-126, wherein the foam has a higher concentration of the fluoroalkyl compound than a remainder of the feed water.

Aspect 128 provides the method of any one of Aspects 124-127, further comprising removing the foam from the feed water to form the clarified aqueous composition, wherein the aqueous concentrate comprises the foam.

Aspect 129 provides the method of Aspect 128, wherein the removing of the foam comprises scraping the foam from the top of the feed water, scooping the foam from the top of the feed water, sucking the foam from the top of the feed water, filtering the foam from the feed water, decanting the foam from the feed water, or a combination thereof.

Aspect 130 provides the method of Aspect 129, wherein the removing of the foam comprises scraping and/or scooping the foam from the top of the feed.

Aspect 131 provides the method of any one of Aspects 128-129, further comprising breaking the foam, filtering the foam, or a combination thereof, to form a broken foam.

Aspect 132 provides the method of Aspect 131, wherein breaking the foam comprises applying vacuum, applying heat, allowing the foam to sit for a duration, or a combination thereof.

Aspect 133 provides the method of any one of Aspects 131-132, further comprising filtering the broken foam to form a residue comprising the fluoroalkyl compound, wherein the residue has a higher concentration of the fluoroalkyl compound than a filtrate formed during the filtering.

Aspect 134 provides the method of any one of Aspects 1-133, wherein the method is free of treating the feed water or clarified aqueous composition with a galvanic cell or electrolytic cell.

Aspect 135 provides the method of any one of Aspects 1-133, further comprising treating the clarified aqueous composition with a galvanic cell, to form product water.

Aspect 136 provides the method of Aspect 135, wherein the treatment of the clarified aqueous composition removes or decreases an emulsion in the clarified aqueous composition, decreases turbidity of the clarified aqueous composition, or a combination thereof.

Aspect 137 provides the method of any one of Aspects 135-136, wherein the clarified aqueous composition comprises an emulsion, wherein the product water comprises no emulsion or comprises a reduced emulsion compared to the clarified aqueous composition.

Aspect 138 provides the method of any one of Aspects 135-137, wherein the product water comprises lower turbidity than the clarified aqueous composition.

Aspect 139 provides the method of any one of Aspects 135-138, wherein the treatment of the clarified aqueous composition with the galvanic cell forms a galvanically precipitated and/or flocculated solid, wherein the method further comprises removing the galvanically precipitated and/or flocculated solid from the galvanic cell-treated clarified aqueous composition, to form the product water.

Aspect 140 provides the method of Aspect 139, wherein removing the galvanically precipitated and/or flocculated solid comprises filtration, gravity settling, decantation, centrifugation, desanding hydroclone, or a combination thereof.

Aspect 141 provides the method of any one of Aspects 139-140, wherein the treatment of the clarified aqueous composition with the galvanic cell coagulates and/or precipitates suspended solids from the clarified aqueous composition, removes or decreases the concentration of one or more organic compounds in the clarified aqueous composition, removes or decreases the concentration of one or more inorganic compounds in the clarified aqueous composition, removes or decreases the concentration of one or more dyes and/or inks in the clarified aqueous composition, removes or decreases the concentration of one or more metals in the clarified aqueous composition, removes or decreases the concentration of one or more heavy metals in the clarified aqueous composition, removes or decreases the concentration of one or more toxic compounds and/or materials in the clarified aqueous composition, removes or decreases the concentration of phosphorus in the clarified aqueous composition, removes or decreases the concentration of a fluoroalkyl compound in the clarified aqueous composition, removes or decreases the concentration of fluoride in the clarified aqueous composition, removes or decreases the concentration of sulfide in the clarified aqueous composition, removes or decreases the concentration of arsenic in the clarified aqueous composition, reduces the chemical oxygen demand (COD) of the clarified aqueous composition, removes or decreases the concentration of silica in the clarified aqueous composition (e.g., $SiO_3^{2-}$), or a combination thereof.

Aspect 142 provides the method of any one of Aspects 139-141, wherein the clarified aqueous composition comprises suspended solids, wherein the treatment of the clarified aqueous composition with the galvanic cell flocculates the suspended solids to form the flocculated solid.

Aspect 143 provides the method of any one of Aspects 139-142, wherein the treatment of the clarified aqueous composition with the galvanic cell forms the precipitated solid.

Aspect 144 provides the method of any one of Aspects 139-143, wherein the clarified aqueous composition comprises one or more organic compounds, wherein the product water has a lower concentration of the one or more organic compounds as compared to the clarified aqueous composition.

Aspect 145 provides the method of any one of Aspects 139-144, wherein the clarified aqueous composition comprises one or more inorganic compounds, wherein the product water has a lower concentration of the one or more inorganic compounds as compared to the clarified aqueous composition.

Aspect 146 provides the method of any one of Aspects 139-145, wherein the clarified aqueous composition comprises one or more dyes and/or inks, wherein the product water has a lower concentration of the one or more dyes and/or inks as compared to the clarified aqueous composition.

Aspect 147 provides the method of any one of Aspects 139-146, wherein the clarified aqueous composition comprises one or more metals, wherein the product water has a lower concentration of the one or more metals as compared to the clarified aqueous composition.

Aspect 148 provides the method of any one of Aspects 139-147, wherein the clarified aqueous composition comprises one or more heavy metals, wherein the product water has a lower concentration of the one or more heavy metals as compared to the clarified aqueous composition.

Aspect 149 provides the method of any one of Aspects 139-148, wherein the clarified aqueous composition comprises one or more toxic compounds and/or materials, wherein the product water has a lower concentration of the one or more toxic compounds and/or materials in the clarified aqueous composition.

Aspect 150 provides the method of any one of Aspects 139-149, wherein the clarified aqueous composition comprises fluoride, wherein the aqueous composition has a lower concentration of fluoride as compared to the clarified aqueous composition.

Aspect 151 provides the method of any one of Aspects 139-150, wherein the clarified aqueous composition comprises sulfide, wherein the aqueous composition has a lower concentration of sulfide as compared to the clarified aqueous composition.

Aspect 152 provides the method of any one of Aspects 139-151, wherein the clarified aqueous composition comprises arsenic, wherein the aqueous composition has a lower concentration of arsenic as compared to the clarified aqueous composition.

Aspect 153 provides the method of any one of Aspects 139-152, wherein the product water has a lower chemical oxygen demand (COD) as compared to the clarified aqueous composition.

Aspect 154 provides the method of any one of Aspects 139-153, wherein the clarified aqueous composition comprises silica, wherein the product water has a lower concentration of silica as compared to the clarified aqueous composition.

Aspect 155 provides the method of any one of Aspects 139-154, wherein the clarified aqueous composition comprises phosphorus, wherein the product water has a lower concentration of phosphorus as compared to the clarified aqueous composition.

Aspect 156 provides the method of Aspect 155, wherein the solid comprises a salt comprising the phosphorus from the clarified aqueous composition.

Aspect 157 provides the method of any one of Aspects 155-156, wherein the solid comprises $AlPO_4$.

Aspect 158 provides the method of any one of Aspects 155-157, wherein the phosphorus in the clarified aqueous composition is in the form of elemental phosphorus, inorganic phosphorus, organic phosphorus, a dissolved form of phosphorus, a solid form of phosphorus, oxidized phosphorus, or a combination thereof.

Aspect 159 provides the method of any one of Aspects 155-158, wherein the clarified aqueous composition has a total, dissolved, or reactive phosphorus concentration of about 0.001 ppm to about 10,000 ppm.

Aspect 160 provides the method of any one of Aspects 155-159, wherein the clarified aqueous composition has a total, dissolved, or reactive phosphorus concentration of about 0.01 ppm to about 20 ppm.

Aspect 161 provides the method of any one of Aspects 155-160, wherein the product water has a total phosphorus concentration, a dissolved phosphorus concentration, or a reactive phosphorus concentration of about 0 ppm to about 1 ppm.

Aspect 160 provides the method of any one of Aspects 155-161, wherein the product water has a total phosphorus concentration, a dissolved phosphorus concentration, or a reactive phosphorus concentration of about 0.0001 ppm to about 0.1 ppm.

Aspect 161 provides the method of any one of Aspects 155-160, wherein the product water has a total phosphorus concentration, a dissolved phosphorus concentration, or a reactive phosphorus concentration that is about 0% to about 70% of a respective total, dissolved, or reactive phosphorus concentration of the clarified aqueous composition.

Aspect 162 provides the method of any one of Aspects 155-161, wherein the product water has a total phosphorus concentration, a dissolved phosphorus concentration, or a reactive phosphorus concentration that is about 0% to about 20% of a respective total, dissolved, or reactive phosphorus concentrate in of the clarified aqueous composition.

Aspect 163 provides the method of any one of Aspects 139-162, wherein the clarified aqueous composition comprises a fluoroalkyl compound, wherein the product water has a lower concentration of the fluoroalkyl compound as compared to the clarified aqueous composition.

Aspect 164 provides the method of Aspect 163, wherein the fluoroalkyl compound is a perfluoroalkyl or polyfluoroalkyl substance (PFAS), perfluoroalkyl substance, a polyfluoroalkyl substance, a perfluoroalkyl acid (PFAA), or a combination thereof.

Aspect 165 provides the method of any one of Aspects 163-164, wherein the fluoroalkyl compound is perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Aspect 166 provides the method of any one of Aspects 163-165, wherein the product water has a concentration of the fluoroalkyl compound that is 0% to 20% of the concentration of the fluoroalkyl compound in the clarified aqueous composition.

Aspect 167 provides the method of any one of Aspects 163-166, wherein the product water has a concentration of the fluoroalkyl compound that is 0.001% to 5% of the concentration of the fluoroalkyl compound in the clarified aqueous composition.

Aspect 168 provides the method of any one of Aspects 163-167, wherein the feed water and/or the clarified aqueous composition has a concentration of the fluoroalkyl compound of 1 part per trillion (ppt) to 100 parts per million (ppm).

Aspect 169 provides the method of any one of Aspects 163-168, wherein the feed water and/or the clarified aqueous composition has a concentration of the fluoroalkyl compound of 20 part per trillion (ppt) to 1 part per million (ppm).

Aspect 170 provides the method of any one of Aspects 163-169, wherein the product water has a concentration of the fluoroalkyl compound that is 0.001 ppt to 100 ppt.

Aspect 171 provides the method of any one of Aspects 163-170, wherein the product water has a concentration of the fluoroalkyl compound that is 0.001 ppt to 15 ppt.

Aspect 172 provides the method of any one of Aspects 135-171, wherein clarified aqueous composition has a pH of about 2 to about 14.

Aspect 173 provides the method of any one of Aspects 135-172, wherein the clarified aqueous composition has a pH of about 5 to about 11.

Aspect 174 provides the method of any one of Aspects 135-173, wherein the clarified aqueous composition has a pH of about 5 to about 7.

Aspect 175 provides the method of any one of Aspects 135-174, wherein the clarified aqueous composition has a pH of about 10 to about 11.

Aspect 176 provides the method of any one of Aspects 135-175, further comprising adding acid, base, or a combination thereof to the clarified aqueous composition.

Aspect 177 provides the method of any one of Aspects 113-176, wherein the method is free of pH adjustment of the clarified aqueous composition prior to treatment with the galvanic cell thereto.

Aspect 178 provides the method of any one of Aspects 113-177, further comprising adding an oxidizer to the clarified aqueous composition.

Aspect 179 provides the method of Aspect 178, wherein the oxidizer comprises ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof.

Aspect 180 provides the method of any one of Aspects 178-179, wherein adding the oxidizer to the clarified aqueous composition comprises adding an aqueous solution of the oxidizer to the clarified aqueous composition, wherein the aqueous solution of the oxidizer has a concentration of the oxidizer of about 0.001 ppm to about 999,999 ppm.

Aspect 181 provides the method of Aspect 180, wherein the aqueous solution of the oxidizer has a concentration of the oxidizer of about 50,000 ppm to about 140,000 ppm.

Aspect 182 provides the method of any one of Aspects 113-181, wherein the clarified aqueous composition comprises a fluoroalkyl compound, wherein the treatment of the clarified aqueous composition with the galvanic cell forms the galvanic cell-treated water comprising a galvanic cell-treated fluoroalkyl compound, wherein the method further comprises separating the galvanic cell-treated fluoroalkyl compound from the galvanic cell-treated water to form the product water having a lower concentration than the clarified aqueous composition and to form an aqueous concentrate having a higher concentration of the galvanic cell-treated fluoroalkyl compound than the product water.

Aspect 183 provides the method of Aspect 182, wherein the galvanic cell-treated fluoroalkyl compound comprises an oxidation product of the fluoroalkyl compound, a complex formed between the fluoroalkyl compound and one or more ions formed by the galvanic cell, a reaction product of the fluoroalkyl compound and one or more ions formed by the galvanic cell, or a combination thereof.

Aspect 184 provides the method of any one of Aspects 113-183, wherein the treatment of the clarified aqueous composition with the galvanic cell is performed in a plug-flow reactor or tank.

Aspect 185 provides the method of any one of Aspects 113-184, wherein the galvanic cell comprises:
an anode comprising Mg, Al, Fe, Zn, Cu, Cd, Cr, Hg, Ni, V, Ce, or a combination thereof; and
a cathode having a different composition than the anode, wherein the cathode comprises Al, Zn, Fe, Cd, Ni, Sn, Pb, Cu, Ag, Co, Mn, Pd, Ag, carbon, or a combination thereof.

Aspect 186 provides the method of Aspect 185, wherein the anode comprises Al and the cathode comprises Cu.

Aspect 187 provides the method of any one of Aspects 185-186, wherein the anode is 90 wt % to 100 wt % Al, and the cathode is 90 wt % to 100 wt % Cu.

Aspect 188 provides the method of any one of Aspects 185-187, wherein the galvanic cell comprises not more than one of the anodes and not more than one of the cathodes.

Aspect 189 provides the method of any one of Aspects 185-188, wherein the galvanic cell comprises a plurality of the anodes and a plurality of the cathodes.

Aspect 190 provides the method of any one of Aspects 185-189, wherein the cathode is plated and/or deposited onto a surface of the anode.

Aspect 191 provides the method of any one of Aspects 185-190, wherein the cathode and/or the anode comprise a plating and/or deposition thereon comprising Mg, Al, Fe, Zn, Cu, Cd, Cr, Hg, Ni, V, Ce, Sn, Pb, Ag, Co, Mn, Pd, Mo, or a combination thereof.

Aspect 192 provides the method of any one of Aspects 185-191, wherein the anode comprises Cu plated and/or deposited onto a surface thereof, wherein the cathode comprises Cu and wherein the cathode is not plated or deposited on the anode comprising Al.

Aspect 193 provides the method of any one of Aspects 185-192, wherein the anode and the cathode are in physical contact with one another.

Aspect 194 provides the method of any one of Aspects 185-193, wherein the anode and the cathode are free of physical contact with one another.

Aspect 195 provides the method of any one of Aspects 185-194, wherein the anode and cathode independently comprise a rod, a bar, a tube, a sheet, a plate, an inclined plate, a strip, a non-porous material, a porous material, a screen, a wire mesh, or a combination thereof.

Aspect 196 provides the method of any one of Aspects 185-195, wherein the anode and cathode are rods, bars, or a combination thereof.

Aspect 197 provides the method of any one of Aspects 185-196, wherein the anode is a strip, and wherein the cathode is a porous material.

Aspect 198 provides the method of any one of Aspects 185-197, wherein the porous material comprises a screen, a wire mesh, or a combination thereof.

Aspect 199 provides the method of any one of Aspects 185-198, wherein the anode and the cathode comprise a gap therebetween, wherein the gap is 1 mm to 110 mm.

Aspect 200 provides the method of any one of Aspects 185-199, wherein the gap is 2 mm to 30 mm.

Aspect 201 provides the method of any one of Aspects 185-200, wherein the galvanic cell comprises a conductive connector that electrically and physically connects the anode and the cathode, wherein the conductive connector maintains the gap between the anode and the cathode.

Aspect 202 provides the method of any one of Aspects 185-201, wherein the galvanic cell comprises a nonconductive connector that physically connects the anode and the cathode.

Aspect 203 provides the method of any one of Aspects 185-202, wherein the nonconductive connector comprises plastic, glass, rubber, or a combination thereof, and/or wherein the nonconductive connector comprises a conductive connector coated with a non-conductive material.

Aspect 204 provides the method of any one of Aspects 185-203, wherein the nonconductive connector comprises a weld, a fastener, a fastener assembly, a threaded fastener, a screw, a bolt, a bracket, a nut, a washer, or a combination thereof.

Aspect 205 provides the method of any one of Aspects 185-204, wherein the galvanic cell comprises a conductive connector that electrically and physically connects the anode and the cathode.

Aspect 206 provides the method of Aspect 205, wherein the conductive connector comprises Cu, Zn, Fe, Cd, Ni, Sn, Pb, or a combination thereof.

Aspect 207 provides the method of any one of Aspects 205-206, wherein the conductive connector comprises brass, stainless steel, or a combination thereof.

Aspect 208 provides the method of any one of Aspects 205-207, wherein the conductive connector comprises a weld, a fastener, a fastener assembly, a threaded fastener, a screw, a bolt, a bracket, a nut, a washer, or a combination thereof.

Aspect 209 provides the method of any one of Aspects 1-208, further comprising treating the feed water or the clarified aqueous composition with UV light before or during the addition of the metal component to the feed composition or before or during the treatment of the clarified aqueous composition with the galvanic cell.

Aspect 210 provides the method of any one of Aspects 185-209, further comprising treating the clarified aqueous composition with UV light before or during the contacting of the clarified composition with a galvanic cell.

Aspect 211 provides the method of any one of Aspects 185-210, wherein the UV light comprises a wavelength of less than 254 nm.

Aspect 212 provides the method of any one of Aspects 185-211, wherein the UV light comprises a wavelength of 180 nm to 220 nm.

Aspect 213 provides the method of any one of Aspects 139-212, wherein the removing of the galvanically precipitated and/or flocculated solid from the clarified aqueous composition forms the product water having a lower concentration of the galvanically precipitated and/or flocculated solid and to form an aqueous concentrate having a higher concentration of the galvanically precipitated and/or flocculated solid.

Aspect 214 provides the method of Aspect 213, wherein the aqueous concentrate comprises an extract, a foam, a filtration residue, a separated sediment, a slurry, a sludge, a wet precipitate, or a combination thereof.

Aspect 215 provides the method of any one of Aspects 213-214, wherein the aqueous concentrate comprises the metal component added to the feed water, wherein the method further comprises reusing the metal component from the aqueous concentrate as the metal component that is added to the feed water.

Aspect 216 provides the method of any one of Aspects 213-215, further comprising acidifying the aqueous concentrate to bring a pH of the aqueous concentrate to a pH of 0.5 to 5.

Aspect 217 provides the method of Aspect 216, wherein the acidifying is sufficient to at least partially dissolve one or more salts comprising the metal of the metal component added to the feed water.

Aspect 218 provides the method of any one of Aspects 216-217, further comprising removing solids from the acidified aqueous concentrate and reusing a metal component in the acidified aqueous concentrate as the metal component that is added to the feed water.

Aspect 219 provides the method of Aspect 218, further comprising adding a base to the acidified aqueous concentrate having solids removed therefrom to bring a pH of the aqueous concentrate to 3 to 6.

Aspect 220 provides the method of any one of Aspects 213-219, wherein the clarified aqueous composition and the aqueous concentrate comprise a fluoroalkyl compound, wherein the method further comprises destroying the fluoroalkyl compound.

Aspect 221 provides the method of Aspect 220, wherein destroying the fluoroalkyl compound comprises thermal treatment, treatment with an electrolytic cell, plasma reactor, supercritical water, combustion, chemical treatment, or a combination thereof.

Aspect 222 provides the method of any one of Aspects 220-221, wherein destroying the fluoroalkyl compound in the aqueous concentrate comprises destroying 60 wt % to 100 wt % of the fluoroalkyl compound in the aqueous concentrate.

Aspect 223 provides the method of any one of Aspects 220-222, wherein destroying the fluoroalkyl compound in the aqueous concentrate comprises 95 wt % to 100 wt % of the fluoroalkyl compound in the aqueous concentrate.

Aspect 224 provides the method of any one of Aspects 1-223, further comprising pretreating the feed water prior to and/or during addition of the metal component to the feed water.

Aspect 225 provides the method of Aspect 224, wherein the pretreatment comprises adjusting pH of the feed water, adding one or more additives to the feed water, filtering the feed water, allowing sediment to settle from the feed water, removing nitrogen from the feed water (e.g., via electrochemical treatment of the water, or treatment with an oxidizer such as sedum hypochlorite, to remove nitrogen as ammonia), removing phosphorus from the feed water, treating the feed water with a pretreatment galvanic cell, or a combination thereof.

Aspect 226 provides the method of any one of Aspects 224-225, wherein the pretreatment comprises adding one or more additives to the feed water, the one or more additives comprising a polymer flocculant, a radical precursor, hydrogen peroxide, a persulfate salt, an oxidizer, sodium hypochlorite, NaCl, $CaCl_2$), KCl, or a combination thereof.

Aspect 227 provides the method of Aspect 226, wherein the one or more additives comprise a radical precursor comprising HOOH, $O_3$, $S_2O_8^-$, $I^-$, $CO_3^{2-}$, $HCO_3^-$, $H_2PO_4^-$, $HPO_4^{2-}$, $PO_4^{3-}$, $HSO_5^-$, or a combination thereof.

Aspect 228 provides the method of any one of Aspects 226-227, wherein the oxidizer comprises ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof.

Aspect 229 provides the method of any one of Aspects 224-228, wherein the pretreatment comprises adjusting pH of the feed water to 2 to 12.

Aspect 230 provides the method of any one of Aspects 224-229, wherein the pretreatment comprises adding base to the feed water to bring a pH of the feed water to 9.5 to 11.5.

Aspect 231 provides the method of Aspect 230, wherein the pretreatment further comprises filtering the feed water having base added thereto, wherein the metal component is added to the filtered water.

Aspect 232 provides the method of Aspect 231, wherein the method further comprises adding solids removed during the filtration of the feed water having base added thereto to the aqueous concentrate.

Aspect 233 provides the method of any one of Aspects 230-231, wherein the pretreatment further comprises removing nitrogen from the feed water as ammonia after adding the base to the feed water.

Aspect 234 provides the method of Aspect 233, wherein the removing of nitrogen comprises combining the feed water with an oxidizer.

Aspect 235 provides the method of Aspect 234, wherein the oxidizer comprises sodium hypochlorite.

Aspect 236 provides the method of any one of Aspects 233-235, further comprising filtering the feed water having nitrogen removed therefrom as ammonia, wherein the metal component is added to the filtered feed water.

Aspect 237 provides the method of Aspect 236, wherein the method further comprises adding solids removing during filtration of the feed water having nitrogen removed as ammonia to the aqueous concentrate.

Aspect 238 provides the method of any one of Aspects 1-237, wherein the metal component is added to the feed water prior to any pretreatment, after addition of base, after addition of base and removal of nitrogen as ammonia, or a combination thereof.

Aspect 239 provides the method of any one of Aspects 1-238, wherein the metal component is added to the feed water after addition of base thereto.

Aspect 240 provides the method of any one of Aspects 1-239, wherein the metal component is added to the feed water after addition of base thereto and after removal of nitrogen therefrom as ammonia.

Aspect 241 provides a method of treating feed water, the method comprising:
  adding a metal component comprising a metal to the feed water comprising a fluoroalkyl compound to form a solid that includes the fluoroalkyl compound from the feed water, wherein the metal component comprises an ion of the metal, a dissolved or solid compound of the metal, an elemental form of the metal, or a combination thereof; and
  removing the solid from the feed water to form a clarified aqueous composition, wherein the clarified aqueous composition has a lower concentration of the fluoroalkyl compound than the feed water.

Aspect 242 provides a method of treating feed water, the method comprising:
  adding a metal component comprising to the feed water comprising phosphorus to form a solid that includes a salt that includes the phosphorus from the feed water, wherein the metal component comprises an ion of the metal, a dissolved or solid compound of the metal, an elemental form of the metal, or a combination thereof; and removing the solid from the feed water to form a clarified aqueous composition, wherein the clarified aqueous composition has a lower concentration of phosphorus than the feed water.

Aspect 243 provides a method of treating feed water, the method comprising:
adding a metal component comprising a metal to the feed water comprising phosphorus to form a solid comprising phosphorus from the feed water, wherein the metal component comprises an ion of the metal, a dissolved or solid compound of the metal, an elemental form of the metal, or a combination thereof;
removing the solid from the feed water to form a clarified aqueous composition including phosphorus, wherein the clarified aqueous composition has a lower concentration of phosphorus than the feed water;
treating the clarified aqueous composition with a galvanic cell to form a galvanically precipitated and/or flocculated solid including phosphorus from the clarified aqueous composition; and
removing the galvanically precipitated and/or flocculated solid from the clarified aqueous composition, to form a product water having a lower concentration of phosphorus than the clarified aqueous composition.

Aspect 244 provides a method of treating feed water, the method comprising:
adding a metal component comprising a metal to feed water to form a clarified aqueous composition, wherein the metal component comprises an ion of the metal, a solid or dissolved compound of the metal, an elemental form of the metal, or a combination thereof; and
treating the clarified aqueous composition with a galvanic cell to form a product water.

Aspect 245 provides a method of treating feed water, the method comprising:
adding a metal component comprising a metal to feed water to form a clarified aqueous composition, wherein the metal component comprises an ion of the metal, a dissolved or solid compound of the metal, an elemental form of the metal, or a combination thereof; and
treating the clarified aqueous composition with a galvanic cell to form a product water, wherein the product water has a reduced emulsion, decreased turbidity, or a combination thereof, as compared to the feed water.

Aspect 246 provides a method of treating feed water, the method comprising:
adding a metal component comprising a metal to feed water to form a solid, wherein the metal component comprises an ion of the metal, a dissolved or solid compound of the metal, an elemental form of the metal, or a combination thereof;
removing the solid from the feed water to form a clarified aqueous composition;
treating the clarified aqueous composition with a galvanic cell to form a galvanically precipitated and/or flocculated solid; and
removing the galvanically precipitated and/or flocculated solid from the clarified aqueous composition, to form a product water Aspect 247 provides a method of treating feed water, the method comprising:
adding a metal component comprising a metal to feed water to form a solid, wherein the metal component comprises an ion of the metal, a solid or dissolved compound of the metal, an elemental form of the metal, or a combination thereof;
removing the solid from the feed water to form a clarified aqueous composition;
treating the clarified aqueous composition with a galvanic cell to form a galvanically precipitated and/or flocculated solid; and
removing the galvanically precipitated and/or flocculated solid from the clarified aqueous composition, to form a product water, wherein as compared to the feed water, the product water has a decreased concentration of one or more organic compounds, a decreased concentration of one or more inorganic compounds, a decreased concentration of one or more dyes and/or inks, a decreased concentration of one or more metals, a decreased concentration of one or more heavy metals, a decreased concentration of one or more toxic compounds and/or materials, a decreased concentration of phosphorus, a decreased concentration of a fluoroalkyl compound, a decreased concentration of sulfide, a decreased concentration of arsenic, a decreased concentration of silica, a reduced chemical oxygen demand (COD), or a combination thereof.

Aspect 248 provides a method of treating feed water, the method comprising:
performing a treatment comprising adding a metal component including aluminum to feed water comprising a fluoroalkyl compound to form a solid comprising a metal component-treated fluoroalkyl compound, wherein the metal component comprises an ion of the aluminum, a dissolved or solid compound of the aluminum, an elemental form of the aluminum, or a combination thereof;
removing the solid from the feed water to form a clarified aqueous composition having a lower concentration of the fluoroalkyl compound than the feed water and to form an aqueous concentrate having a higher concentration of the solid than the clarified aqueous composition;
acidifying the aqueous concentrate;
performing a secondary separation to separate a residual solution from the aqueous concentrate after the acidification and to concentrate the metal component-treated fluoroalkyl compound in the aqueous concentrate; and
adding the metal component from the residual solution to the feed water prior to or during the treatment.

Aspect 249 provides a method of treating feed water, the method comprising:
performing a treatment comprising adding a metal component comprising aluminum to feed water comprising a fluoroalkyl compound to form a solid comprising a metal component-treated fluoroalkyl compound, wherein the metal component comprises an ion of the aluminum, a solid or dissolved compound of the aluminum, an elemental form of the aluminum, or a combination thereof;
removing the solid from the feed water to form a clarified aqueous composition having a lower concentration of the fluoroalkyl compound than the feed water and to form an aqueous concentrate having a higher concentration of the solid than the clarified aqueous composition;
acidifying the aqueous concentrate;
performing a secondary separation to separate a residual solution from the aqueous concentrate after the acidification and to concentrate the metal component-treated fluoroalkyl compound in the aqueous concentrate;
purging one or more acidification contaminants from the liquid comprising the metal component; and adding the metal component from the liquid comprising the metal component to the feed water prior to or during the treatment.

Aspect 250 provides a method of treating feed water, the method comprising:
performing a treatment comprising adding an aluminum ion and/or aluminum hydroxide to feed water comprising a fluoroalkyl compound to form a solid comprising a metal component-treated fluoroalkyl compound;
removing the solid from the feed water to form a clarified aqueous composition having a lower concentration of the fluoroalkyl compound than the feed water and to form an aqueous concentrate having a higher concentration of the solid than the clarified aqueous composition;
acidifying the aqueous concentrate;
destroying the metal component-treated fluoroalkyl compound in the aqueous concentrate to form a liquid comprising the aluminum ion and/or aluminum hydroxide;
purging one or more acidification contaminants from the liquid comprising the aluminum ion and/or aluminum hydroxide; and
recycling the aluminum ion and/or aluminum hydroxide comprising combining the feed water and the liquid comprising the metal component prior to or during the treatment.

Aspect 251 provides the method of any one or any combination of Aspects 1-250 optionally configured such that all elements or options recited are available to use or select from.

What is claimed is:

1. A method of treating feed water, the method comprising:
adding a metal component comprising a metal that is aluminum to the feed water, wherein the feed water comprises a fluoroalkyl compound that is a perfluoroalkyl or polyfluoroalkyl substance (PFAS), perfluoroalkyl substance, a polyfluoroalkyl substance, a perfluoroalkyl acid (PFAA), or a combination thereof, wherein the metal component comprises an ion of the metal, a solid or dissolved compound of the metal, an elemental form of the metal, or a combination thereof, wherein the addition of the metal component to the feed water forms a solid;
removing the solid from the metal component-treated feed water, to form a clarified aqueous composition and to form an aqueous concentrate having a higher concentration of the solid than the clarified aqueous composition, wherein the aqueous concentrate comprises the metal component added to the feed water, and wherein the clarified aqueous composition has a lower concentration of the fluoroalkyl compound as compared to the feed water; and
reusing at least some of the metal component in the aqueous concentrate as 1 wt % to 100 wt % of the metal component that is added to the feed water.

2. The method of claim 1, wherein the metal component comprises an Al ion and/or aluminum hydroxide.

3. The method of claim 1, wherein adding the metal component to the feed water comprises adding to the feed water a salt of the metal of the metal component.

4. The method of claim 1, wherein the metal of the metal component is produced by a galvanic or electrolytic cell, wherein the addition of the metal component to the feed water occurs externally to the galvanic or electrolytic cell.

5. The method of claim 1, further comprising acidifying the aqueous concentrate to bring a pH of the aqueous concentrate to a pH of 0.5 to 5 sufficient to at least partially dissolve one or more salts comprising the metal of the metal component added to the feed water, and reusing at least some of the metal of the metal component in the acidified aqueous concentrate as 1 wt % to 100 wt % of the metal component that is added to the feed water.

6. The method of claim 5, further comprising purging one or more acidification contaminants from the acidified aqueous concentrate.

7. The method of claim 5, wherein the contacting of the feed water and the metal component forms a metal component-treated fluoroalkyl compound, further comprising performing a secondary separation to separate a residual solution from the aqueous concentrate after the acidifying to concentrate the metal component-treated fluoroalkyl compound in the aqueous concentrate and to form the residual solution separated therefrom.

8. The method of claim 7, wherein a ratio of a volume of the aqueous concentrate having the residual solution removed therefrom to a volume of the acidified aqueous concentrate prior to removal of the residual solution therefrom is 1:100,000 to 1:1.

9. The method of claim 5, wherein the acidified aqueous concentrate comprises a metal component-treated fluoroalkyl compound formed by addition of the metal component to the feed water, wherein the method further comprises destroying the fluoroalkyl compound in the acidified aqueous concentrate, wherein destroying the fluoroalkyl compound comprises thermal treatment, treatment with an electrolytic cell, plasma reactor, supercritical water, combustion, chemical treatment, or a combination thereof.

10. The method of claim 1, wherein the method is free of treating the feed water or clarified aqueous composition with a galvanic cell.

11. The method of claim 1, further comprising treating the clarified aqueous composition with a galvanic cell, to form product water.

12. The method of claim 11, wherein the galvanic cell comprises:
an anode comprising Al; and
a cathode having a different composition than the anode, wherein the cathode comprises Cu.

13. The method of claim 1, further comprising purging one or more acidification contaminants from a recycle stream comprising the metal component from the aqueous concentrate prior to or during combining the recycle stream and the feed water.

14. A method of treating feed water, the method comprising:
performing a treatment comprising adding a metal component comprising aluminum to feed water comprising a fluoroalkyl compound to form a solid comprising a metal component-treated fluoroalkyl compound, wherein the metal component is an ion of the aluminum, a solid or dissolved compound of the aluminum, an elemental form of the aluminum, or a combination thereof;
removing the solid from the feed water to form a clarified aqueous composition having a lower concentration of the fluoroalkyl compound than the feed water and to form an aqueous concentrate having a higher concentration of the solid than the clarified aqueous composition;
acidifying the aqueous concentrate;

performing a secondary separation to separate a residual solution from the aqueous concentrate after the acidification and to concentrate the metal component-treated fluoroalkyl compound in the aqueous concentrate; and adding the metal component from the residual solution to the feed water prior to or during the treatment.

15. A method of treating feed water, the method comprising:

performing a treatment comprising adding a metal component comprising aluminum to feed water comprising a fluoroalkyl compound to form a solid comprising a metal component-treated fluoroalkyl compound, wherein the metal component comprises an ion of the aluminum, a solid or dissolved compound of the aluminum, an elemental form of the aluminum, or a combination thereof;

removing the solid from the feed water to form a clarified aqueous composition having a lower concentration of the fluoroalkyl compound than the feed water and to form an aqueous concentrate having a higher concentration of the solid than the clarified aqueous composition;

acidifying the aqueous concentrate;

performing a secondary separation to separate a residual solution from the aqueous concentrate after the acidification and to concentrate the metal component-treated fluoroalkyl compound in the aqueous concentrate;

purging one or more acidification contaminants from the residual solution; and adding the metal component from the residual solution to the feed water prior to or during the treatment.

* * * * *

UNITED STATES PATENT AND TRADEMARK OFFICE
CERTIFICATE OF CORRECTION

| | | |
|---|---|---|
| PATENT NO. | : 12,240,772 B2 | Page 1 of 1 |
| APPLICATION NO. | : 18/628119 | |
| DATED | : March 4, 2025 | |
| INVENTOR(S) | : Borras et al. | |

It is certified that error appears in the above-identified patent and that said Letters Patent is hereby corrected as shown below:

On the Title Page

On page 5, in Column 1, under item (56), "Other Publications", Line 14, delete "Applictions" and insert --Applications-- therefor In the Specification In Column 22, Line 54, delete "$CaCl_2$)," and insert --$CaCl_2$,-- therefor In Column 47, Line 57, delete "$CaCl_2$)," and insert --$CaCl_2$,-- therefor Signed and Sealed this
Thirteenth Day of January, 2026

John A. Squires
*Director of the United States Patent and Trademark Office*